US011756272B2

(12) United States Patent
Brent et al.

(10) Patent No.: US 11,756,272 B2
(45) Date of Patent: Sep. 12, 2023

(54) SOMATIC AND SOMATOSENSORY GUIDANCE IN VIRTUAL AND AUGMENTED REALITY ENVIRONMENTS

(71) Applicant: LabLightAR, Inc., Seattle, WA (US)

(72) Inventors: Roger Brent, Seattle, WA (US); John Max Kellum, Seattle, WA (US); James Ashley, Lilburn, GA (US)

(73) Assignee: LabLightAR, Inc., Seattle, WA (US)

(*) Notice: Subject to any disclaimer, the term of this patent is extended or adjusted under 35 U.S.C. 154(b) by 0 days.

(21) Appl. No.: 17/823,015

(22) Filed: Aug. 29, 2022

(65) Prior Publication Data

US 2023/0068660 A1 Mar. 2, 2023

Related U.S. Application Data

(60) Provisional application No. 63/237,992, filed on Aug. 27, 2021.

(51) Int. Cl.
| | |
|---|---|
| G06T 19/00 | (2011.01) |
| G06F 9/451 | (2018.01) |
| G06T 19/20 | (2011.01) |
| G09B 19/00 | (2006.01) |
| G06F 3/01 | (2006.01) |

(52) U.S. Cl.
CPC .......... *G06T 19/006* (2013.01); *G06F 3/011* (2013.01); *G06F 9/453* (2018.02); *G06T 19/20* (2013.01); *G09B 19/003* (2013.01); *G06T 2219/2012* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 8,914,472 | B1* | 12/2014 | Lee | G06Q 30/04 709/219 |
| 11,285,674 | B1* | 3/2022 | Douglas | B33Y 50/00 |
| 11,460,911 | B2* | 10/2022 | Soelberg | A63F 13/25 |
| 2020/0273255 | A1* | 8/2020 | Godin | G09B 5/02 |
| 2020/0311397 | A1* | 10/2020 | Sawhney | G06F 3/011 |
| 2021/0339143 | A1* | 11/2021 | Bar-Zeev | G06F 3/011 |
| 2022/0164204 | A1* | 5/2022 | Kwatra | G06T 19/006 |
| 2022/0245880 | A1* | 8/2022 | Thielen | G06T 19/006 |

* cited by examiner

*Primary Examiner* — Ryan M Gray

(74) *Attorney, Agent, or Firm* — Han Santos, PLLC

(57) ABSTRACT

A method of operating a procedural training user interface system involves displaying an interactive guided process of a first user using at least one augmented reality (AR) layer through an AR device worn by a second user, where a representation of first user hands is displayed. The second user interactions may be detected during the interactive guided process, where the second user attempts to superimpose second user hands on the representation of the first user hands in the at least one AR layer. The interactive guided process of the second user may then be displayed using the AR layer through an AR device on the first user and the AR device on the second user. If the first user hands and the second user hands are not superimposed in the AR layer, the first user or the second user may be notified to take corrective action.

20 Claims, 30 Drawing Sheets

SOMATIC AND SOMATOSENSORY GUIDANCE IN VIRTUAL AND AUGMENTED REALITY ENVIRONMENTS

CROSS REFERENCE TO RELATED APPLICATIONS

This application claims priority and benefit under 35 USC 119 to U.S. application Ser. No. 63/237,992, "IMPROVED SOMATIC/SOMATOSENSORY GUIDANCE IN VIRTUAL AND AUGMENTED REALITY", filed on Aug. 27, 2021, the contents of which are incorporated herein by reference in their entirety.

BACKGROUND

Augmented Reality (AR) may be characterized as the superimposition, via a user's sensorium, of entities made of information (entities made of bits) upon entities in the physical world (entities made of atoms). The development of workable Augmented Reality devices, such as the Microsoft HoloLens[SM], and the near future development of their more powerful successors, promises to be of great utility to work, including as lab work, in which users/operators must work both with information and on physical objects. The use of head mounted AR devices may be of particularly utility for workers who spend much of their time interacting with the physical world using their hands. An important aspect of AR-related tasks, such as those in a laboratory environment, is spatially precise positioning of physical and virtual objects to provide procedural guidance for manual tasks.

For these reasons, AR may be a particular boon to autonomous activity, to teaching and training, and to collaboration in the lab environment. As a new medium enabled by new devices, effective use of AR may require development of new user interfaces, particularly for procedural work, i.e., work in a laboratory environment or other environments in which humans interact with the physical world and the world of information, in which the interaction with the physical world involves use of their hands, and in which the human operator is carrying out some sort of procedure that involves rigid or loose adherence to some sort of planned sequence of steps.

The creation of content for augmented reality (AR) devices may suffer from various shortcomings and impediments. In particular, current content creation systems lack user friendly authoring tools but rather require a content creator to write complex code. Additionally, content created using current methods often serves a singular purpose (to support a particular procedure) and cannot be easily modified to support related procedures. This is especially true for the creation of AR-guided instructions as individual sets of instructions may not allow for even slight modifications to the procedure.

Therefore, there is a need for an AR content creation system that is accessible to users without a programming background, that has the ability to effectively recognize and categorize objects in the user's environment, to aid production of content that effectively and intuitively guides the user through procedural work.

BRIEF SUMMARY

Disclosed herein is a method to operate a procedural training or procedural execution user interface system. Through this method, interactions of a first user may be detected during an interactive guided process. The interactive guided process of the first user may be displayed using at least one augmented reality (AR) layer through an AR device worn by a second user (operator), wherein a representation of first user's hands is displayed. The second user interactions may be detected during the interactive guided process, wherein the second user attempts to superimpose the second user's hands on the representation of the first user's hands in at least one AR layer. The interactive guided process of the second user may then be displayed using at least one AR layer through an AR device on the first user and the AR device on the second user. It may be determined whether the first user hands and the second user hands are superimposed in the at least one AR layer. On condition that the first user's hands and the second user's hands are not superimposed in the at least one AR layer, the first user or the second user may be notified to take corrective action.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
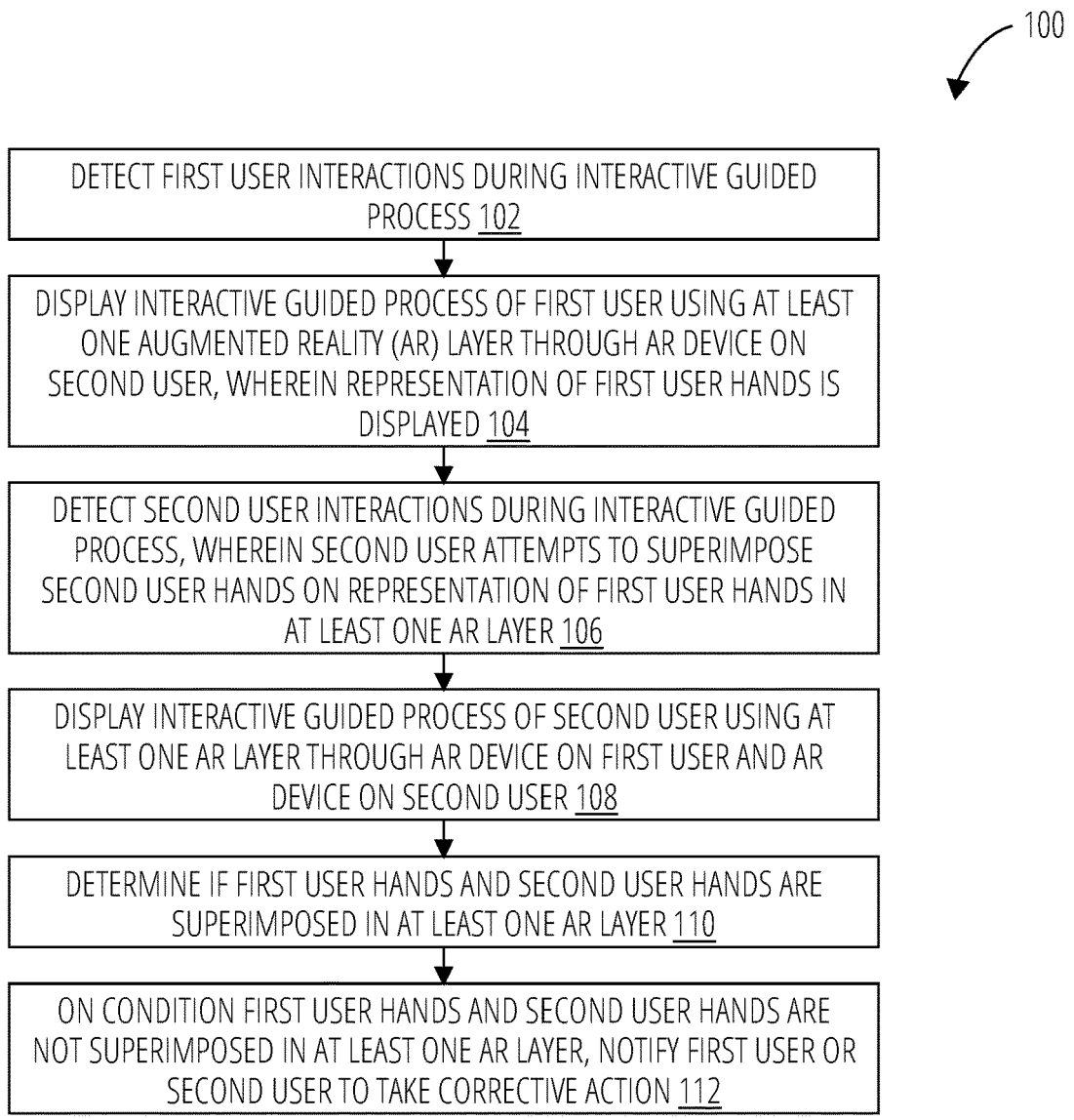
FIG. 1 illustrates a routine 100 in accordance with one embodiment.

The method disclosed herein has high utility for facilitating work and involves the use of the operator's hands, some measure of guidance by the AR device through the steps of a procedure to which the user adheres rigidly or loosely to a planned sequence, and use of the various functions of the AR device to retrieve relevant information and deposit it together with new information in appropriate digital repositories.

In this method, the researcher or other AR device operator is guided through performance of a manual task by superimposing their hands on AR hands projected into the user's field of vision (FOV) by the AR device. Non-limiting examples of tasks that can be aided by this UI are a) tasks for "beginners", unfamiliar with lab work or other precision work, who are being oriented into how to hold tools or interact with equipment, b) highly sophisticated manual tasks, with examples in lab involving work with invertebrates (Drosophila and Caenorhabditis elegans), c) still more sophisticated manual tasks with examples in lab work being work with vertebrate organisms (including but not limited to surgery, in utero DNA transfection, microinjection of vertebrate and invertebrate oocytes, stereotactically guided injection into specific intraorganismic subvolumes such as specific brain areas, work with early phase mammalian embryos in vitro, necropsy, biopsy, and autopsy), etc., and with examples in other spheres for example involving cutting diamonds.

The AR hands may be recorded, transmitted live from another researcher (who may be at a remote site), or generated by software entities running on the AR device or a computing structure connected to it. If the hands are generated from a live transmission or recording of a human, the person making the transmission or recording may be an expert or instructor, and the user of the AR device displaying the instructor's hands may be referred to as the operator or user.

People's hands differ in size. For some applications, it will be sufficient to use software entities (chunks of code, programs) to scale the AR-generated hand images to fit the user's hands exactly. Scaling can be automatic, based on the video image of the user's hands recorded in the device, or can involve user input, for example by the user initiating the procedure by putting their hands down on a grid on a solid surface to allow them to be measured.

Consider applications in which the AR hands are not computer generated but rather are projected from live or previously recorded recordings of the instructor's hands. For certain applications (laboratory examples including for example dissection of laboratory animals, surgery, stereotactic placement of injection needles) it is important that the user of the AR device make the same absolute movements of hands and fingers as the instructor. For example, consider two cases. In one, the instructor has hands half again larger than those of the user. If the instructor needs to move her thumb and index finger by 9 mm, the user with her smaller hands must also extend her thumb and index finger by 9 mm, not 6 mm. Now consider the converse case in which the instructor's hands are ⅔ the size of the user's hands. Here, there are cases in which if the instructor extends her finger by 6 mm, the user cannot extend her hand by 9 mm.

In the method disclosed, these two cases may play out in different ways. When the user's hands are smaller than the instructor's, the image of the instructor's hands may be projected into a volume larger than the user's own. Here, the typical move by the user may be to move her hands differently, so that the surfaces of her hands in contact with her work (e.g., tips of the fingers) are superimposed on the projected fingertips of the expert, even though the rest of her fingers and hands may lie outside the projected expert fingers.

In this description and in the claims, references to superimposing representations of a user's hands with another user's hands or representation thereof shall be understood to encompass superimposing the entire representation of one user's hand or hands with another user's entire hand/hands or representation thereof; and also to encompass superimposing a representation of a portion one user's hand or hands with a portion of another user's hand/hands or representation thereof, wherein the portion that is superimposed is preconfigured to be relevant/important to the procedure at hand (e.g., the user's fingertips).

For example, displaying the representation of first user hands carrying out the interactive guided process to the second user may involve displaying only a portion of the fingers of the first user hands, and determining if the first user hands and the second user hands are superimposed in at least one AR layer may involve determining if a corresponding portion of the fingers of the second user hands is superimposed on the corresponding portion of the fingers of the first user hands.

It is the converse case, in which the operator's hands are larger than those of the instructor, that AR shows its differences as a medium. In this case, even though the surface that defines the volume occupied by the instructor's hands lies within the user's hands, the user can still see these projected in 3 dimensions with the image of her own hands in the FOV. Again, the response of the user to the non-scaled projection will be to position her hands so that her fingertips are congruent with the expert's projected fingertips.

Current and near future AR devices may provide a user with visual and auditory guidance. But they may not support proprioceptive guidance. That is, an expert knows, with her eyes closed, where her fingers are in space, whether they are extended or flexed, whether she is tensing them isometrically or otherwise preparing for movement. However, the senses enabled by AR (currently, sight and hearing) may not convey these things. Similarly, current AR devices may not provide haptic guidance (for example, the instructor may know how hard she is turning the knob, or pushing the scalpel to cut into the abdomen, but the AR device may not recreate that for the user).

To implement a method providing some measure of proprioceptive guidance, visual cues may be developed, such as a simplified map of muscles and tendons that move the hand, color coded (for example, extensors in red, flexors in blue, and superimposed within the volume defined by the AR hands in the visual field). Cues such as the brightness of these colors will correspond to muscle tension or indicate imminent movements. Audio cues may denote overall muscle tension for each hand, and, in next generation AR devices that track user FOV, audio cues may describe the degree of tension of whatever extensor or flexor the user happens to be looking at. or signal imminent movements.

Anticipatory proprioception may be the basis for a particularly valuable form of guidance. An instructor may know when she is about to initiate a hand movement. To provide guidance for this, the muscles or simplified muscles in the visual field may begin to pulse before the movement is initiated. A distinctive audio cue may be used shortly before a movement is initiated. Such anticipatory proprioceptive guidance may be generated by sensors attached to the instructor's hands that sense premonitory muscle tension. This guidance may in some embodiments be added to a recording of a transmission by a human expert during the process of generating the AR "production."

Haptic guidance may be used to provide information about how hard the surface of the hand is pressing on the object (or, alternatively, how hard the object in contact with the hand is "pushing back"). Although there may be ways to depict this visually, as a non-limiting first and preferred implementation, we may denote haptic feedback and degree by beeping tones, localized in the audio field to the part of the FOV where hand is in contact with object, with the frequency and intensity of the beeping increasing with increasing pressure. Such audio conventions used by the UI may be similar to those used to represent object proximity in certain passenger vehicles. These tonal cues may be used thus to denote pressure or push back rather than proximity. The user may be trained to calibrate these cues by giving the user a hand device that causes the AR device to make the same beeping noises for a given level of pressure on the surface that may be used for the cues.

In cases where there are multiple points in the FOV where hand may be in contact with object, tones may be used to indicate the pressure on the most important object, surface, or point of contact, and localize the tone to this contact point's position within the audio field. In near-future AR devices that track the user's gaze, audio indication may be provided for that portion of hand in contact with surface that the user is looking at.

This method of operating a procedural training user interface system may rely on a procedural language system. Embodiments of a procedural language system enable the creation of content for an augmented reality device and enable a user to establish associations with viewed objects and object movements to form instructions for controlling and generating interactive content for use with the augmented reality devices. Such a system may implement the disclosed method, integrating a representation of user and instructor hands within a operator's field of vision (FOV) for the purpose of enhancing AR instruction.

The system may include an object recognition engine to recognize the object in an environment. The object recognition engine may recognize objects by referencing a database to match/identify the observed objects. The object recognition engine may be operably linked to a knowledge-base and/or a structured knowledge representation that can supply the system with information about objects (substances and materials) and permitted relations and operations on those objects. The system may additionally allow a user to declare the identity of the object within the database to enable future recognition of the object. The ability to declare the identity of the object may rely on additional input sources that may include audio sensors or touch inputs. These additional input sources may provide the user with the ability to assign a recognized term to a detected object in the physical space.

The system may utilize the additional input sources to declare variables as part of the procedural language. The declaration of variables allows for the binding of associations with a physical action or visual object within the field of view.

The procedural language and content generation system may utilize a Turing-complete language or a Turing-incomplete language (e.g., markup languages) for generating a control scheme for directing a user through a guided process and/or creating AR guided content through the AR content generation system. The procedural language may be written/developed in a protocol development user interface and communicated to an interpreter as an input set. The interpreter may identify object declarations, primitives, commands, and combinations thereof to generate an instruction set utilized to control AR device functionality. This functionality may include guiding a user through procedures in a protocol or managing configuration of the interpreter of correlated inputs of detected objects, object movement, and input controls (e.g., control signals, user inputs, etc.).

The system may provide the ability to define segmentation (e.g., objects, movement of objects, transformation of object, etc.) within a process. Segmentation may be facilitated while an object is in motion.

The system may have an assumption of spatial persistence allowing for "voice instructions" to tell user where the object is and where to declare it. This may be viewed as a persistence scope to define the scope of the variable, in order to allow the system to profile the area to know where the object is and both remember and declare new things. For example, the system may recognize an object while it is in view of the imaging device and map the object to a spatial location within the environment. When the object is out of view of the imaging device, the system may display visual indicators to direct the user back to the object within the environment.

The process of building associations may utilize contextual information required to identify the identification of objects in another environment. For instance, if a user is performing a laboratory procedure with known objects required to perform the procedure, the system may guide the user to bring certain objects into their view for other steps in the process.

The procedural language may include control variables such as "for loops" to repeat steps in a process.

The system may utilize a domain specific language that is device and system agnostic. The procedural language may create sets of linked list and collection of lists in a memory structure. The creation of the list may be configured with a dependency to collect the information and then perform a command. The procedural language may allow for the declaration of arrays, collections, and do loops with control variables to limit the array. The procedural language may allow for the declaration of arrays and their collection with the possible use of a control variable to define the limits of same. The procedural language may allow for the declaration of collections by the user in an environment. The user may name (or "declare") the object, whose properties are then retrieved from a database to determine whether the object is a part of a collection or a set of many constituent parts.

Upon determining that an object is part of a larger collection, the system may perform actions, that include, but are not limited to, counting and individually labeling the parts of the set, guiding the user to individually label individual parts of the set, etc.

The procedural language system may provide a control structure for defining steps. The system may allow for the repetition or skipping steps in an ordered process by using commands such as 'next' and/or 'previous'. Although, commands such as 'next' and 'previous' may be set as primary commands, the system may include capabilities to understand other basic commands with a greater degree of complexity. The actions performed by these defined commands may be restricted to the context or workspace the process is occurring in, in order to avoid confusion as well as a degree of specificity. These commands may be altered or modified similar to language libraries utilized by other programming languages.

The system may interact with augmented reality (AR) devices in manners that assist with work, including:

a) Guidance through the steps of an ordered process via visual or other sensory cues (which in turn include: i.) providing visual or other cues for the next operation or object with which the worker should engage, ii.) forestalling imminent errors, if the user is poised to execute an incorrect or out-of-sequence operation or make operational contact with an incorrect object, iii.) allowing instant replay of FOV to catch very recent errors, and iv.) gating the operator so that she cannot take a step until a previous step is completed.

b) Retrieval of key data from laboratory instruments and other repositories and its display via audio or in the user's field of view (FOV).

c) Ability to record key observations in appropriate digital repositories.

Many of the features of the system are directed towards providing guidance. In other aspects, the system relates to other means that AR devices may support laboratory and related operations.

In an embodiment AR support of a laboratory protocol overlays the next object to be manipulated in the visual field with a pulsing colored dot, colored ring, or other graphical or alphanumeric overlay, and indicates imminent contact or proximity by the user or a device held in her hand (e.g., the tip of a pipet) with an incorrect or out-of-sequence object by a flashing red dot or other overlay and/or an audible warning. The people who implement (i.e., code) this protocol in the AR device have at their disposal means to position the colored dot at a given location and/or at a given spot on a recognized object, whose location may have moved within the user's FOV, based on knowledge of the location of the object in the environment, the position of the user's head, and the direction the user's head (or, soon, gaze) is pointing. They then may use this information to cause the AR device to project a colored dot in the appropriate place in the user's FOV. This and like actions represent possible means of encoding procedural guidance for display and presentation by AR devices.

A problem with current means for implementing protocol guidance such as the above that it does not operate at a high enough level of abstraction. Actual laboratory protocols (and related protocols, such as recipes) are in fact detailed at a higher level of abstraction, typically written in natural language and often in second person imperative (e.g., "Take a test tube rack. Take 6 test tubes. Place them in separate holes in that rack. Using a marker, number the tubes 1-6. Remove the cap from Tube 1, then pipet into it 5 mL of solution A. Replace the cap. Repeat these steps for Tube 2, and for all the other tubes in the line of tubes . . . ").

The system provides a number of informatic (computational) means, at a higher level of abstraction, to program AR devices to provide procedural guidance and other kinds of support for laboratory actions.

In a high level view, the system uses a controlled vocabulary language to "encode" the sequence of steps the user of the AR device is to follow. These actions then are translated into code that directly runs the device, or into some intermediate language (such as bytecode) that the device may interpret. This results in device identifying an object within the environment to be utilized during the current stage of a process. For example, the current stage of a process indicates that a user should vortex a tube, as a result, the AR device places a colored dot or other marker in the operator's FoV on the tube to be vortexed during this stage. As another example, a user may want to check the status of a process, and the AR device asks if or what she wants to check. At the same time, the system uses this vocabulary to enable the user of the AR device to interact with and record the procedure.

In describing this language, "nouns" and "verbs" provided by a user may be interpreted as "objects" for "nouns" and "operations" and "conditionals" for "verbs". Nouns used by a user to describe things in an environment may be utilized by the system to establish as an 'object' in a programming language. These things, the nouns, may be entities found in the lab/workspace, and, in the specific instance of the software used by an individual user, represent objects and substances known to be present in the lab/workspace. These objects may be known due to recognition by the software in the AR device (Known Objects and, possibly Known Materials/Substances), or they may be known because the user has declared them.

Declared objects and Declared Materials/Substances are a set of parameters that the system does not detect as a Known Object relative to the current context of the procedure or instructions that are being created. Declared objects all have implicit (and maybe explicit) prefixes such as "this" or "this here" and may be declared by pointing or holding while declaring.

The system refers to specific classes and individual Known Objects, Known Materials/Substances, declared objects, and Declared Materials/Substances as Named Objects and Named Materials/Substances. The system also enables declaration of different types of files (e.g., microscope images, DNA Sequences) which, by implication have some relationship to the names of the information sources or information repositories that may house data of each type resulting from performance of this protocol. The system may provide a method for declaring information sources and information repositories. The system also allows declaration of information sources, both local (e.g., microscope) and general (e.g., FIG. 5a, McCluskey et al., Cell, 2002).

In order to build a set of instructions to be carried out with the known objects and known substances, the procedural language utilizes 'primitives' to describe actions and/or a sequence of actions to associate with an operation in a lab or a workspace. These actions may be detected through audio inputs (e.g., use of defined verbs) or detected through the movement of the objects.

The system provides functionality to declare objects. Declarations may take the form "declare [object, object class, substance class][name associated with entity held in dominant hand or pointed to by touching with dominant hand index finger]." If object cannot be recognized by machine vision because it is partly occluded, the system will recognize that the object is an object that is no longer where it was in the FOV (because it's been moved by a user's hand). The system may also recognize the object after it has been returned to its position of origin (position on the bench or within a rack). The system may allow for the retrieval of information such as a Protocol Check or an Inventory Check [named protocol]. (This asks: are the materials and reagents present to perform this procedure?) The system may provide the ability to store recorded information through certain commands such as 'File' or 'File To' (store last data retrieved in named repository). The system may allow for the identification of some additional verbs for the user utilize that are not particularly specific to lab. The system may provide identification of verbs specific to a lab that are critical, and not operated by the user.

The procedural language system may allow definable "subroutines", e.g. "Weigh out 100 g of [Sodium Chloride]" rather than requiring the programmer/author to break that command down more finely into individual commands. In this language, only possible/permissible commands are syntactically and semantically correct. For example, a command to vortex a lab stool describes a nonsensical operation and is therefore a semantic error. In some circumstances the system might call on a second system to query if a given command makes sense ("e.g., place 100 g of salt into a beaker, place the beaker over a Bunsen burner and heat until the salt boils") is not permitted.

In addition to using the rules of the language to describe permissible and impermissible commands, the system might call on another system (for example a knowledge repository) to see if a given string of verbs and nouns was permitted. In addition to the above kinds of impermissible commands, the language also recognizes commands that are physically impossible, such as superimposing two solid physical objects it the same volume of space. The system may refer to a set of procedural commands as a "program" or "script". A major use of this controlled vocabulary and standardized syntax is to allow the user of the AR device to interact with the procedure the operator is following they are following and document it.

The system may recognize big objects (water baths) and smaller objects (tubes). The system may recognize the large objects and/or the user may declare them at the start of a procedure. The system may be configured to only recognize individual tubes by their place within a rack. Our most important high level command is "put that colored dot" or otherwise "place that visual attention marker" "on something", which may have moved in the visual field. If the angular resolution of the depth sensing part of the AR device or other components of spatial resolution in three dimensions is not adequate to place the dot or other action cue accurately in three dimensions, the system may place it at the correct place in the two-dimensional image being displayed in the user's dominant eye.

Another important high level command is "put that red dot" or "red X" or "place that warning marker" on something, where the something may include a tube, or the end of the pipetting device, or a static object in the visual field. This is often accompanied by "place that attention beep" in that position in the user's Field of Hearing (FOH). Such a warning is the default when the user is about to touch a non-green-dot tube or object at the end of the user's dominant hand.

A key aspect of these high level commands is that the programmer may specify "next tube" or "next object" or "go to next tube or next object" and the software may translate that next step in the procedure into placement of the dot or a beep onto the position of the next tube and the next object in the FOV/FOH. A key part of normal code in this Augmented Reality Programming Language is that attempt to touch or withdraw from its position in the rack a non-green-dot tube or an out-of-sequence object may cause the program to emit an warning message (red light, red X, beep beep beep) or a query message (flashing question mark or yellow light, together with query tone for example, the tone made by R2-D2).

The system may utilize a content authoring environment/content generation environment to generate a set of instructions for controlling the augmented reality device. The content authoring environment/content generation environment comprises a user interface that has a number of pre-programmed elements that support the development of procedural and other laboratory-relevant "content" for AR devices. The "authoring environment" is a program in which the support elements are built in, with UI controls such as buttons, drop down menus, moving boxes. Authoring environments generally enable interactions with a GUI and other UI entities, rather than by using a command line. The purpose of the environment is to ensure that the content's author does not need to know how to use a command line interface to write what is in effect a program.

The procedural content authoring environment may be particularly crafted to enable creation of procedural content, and in particular procedural content that supports laboratory and related operations.

Examples of particularly important functions utilized in this environment include:

a) facilitating the ability of researchers and other authors to instantiate or embody elements of procedures they have imagined into code that may allow an AR device to support performance of the procedure.

b) facilitating the ability of researchers and other authors to instantiate or embody elements of procedures they have developed into code that allows other researchers to replicate the procedure.

c) facilitating the ability of researchers to embody in code modifications to already-encoded procedures.

d) facilitating the ability of a researcher or other author acting as a "director" to take procedures depicted in "old media" such as graphics or text or video, and working from these, adapt them into AR "content", a Procedural Language "script" that "runs" the procedure on an AR device.

e) facilitating the ability of an researcher or author performing as an "actor" to "star" in a "recording" of procedure they are carrying out, which, together with appropriate commands from the "actor" or an outside "director", is then edited and converted into AR "content", a Procedural Language "script" that provides others with guidance in carrying out the procedure.

In this context, the system assigns particular importance to the uses of the controlled vocabulary and controlled syntax procedural language portions of this system in order to articulate such commands. The system builds the Content Generation Environment (CGE) using ideas about programming tools and elements that predate AR. For example, the CGE may include an "asset browser" (e.g., file explorer, media browser, gallery, etc.), which may allow the author to identify files (e.g., text, graphics, video clips) that they wish to include in the AR content, and means to arrange these elements along with commands equivalent to those from the procedural language into "sequences" that may "play" as the user steps through a procedure.

Significantly, as in the command line language, the Content Generation Environment does not allow nonsensical or physically impossible commands, such as vortexing Bunsen burners or superimposing two solid objects in the same volume of space. "Authoring" in the CGE may be accessed by projected visual and audio UIs operated by authors using AR devices.

The CGE parses program text and attaches semantic properties to the structure. The attached information includes information about symbol tables such as information about the definition and use of variables and procedures and information about types. The CGE includes browsers and other tools that make this information available and allow the user to navigate through the whole set or subset of program objects to make queries about the objects and their relationships. By so doing, the browser and other tools helps the user understand the status and structure of code under development.

The system may provide support for multiple developers and complex projects. The CGE embodies a means to control and manage development of multiple versions of software modules by multiple users. These means allow rigorous version control and configuration management. The CGE allows the user to define a blueprint—that is, a system model that describes the modules that make up the program. Given the model, the environment maintains a history of the user's selection of various versions in forming a program. The environment may also determine when a module needs to be recompiled to maintain consistency among them. The CGE may limit construction and maintenance work by multiple programmers to specific subsystems/specific groups of modules. It may enforce check in/check out procedures and control access to program components so as to that prevent developers from overwriting one another' code. In another embodiment, a community of users may be able to generate modifications to the content while the content is be run in a procedure that may be combined with the original content or stored as a new version.

The procedural language may be language run by an interpreter. In some adaptations of the systems, other programming languages may be compiled into the procedural language. These languages may be accomplished by a markup language and a markup language with dependency automation (this could be thought of as being part of a functional programming paradigm). As an example of a command in a simple markup language, consider a series of steps, written as: {Step name, Text Instruction, [Objects to draw green circles on], [Array of pairs Objects to draw arrows from and to] }. This could be encoded in XML using tags, JSON using a list of dictionaries, YAML, or any other appropriate method. As an example of a command in a markup language that encodes the dependencies for each step consider: {Step: Step5 Instruction: attach object A to object dependencies: Step1, Step3, Step2}. In this way, the system could build a dependency tree for all steps and generate all possible procedural paths. This would allow the user to dynamically switch between paths while going through the procedure if one step was temporarily blocked or waiting on something. Additionally, an IDE could be adapted to operate with other languages.

The system may utilize an IDE that includes built-in compilation, simulation, and/or debugging environments.

The system may provide functionality to detect errors in spoken commands based on a semantic understanding of the process/procedure being performed. The system may incorporate existing error recognition process to determine syntax errors commonly used in typing systems. These systems include: "Duck Typing" in which the system can't perform an operation on an object if that object lacks a given property, Class typing, which incorporates a standard object-oriented programming class-based typing approach, and Template specialization, where an operation can/cannot be performed on a superclass of objects. The system may provide functionality to record generalized audit trails/macros which may also be later run as device input to guide a future user. The system may incorporate functionality associated with "Object Oriented Programming Languages" (OOPL), since AR systems permits/allows a 1-to-1 correspondence between physical objects to objects as those are understood in an OOPL.

The system may include OOPL functionality found in Turing-complete languages, Turing-incomplete languages (e.g., markup languages), command lines, GUIs, etc. The content generation environment may allow procedural code for lab and related procedures to be written in an OOPL in which physical objects belong to classes and framing ways the objects may interact with one another during a procedure as the interactions would be limited by the properties of objects in those classes.

The system may generate finite state machines for controlling devices. A finite state machine (sometimes called a finite state automaton) is a computation model that can be implemented with hardware or software and can be used to simulate sequential logic and some computer programs. Finite state automata generate regular languages. Finite state machines can be used to model problems in many fields including mathematics, artificial intelligence, games, and linguistics.

The system may allow for the ability to write code procedures in the CGE by manipulating objects in a 3D environment due to the aforementioned 1-to-1 correspondence between objects and their properties. An example of this would be automated code generation for tube placement from the operator pulling plastic tubes out of a bag and placing them into holes in a tube rack.

Additionally, the system may allow generation of an instructions set from an image of a written process. The written process may be written in an existing programming language that includes a Turing complete or Turing incomplete computer programming language or written out as pseudocode description of the process. Furthermore, the written process may be a set of instructions such as a procedure or protocol. This instruction set may be applied, for example, to configure robotic mechanisms to carry out complex and detailed tasks.

One of skill in the art will realize that the methods and apparatuses of this disclosure describe proscribed functionality associated with a specific, structured graphical interface. Specifically, the methods and apparatuses, inter alia, are directed to a procedural language content generation system utilizing a combination of inputs from an augmented reality device and user input devices to generate user guiding augmented reality content. One of skill in the art will realize that these methods are significantly more than abstract data collection and manipulation.

Further, the methods provide a technological solution to a technological problem, and do not merely state the outcome or results of the solution. As an example, the system combines user inputs and environment inputs to generate augmented reality content without relying on a user's knowledge of coding computer software. This is a particular technological solution producing a technological and tangible result. The methods are directed to a specific technique that improves the relevant technology and are not merely a result or effect.

Additionally, the methods produce the useful, concrete, and tangible result of an instruction set that generates augmented reality content in response to detected objects in an environment image. Further, the methods are directed to a specifically-structured graphical user interface, where the structure is coupled to specific functionality. More specifically, the method discloses a user interface that combines user inputs and commands with environment images to generate and store instructions for controlling an augmented reality device. rather than using conventional user interface methods to write and store hardware and software instructions.

FIG. 1 illustrates a routine 100 for operating a procedural training user interface system in accordance with one embodiment. A first user's interactions are detected in block 102 during an interactive guided process. This may be, for example, assembly of a piece of equipment, completing the steps of a laboratory experiment, performing surgery, or some other set of tasks wherein a novice may require training on how to perform a series of activities requiring precise hand position and motions. The position and motion of the first user's hands may be captured using at least one of a video camera, motion detection sensors, virtual reality (VR) gloves, or similar devices. The first user may be an expert in the process they guide, such as an instructor. Detecting first user interactions may include at least one of visual cues, auditory cues, synesthetic proprioception, anticipatory proprioception, and haptic sensation.

In block 104, the interactive guided process as performed by the first user may be displayed using at least one augmented reality (AR) layer through an AR device worn by a second user. A representation of first user hands may be displayed as part of the AR layer. The second user may be a student learning the process under the guidance of the first user's instruction. In some embodiments, the AR layer may be developed in real time by an instructor in a remote location. In some embodiments, the AR layer may be part of a recorded session and may be used to annotate training content for repeated use in multiple locations.

In block 106, the second user interactions may be detected during the interactive guided process. The second user may attempt to superimpose their hands on the representation of the first user hands in the AR layer. In block 108, the interactive guided process of the second user may be displayed using at least one AR layer through an AR device worn by the first user (instructor) and the AR device worn by the second user (student). In block 110, an artificial intelligence entity, the first user, the second user, or some other actor may determine if the first user hands and the second user hands are superimposed in the at least one AR layer.

In block 112, on condition the first user hands and the second user hands are not superimposed in the at least one AR layer, notifies the first user or the second user to take corrective action. In some embodiments, the system presenting the interactive guided process may remain at each step until the second user hands overlap within an acceptable margin. Visual, audible, haptic, or other feedback may be provided to facilitate the second user achieving an acceptable overlap. In embodiments where the instructor and student use the AR layer to interact in real time, the instructor may monitor the actions of the student's AR hands and may provide specific verbal feedback.

Figure 2:
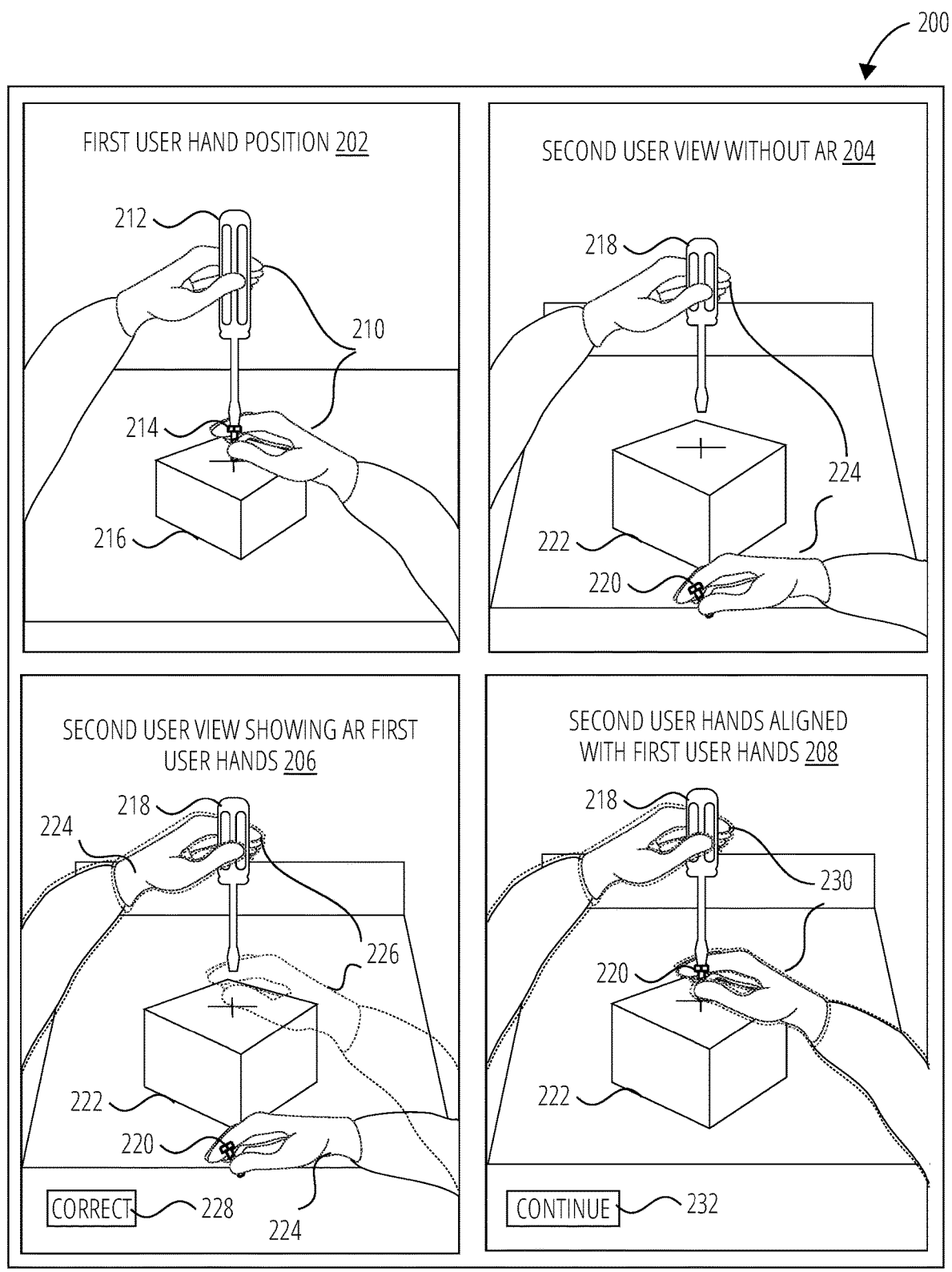
FIG. 2 illustrates an implementation of procedural training user interface system 200 in accordance with one embodiment.

FIG. 2 illustrates an implementation of procedural training user interface system 200 in accordance with one embodiment. A first user and a second user as previously described are depicted beginning the process of fastening a screw into a block. The views illustrated comprise a first user hand position 202, a second user view without AR 204, a second user view showing AR first user hands 206, and a second user hands aligned with first user hands 208.

These views are shown as though they were collated into a single display. In some embodiments such a display may allow a third party to audit a live interaction or edit a recorded interaction. However, a primary use case may involve the first user (an instructor) wearing an AR headset head-mounted camera, or other device capable of taking video from the point of view of a participant in the activity, and the second user (a student) wearing an AR headset device capable of displaying an AR layer over the second user's FOV.

The first user hand position 202 view shows first user hands 210 (such as an instructor's hands) holding the instructor's screwdriver 212 and instructor's screw 214 in position to fasten the instructor's screw 214 into the instructor's block 216. The second user view without AR 204 shows a student's hands holding a student's screwdriver 218 and student's screw 220. Unlike the instructor's first user hands, the student's second user hands are not in position to fasten the student's screw 220 into the student's block 222.

The second user view showing AR first user hands 206 may be the student's view of their own second user hands 224 through an AR headset, with an AR layer including AR first user hands 226, indicating the position the second user hands 224 need to be in before the student may proceed with fastening the screw. Because the second user hands 224 do not adequately overlap the AR first user hands 226, a correction needed indicator 228 may be displayed visually or represented by an audible or haptic signal. In some embodiments, the instructor may see their own hands, along with a set of AR second user hands through an AR headset of their own (not shown). The instructor may thereby know to provide verbal feedback until the second user hands are in alignment with their own.

The second user hands aligned with first user hands 208 view may provide visual indication to the student that their hands are in alignment with the AR first user hands 226. Because the first user hands and second user hands overlapping 230 are within an acceptable margin, the ready to continue indicator 232 may be displayed or otherwise communicated to the second user. The two users may proceed to the next step together in real time. In another embodiment, the acceptable margin of overlap may permit a recorded procedure to advance to the next step.

In some embodiments, the instructor and students may be working with equivalent but not identical equipment. For example, the instructor's screwdriver 212 and student's screwdriver 218 illustrated are not the same size. Similarly, the instructor's block 216 and student's block 222 differ in dimension. Object recognition, categorization, and scaling may need to be applied to provide effective guidance under these conditions. Aspects of this invention that may provide this capability are described below.

Figure 3:
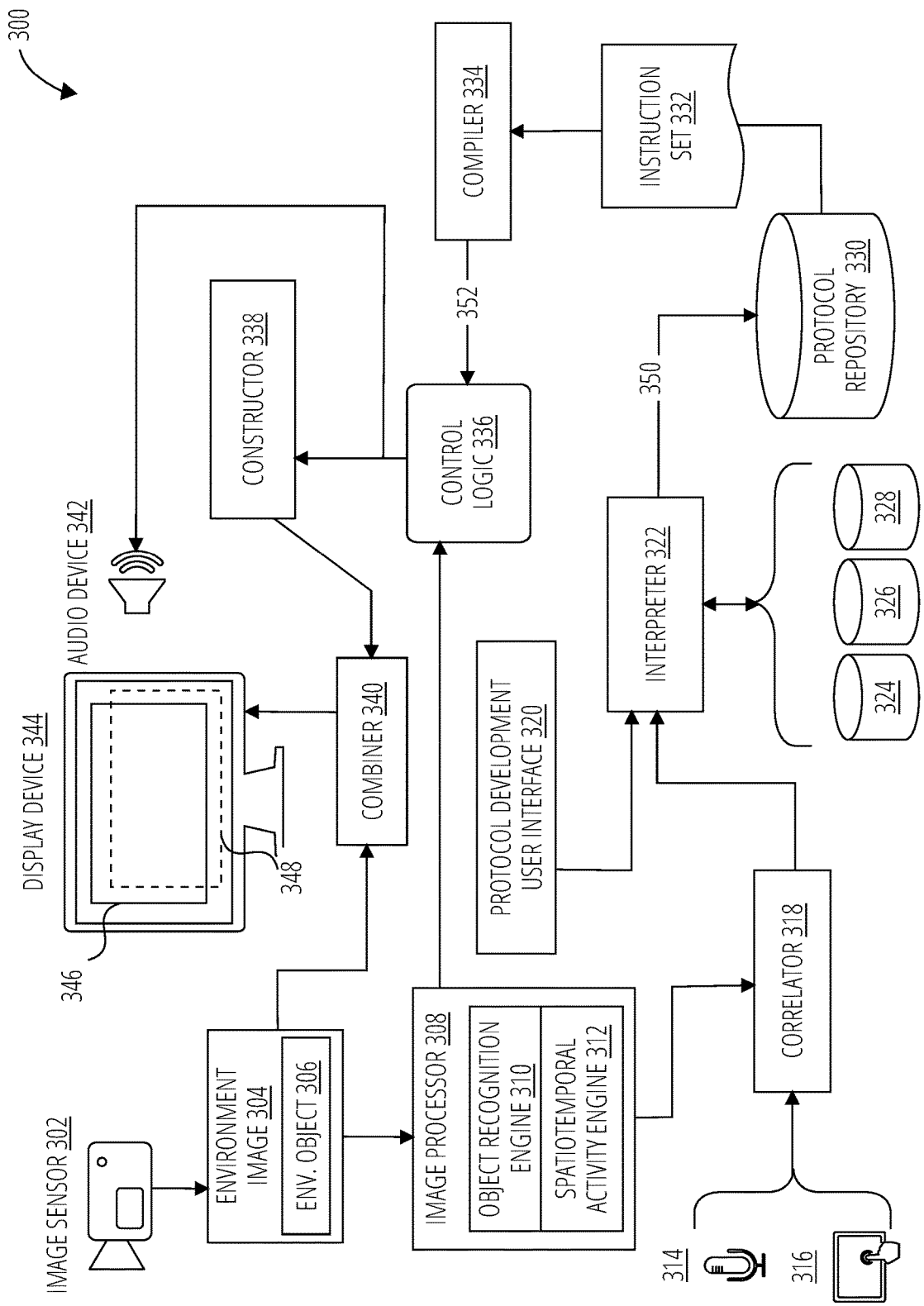
FIG. 3 illustrates a procedural language and content generation system 300 in accordance with one embodiment.

Referencing FIG. 3, the procedural language and content generation system 300 comprises an image sensor 302, an environment image 304 comprising environment objects 306, an image processor 308 comprising an object recognition engine 310 and a spatiotemporal activity engine 312, an audio sensor 314, an input device 316, a correlator 318, a protocol development user interface 320, an interpreter 322, a protocol library 324, a known objects library 326, a declared objects 328, a protocol repository 330 comprising an instruction set 332, a compiler 334, control logic 336, a constructor 338, a combiner 340, an audio device 342, and a display device 344 comprising an environment image layer 346 and an augmented reality layer 348.

The image sensor 302 captures an environment image 304 that includes environment objects 306. The environment image 304 represents a workspace being utilized by an operator of the procedural language and content generation system 300 to generate a guided process or record of a process. The environment image 304 is communicated to an image processor 308. The image processor 308 includes an object recognition engine 310 and a spatiotemporal activity engine 312. The object recognition engine 310 detects environment objects 306 within the environment image 304. The spatiotemporal activity engine 312 tracks movement and position of detected environment objects within the workspace of the environment. The image processor 308 communicates detected environment objects and detected object movement to a correlator 318.

The correlator 318 correlates the detected object movement and the detected environment objects from the image processor 308 to secondary inputs from sources that include, but are not limited to an audio sensor 314 and an input device 316. The correlator 318 communicates the correlation of the detected object movement and the detected environment objects to the interpreter 322. The interpreter 322 transforms detected physical objects and movements of the detected physical objects into programmatic instruction. The interpreter 322 evaluates the correlations against protocols in the protocol library 310, known objects in the known objects library 314, and declared objects 340, to generate programmatic instruction for controlling and operating an augmented reality device.

The interpreter 322 additionally communicates with a protocol development user interface 320. The protocol development user interface 320 communicates input controls that are evaluated against protocols in the protocol library 310, known objects in the known objects library 314, and declared objects 340, to generate programmatic instruction 350 for controlling and operating an augmented reality device.

The interpreter 322 stores the programmatic instruction 350 in a protocol repository 342 as part of an instruction set 332. The instruction set 332 is communicated to a compiler 334. The compiler 334 transforms the programmatic instruction 350 into machine readable instructions for controlling the procedural language and content generation system 300 in the form of executable commands 352. The executable commands 352 are utilized to configure control logic 336. The executable commands 352 are performed by the control logic 336 in response to the detected environment objects and the detected object movements provided by the image processor 308. The executable commands operate an audio device 342 of the procedural language and content generation system 300. The executable commands operate a constructor 338 to generate an augmented reality layer 348. The augmented reality layer 348 is communicated to a combiner 340. The combiner 340 receives the environment image 304 from the spatiotemporal activity engine 312 combines the environment image 304 with the augmented reality layer 348. The combined image is then displayed in a display device 344 with the augmented reality layer 348 overlaid above the environment image layer 346.

Figure 7:
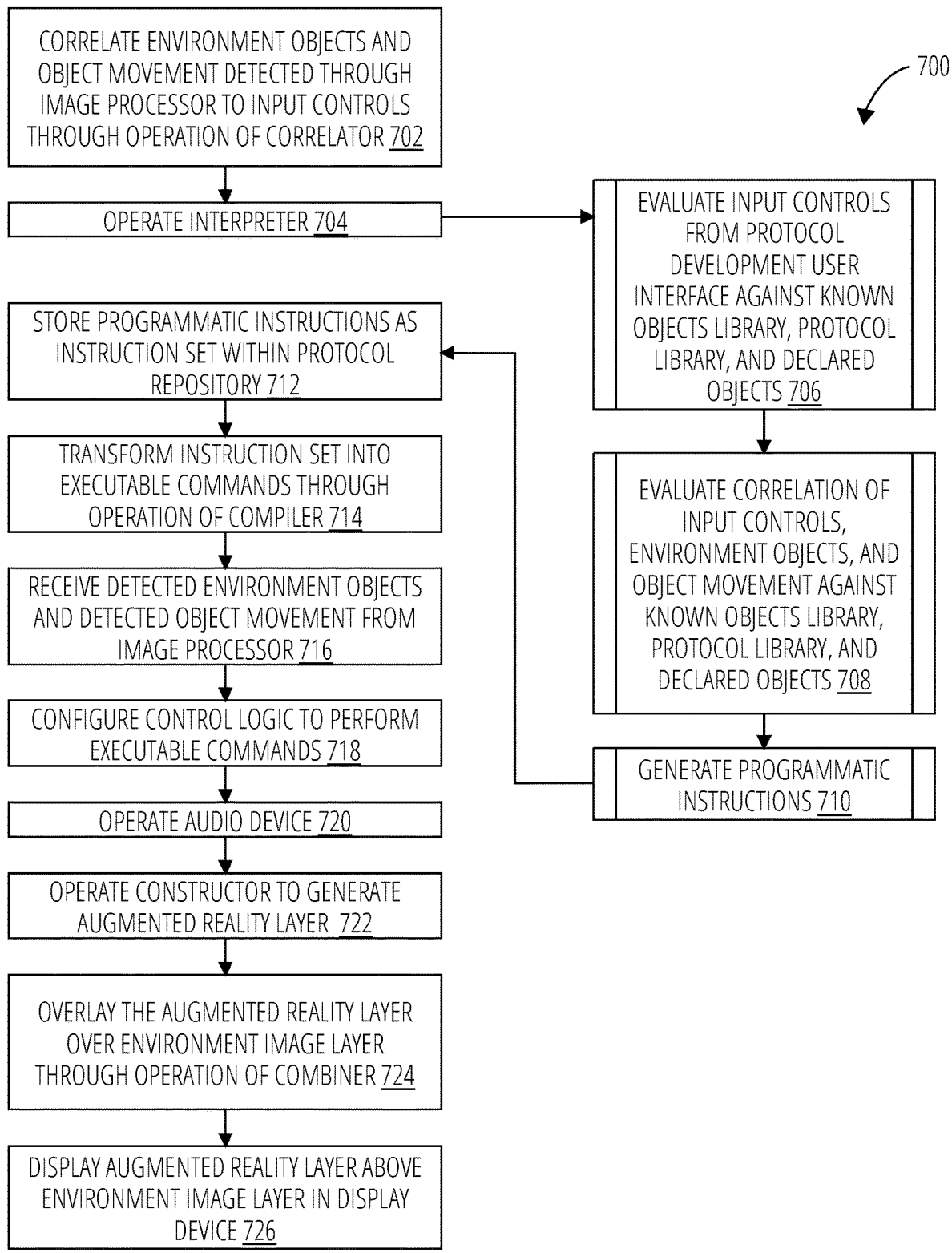
FIG. 7 illustrates a method 700 for operating a procedural language and content generation system in accordance with one embodiment.

The procedural language and content generation system 300 may be operated in accordance with the process described in FIG. 7.

Figure 4:
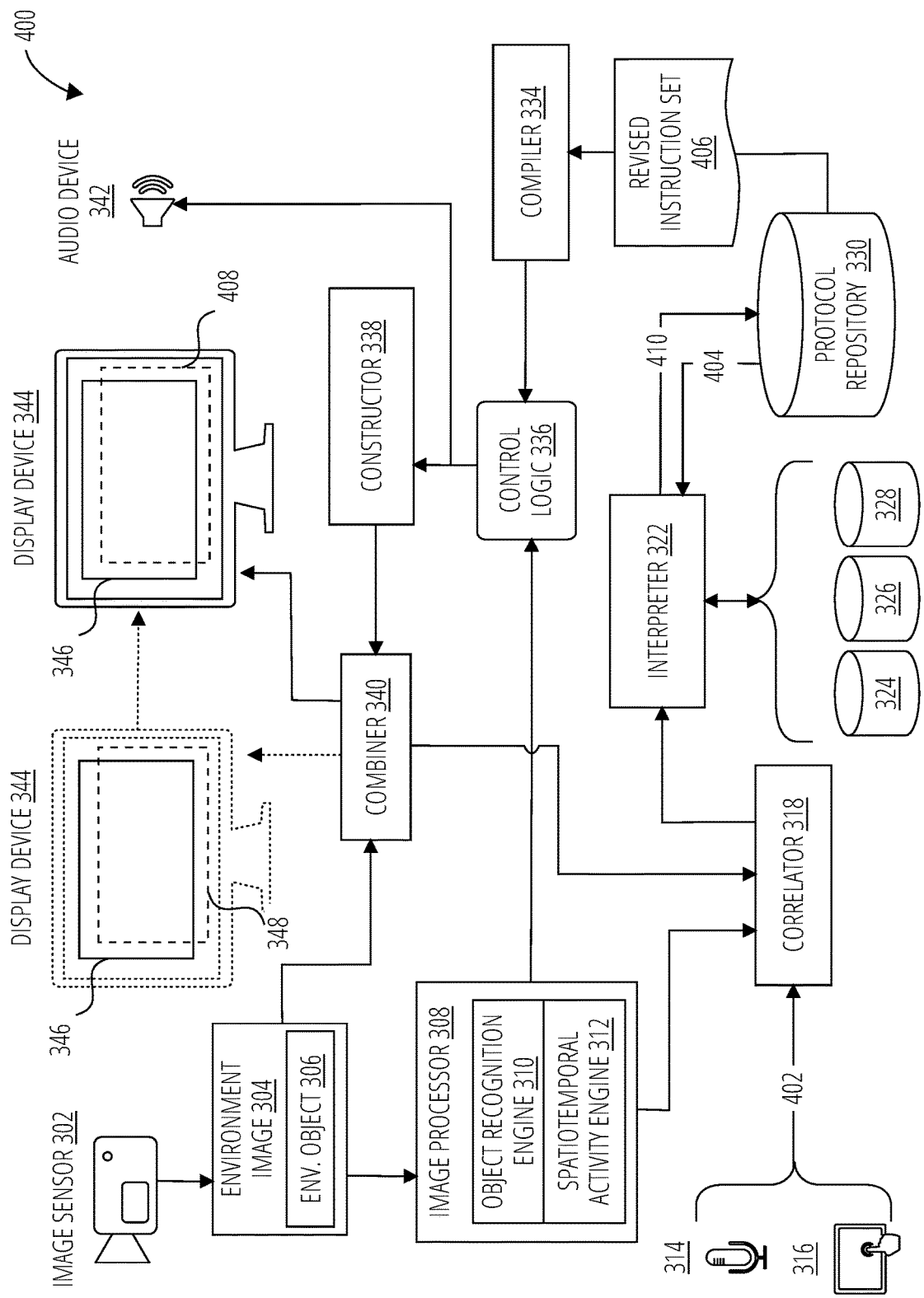
FIG. 4 illustrates a procedural language and content generation system 400 in accordance with one embodiment.

FIG. 4 illustrates an embodiment of a procedural language and content generation system 400 comprising an image sensor 302, an environment image 304 comprising environment objects 306, an image processor 308 comprising an object recognition engine 310 and a spatiotemporal activity engine 312, an audio sensor 314, an input device 316, a correlator 318, a protocol development user interface 320, an interpreter 322, a protocol library 324, a known objects library 326, a declared objects 328, a protocol repository 342 comprising an instruction set 332, a compiler 334, control logic 336, a constructor 338, a combiner 340, an audio device 342, and a display device 344 comprising an environment image layer 346 and an augmented reality layer 348.

In the procedural language and content generation system 400, a user may decide to edit the augmented reality content generated in the procedural language and content generation system 300 while the content is being displayed through the display device 344 and in conjunction with the content captured by the image sensor 302. During playback of the AR content (i.e., augmented reality layer 348 and environment image layer 346), a user may communicate an edit control 402 through the audio sensor 314 and the input device 316 to the correlator 318. The edit control 402 may indicate a modification to an interaction and/or information displayed in the augmented reality layer 348, relative to objects in the environment image layer 346 as it relates to the stored programmatic instructions 404. The edit control 402 allows the interpreter 322 to generate a revised instruction set 406 utilized to generate a revised augmented reality layer 408.

The interpreter 322 reevaluates the correlations against protocols in the protocol library 324, known objects in the known objects library 326, and declared objects 328, to generate revised programmatic instruction 410 for controlling and operating the augmented reality device.

The interpreter 322 stores the revised programmatic instruction 410 in a protocol repository 342 as part of a revised instruction set 406. The revised instruction set 406 is communicated to the compiler 334. The compiler 334 transforms the revised programmatic instruction 410 into machine readable instructions for controlling the procedural language and content generation system 400 in the form of executable commands. The executable commands are utilized to configure control logic 336. The executable commands are performed by the control logic 336 in response to the detected environment objects and the detected object movements provided by the image processor 308. The executable commands operate an audio device 342 of the procedural language and content generation system 400. The executable commands operate a constructor 338 to generate an augmented reality layer. The augmented reality layer is communicated to a combiner 340. The combiner 340 receives the environment image 304 from the spatiotemporal activity engine 312 combines the environment image 304 with the revised augmented reality layer 408. The combined image is then displayed in a display device 344 with the revised augmented reality layer 408 overlaid above the environment image layer 346.

Figure 8:
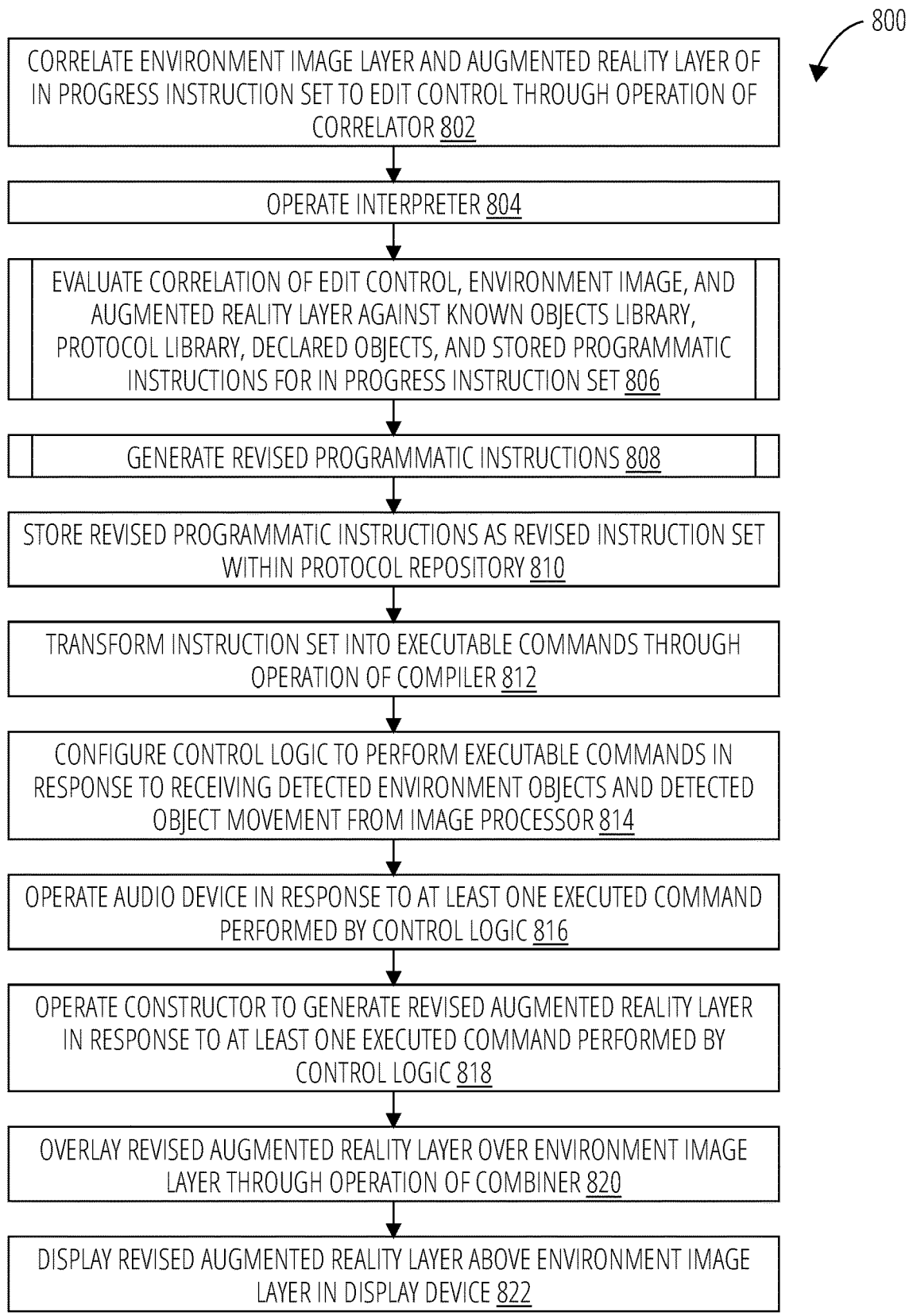
FIG. 8 illustrates a method 800 in accordance with one embodiment.

The procedural language and content generation system 400 may be operated in accordance with the process described in FIG. 8.

Figure 5:
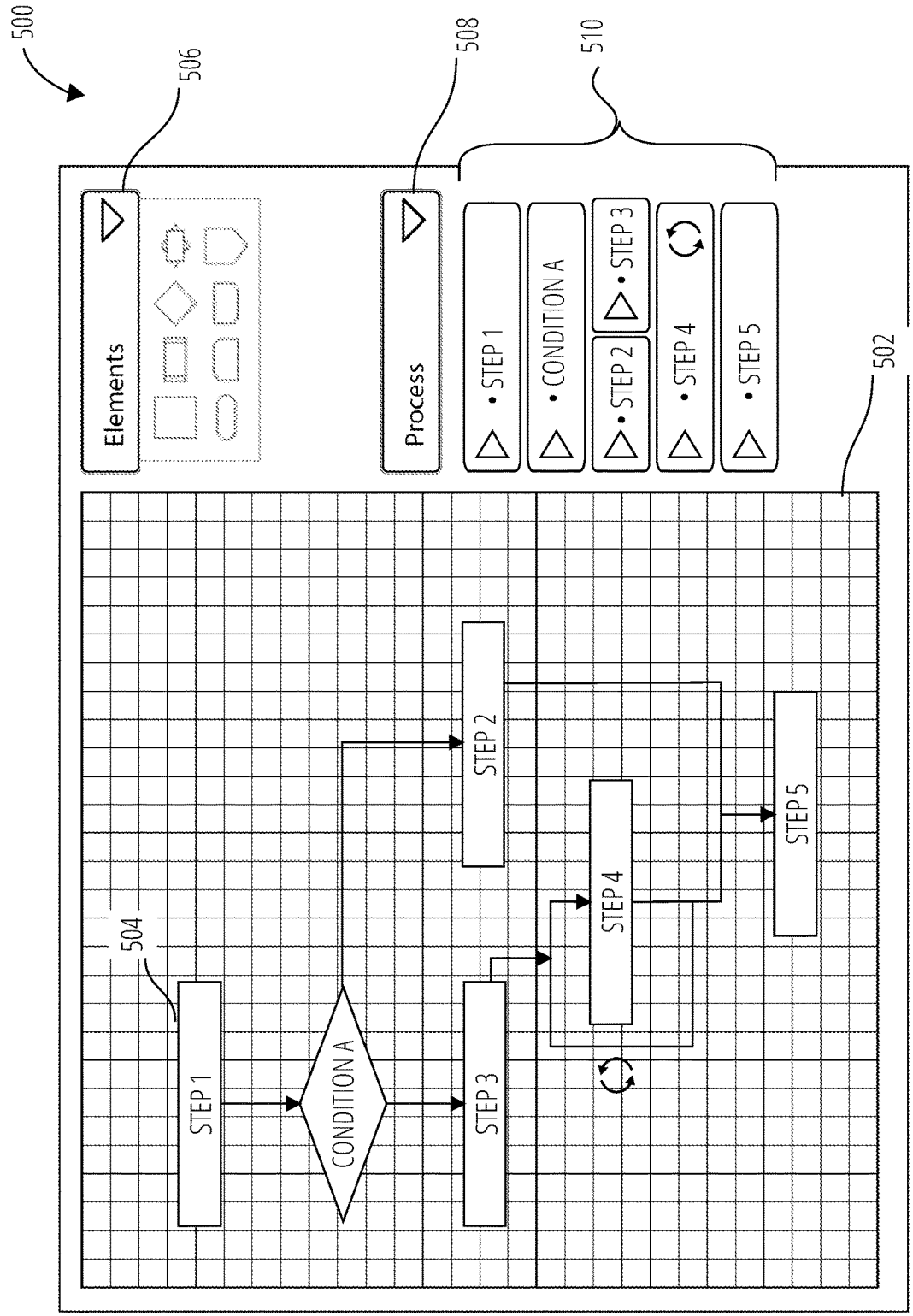
FIG. 5 illustrates a protocol development user interface 500 in accordance with one embodiment.

Referencing FIG. 5, a protocol development user interface 500 may comprise a drawing canvas 502, a process step 504, a process element menu 506, a process outline 508, and a process outline steps 510. In some configurations, a user may utilize a protocol development user interface 500 to generate procedural language content for an augmented reality system. The protocol development user interface 500 may allow users to generate a flow diagram in a drawing canvas 502 illustrating a different process step 504 of an outline process. The user may edit add additional process elements by selecting them from a process element menu 506. The process may be summarized in a process outline 508 for the user that may also allow the user to modify the process at high level by moving around individual process outline steps 510 in the process outline 508.

Figure 6:
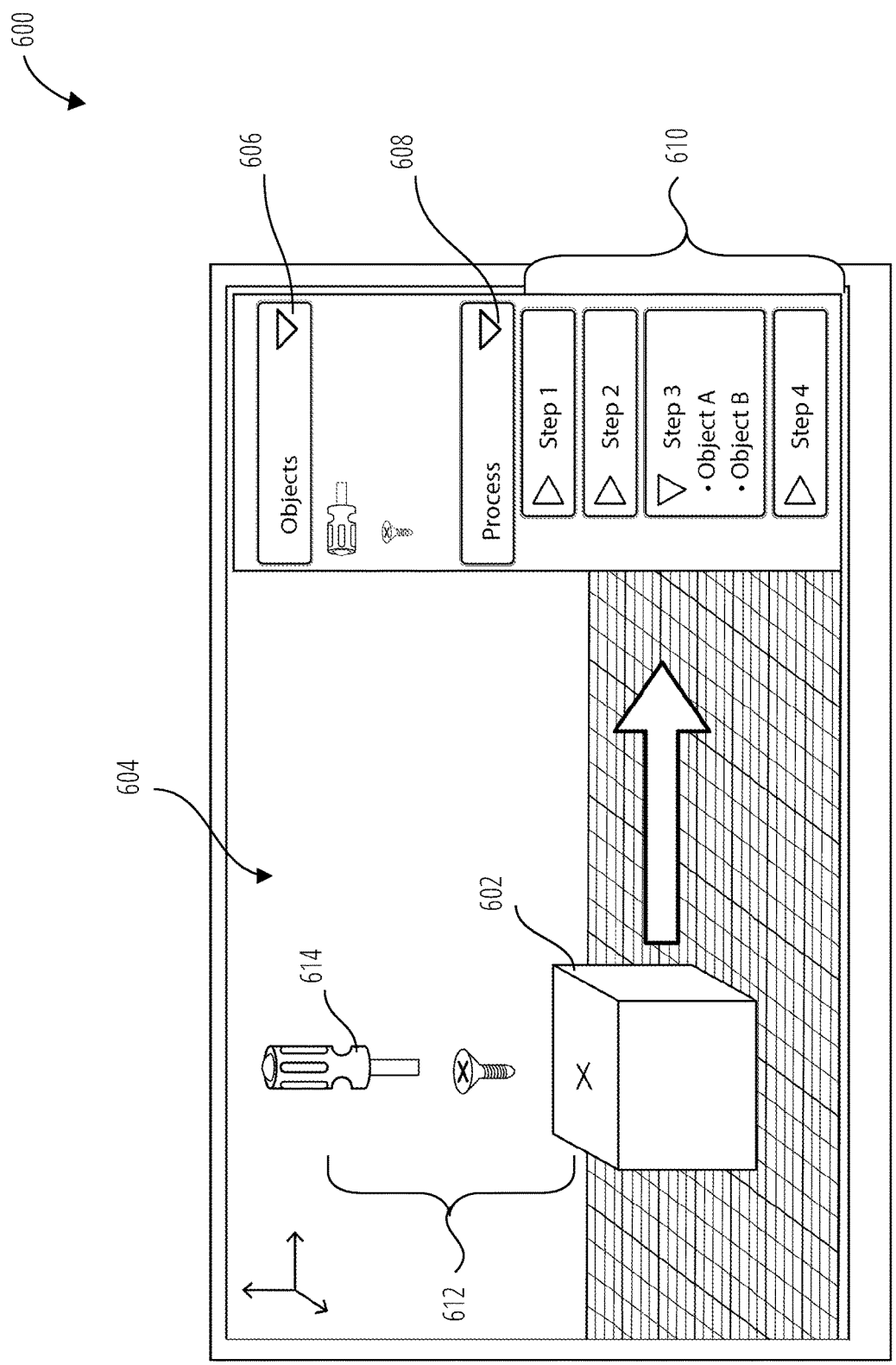
FIG. 6 illustrates a protocol development user interface 600 with a three-dimensional protocol workflow in accordance with one embodiment.

Referencing FIG. 6, the protocol development user interface 600 comprise an environment objects 602, a three dimensional environment 604, an environment objects menu 606, a process outline 608, a process outline steps 610, a process step 612, and an environment objects 614.

A 3D editor which displays a library of objects captured from the headset (or from a standard library).

Steps are created by selecting objects from the library (which have already been pre segmented).

The selected objects appear in a virtual 3D workspace.

Instructions can be added to each step and visual cues can and annotations can be drawn.

These annotations stay in place relative to the object (i.e., if the object is in a different spot when the instructions are played, they would stay in the same relative position to where they were drawn in the IDE) or objects (i.e., an arrow between two objects would still go between the two objects in any position).

Virtual hands could be placed in the workspace as a direction to users on how to hold or manipulate objects.

The above editors could be integrated to allow step editing (3D editor) and inter-step process flow editing.

The GUI-based editor could have an interactive code window which shows the generated markup language or procedural code as changes are being made in the flow-chart or 3D editors.

The GUI-based editor could also have an interactive visual dependency manager.

Referencing FIG. 7, a method 700 for operating a procedural language and content generation system involves operating a correlator to correlate environment objects and object movement detected through an image processor to input controls (block 702). In block 704, the method 700 operates an interpreter. In subroutine block 706, the correlator evaluates input controls from a protocol development user interface against a known objects library, a protocol library, and a declared objects. In subroutine block 708, the correlator evaluates correlation of the input controls, the environment objects, and the object movement against the known objects library, the protocol library, and the declared objects. In subroutine block 710, the correlator generates programmatic instructions. In block 712, the method 700 stores the programmatic instructions as an instruction set within a protocol repository. In block 714, the method 700 transforms the instruction set into executable commands through operation of a compiler. In block 716, the control logic receives detected environment objects and detected object movement from an image processor. In block 718, the method 700 configures the control logic to perform the executable commands. In block 720, the control logic operates an audio device. In block 722, the control logic operates a constructor to generate an augmented reality layer. In block 724, the method 700 overlays the augmented reality layer over an environment image layer through operation of a combiner. In block 726, the method 700 displays the augmented reality layer above the environment image layer in a display device.

Referencing FIG. 8, In block 802, the method 800 correlates the environment image layer and the augmented reality layer of an in progress instruction set to an edit control through operation of the correlator (block 802). In block 804, the method 800 operates the interpreter. In subroutine block 806, the method 800 operates the interpreter to evaluate correlation of the edit control, the environment image, and the augmented reality layer against the known objects library, the protocol library, the declared objects, and stored programmatic instructions for the in progress instruction set.

In subroutine block 808, method 800 operates the interpreter to generate revised programmatic instructions. In block 810, the method 800 stores the revised programmatic instructions as a revised instruction set within the protocol repository. In block 812, the method 800 transforms the instruction set into the executable commands through operation of the compiler.

In block 814, the method 800 configures the control logic to perform the executable commands in response to receiving the detected environment objects and the detected object movement from the image processor. In block 816, the method 800 operates the audio device in response to the at least one executed command performed by the control logic. In block 818, the method 800 operates the constructor to generate a revised augmented reality layer in response to the at least one executed command performed by the control logic.

In block 820, the method 800 overlays the revised augmented reality layer over the environment image layer through operation of the combiner. In block 822, the method 800 displays the revised augmented reality layer above the environment image layer in the display device.

To identify specific objects, the system may utilize deterministic object recognition to identify manners in which objects differ from one another, for example in their overall dimensions, in particular their three-dimensional shapes (contours), and by other distinguishable characteristics, homogeneously distributed over the surface, or surface characteristics that differ from place to place such as surface markings and features. Examples include surface colors, albedos, and textures. Object characteristics are not limited to those detectable by the visual light portion of the electromagnetic spectrum or even electromagnetism itself. The combination of dimensions, shapes, other distinguishable attributes (dimensions, shape, and surface image features, radar cross section, reflectivity at various acoustical frequencies, near-infared albedo, etc.) may be sufficient to allow explicit identification of different specific objects.

Convolutional neural networks (s) are particularly well suited to classifying features in data sets modelled in two or three dimensions. This fact makes CNNs popular for image classification, because images can be represented in computer memories in three dimensions (two dimensions for width and height, and a third dimension for pixel features like color components and intensity). For example a color JPEG image of size 480×480 pixels can be modelled in computer memory using an array that is 480×480×3, where each of the values of the third dimension is a red, green, or blue color component intensity for the pixel ranging from 0 to 255. Inputting this array of numbers to a trained CNN will generate outputs that describe the probability of the image being a certain class (0.80 for cat, 0.15 for dog, 0.05 for bird, etc). Image classification is the task of taking an input image and outputting a class (a cat, dog, etc) or a probability of classes that best describes the image. Fundamentally, CNNs input the data set, pass it through a series of convolutional transformations, nonlinear activation functions (e.g., RELU), and pooling operations (downsampling, e.g., Maxpool), and an output layer (e.g., Softmax) to generate the classifications.

Other approaches to identifying and classifying features in image data and three dimensional data are deterministic. To classify and identify objects, these methods use ways that objects differ from one another: in their overall dimensions, in particular their three dimensional shapes, and by other distinguishable characteristics, homogeneously distributed over the surface, or differing from place to place on the surface (e.g., surface markings and features). These include surface colors, albedos, and textures. These characteristics are not limited to those detectable by the visual light portion of the EM spectrum.

Figure 9:
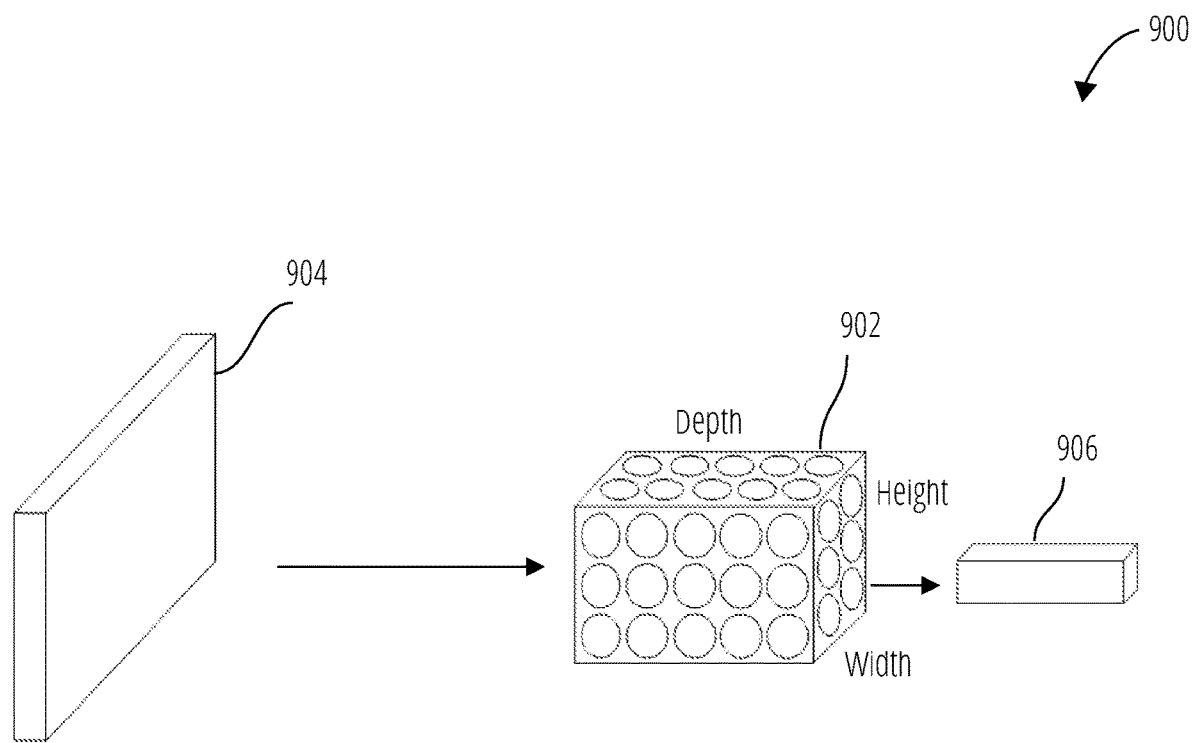
FIG. 9 illustrates a convolutional neural network 900 in accordance with one embodiment.

FIG. 9 illustrates an exemplary convolutional neural network 900. The convolutional neural network 900 arranges its neurons in three dimensions (width, height, depth), as visualized in convolutional layer 902. Every layer of the convolutional neural network 900 transforms a 3D volume of inputs to a 3D output volume of neuron activations. In this example, the input layer 904 encodes the image, so its width and height would be the dimensions of the image, and the depth would be 3 (Red, Green, Blue channels). The convolutional layer 902 further transforms the outputs of the input layer 904, and the output layer 906 transforms the outputs of the convolutional layer 902 into one or more classifications of the image content.

Figure 10:
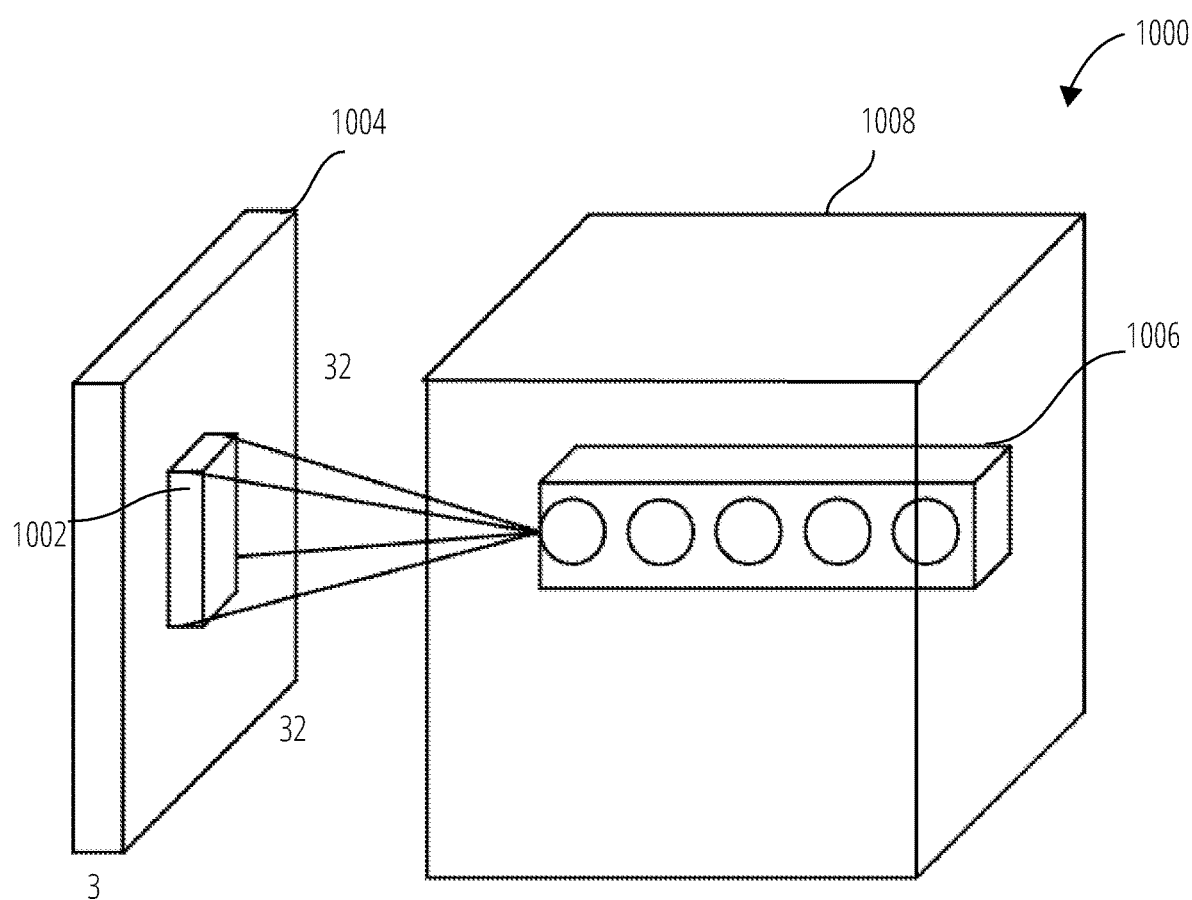
FIG. 10 illustrates a convolutional neural network layers 1000 in accordance with one embodiment.

FIG. 10 illustrates an exemplary convolutional neural network layers 1000 in more detail. An example subregion of the input layer region 1002 of an input layer region 1004 region of an image is analyzed by a set of convolutional layer subregion 1006 in the convolutional layer 1008. The input layer region 1004 is 32×32 neurons long and wide (e.g., 32×32 pixels), and three neurons deep (e.g., three color channels per pixel). Each neuron in the convolutional layer 1008 is connected only to a local region in the input layer region 1004 spatially (in height and width), but to the full depth (i.e. all color channels if the input is an image). Note, there are multiple neurons (5 in this example) along the depth of the convolutional layer subregion 1006 that analyzes the subregion of the input layer region 1002 of the input layer region 1004, in which each neuron of the convolutional layer subregion 1006 may receive inputs from every neuron of the subregion of the input layer region 1002.

Figure 11:
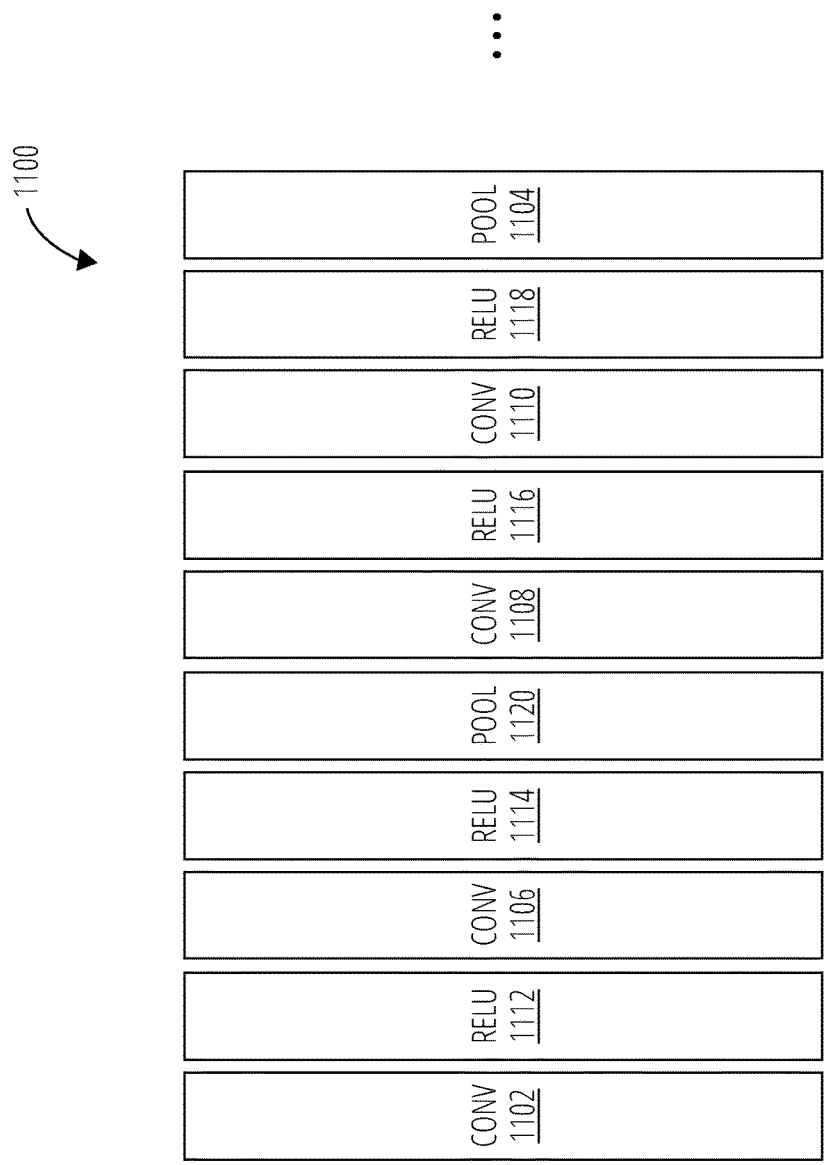
FIG. 11 illustrates a VGG net 1100 in accordance with one embodiment.

FIG. 11 illustrates a popular form of a CNN known as a VGG net 1100. The initial convolution layer 1102 stores the raw image pixels and the final pooling layer 1104 determines the class scores. Each of the intermediate convolution layers (convolution layer 1106, convolution layer 1108, and convolution layer 1110) and rectifier activations (RELU layer 1112, RELUlayer 1114, RELUlayer 1116, and RELUlayer 1118) and intermediate pooling layers (pooling layer 1120, pooling layer 1104) along the processing path is shown as a column.

The VGG net 1100 replaces the large single-layer filters of basic CNNs with multiple 3×3 sized filters in series. With a given receptive field (the effective area size of input image on which output depends), multiple stacked smaller size filters may perform better at image feature classification than a single layer with a larger filter size, because multiple non-linear layers increase the depth of the network which enables it to learn more complex features. In a VGG net 1100 each pooling layer may be only 2×2.

Figure 12:
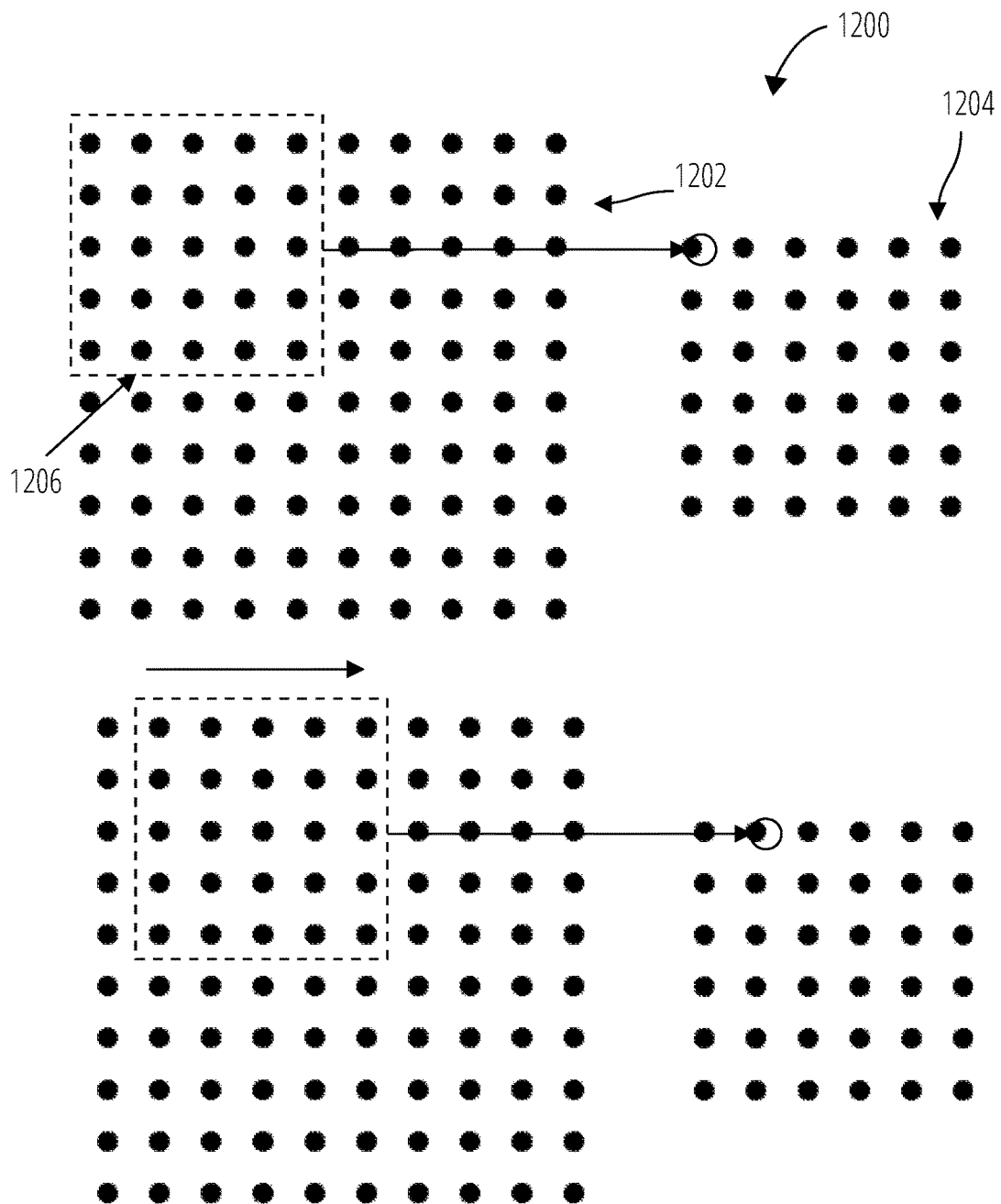
FIG. 12 illustrates a convolution layer filtering 1200 in accordance with one embodiment.

FIG. 12 illustrates a convolution layer filtering 1200 that connects the outputs from groups of neurons in a convolution layer 1202 to neurons in a next layer 1204. A receptive field is defined for the convolution layer 1202, in this example sets of 5×5 neurons. The collective outputs of each neuron the receptive field are weighted and mapped to a single neuron in the next layer 1204. This weighted mapping is referred to as the filter 1206 for the convolution layer 1202 (or sometimes referred to as the kernel of the convolution layer 1202). The filter 1206 depth is not illustrated in this example (i.e., the filter 1206 is actually a cubic volume of neurons in the convolution layer 1202, not a square as illustrated). Thus, what is shown is a "slice" of the full filter 1206. The filter 1206 is slid, or convolved, around the input image, each time mapping to a different neuron in the next layer 1204. For example, FIG. 12 shows how the filter 1206 is stepped to the right by 1 unit (the "stride"), creating a slightly offset receptive field from the top one, and mapping its output to the next neuron in the next layer 1204. The stride can be and often is other numbers besides one, with larger strides reducing the overlaps in the receptive fields, and hence further reducing the size of the next layer 1204. Every unique receptive field in the convolution layer 1202 that can be defined in this stepwise manner maps to a different neuron in the next layer 1204. Thus, if the convolution layer 1202 is 32×32×3 neurons per slice, the next layer 1204 need only be 28×28×1 neurons to cover all the receptive fields of the convolution layer 1202. This is referred to as an activation map or feature map. There is thus a reduction in layer complexity from the filtering. There are 784 different ways that a 5×5 filter can uniquely fit on a 32×32 convolution layer 1202, so the next layer 1204 need only be 28×28. The depth of the convolution layer 1202 is also reduced from 3 to 1 in the next layer 1204.

The number of total layers to use in a CNN, the number of convolution layers, the filter sizes, and the values for strides at each layer are examples of "hyperparameters" of the CNN.

Figure 13:
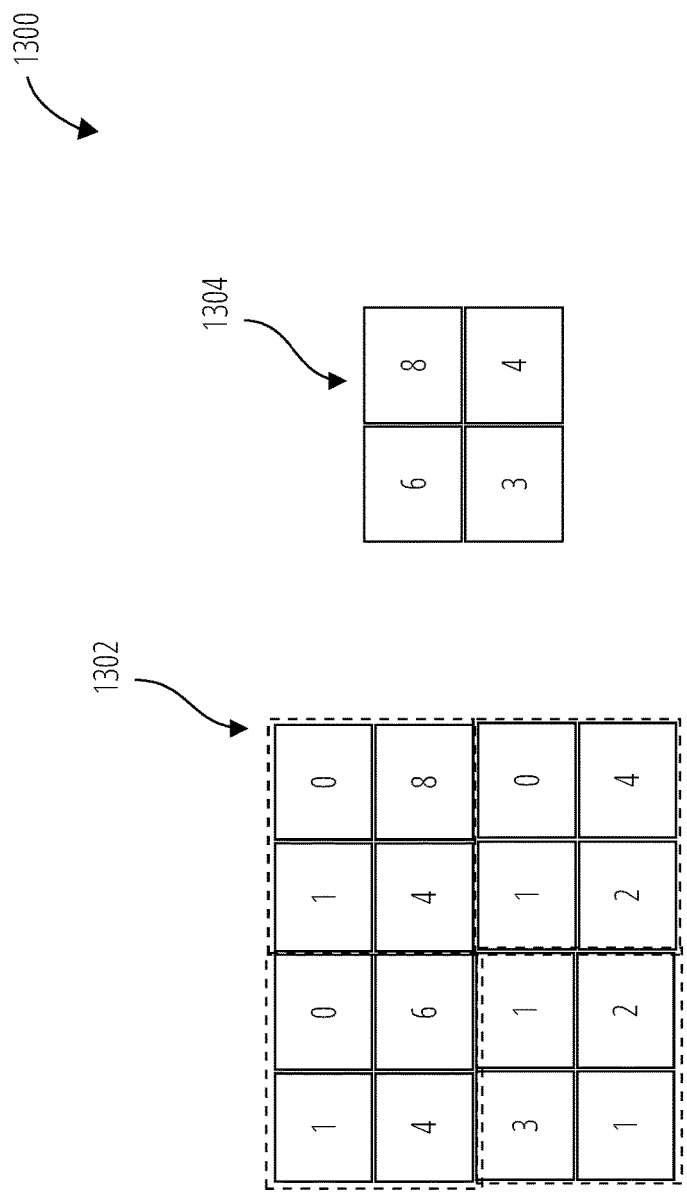
FIG. 13 illustrates a pooling layer function 1300 in accordance with one embodiment.

FIG. 13 illustrates a pooling layer function 1300 with a 2×2 receptive field and a stride of two. The pooling layer function 1300 is an example of the maxpool pooling technique. The outputs of all the neurons in a particular receptive field of the input layer 1302 are replaced by the maximum valued one of those outputs in the pooling layer 1304. Other options for pooling layers are average pooling and L2-norm pooling. The reason to use a pooling layer is that once a specific feature is recognized in the original input volume (there will be a high activation value), its exact location is not as important as its relative location to the other features. Pooling layers can drastically reduce the spatial dimension of the input layer 1302 from that pont forward in the neural network (the length and the width change but not the depth). This serves two main purposes. The first is that the amount of parameters or weights is greatly reduced thus lessening the computation cost. The second is that it will control overfitting. Overfitting refers to when a model is so tuned to the training examples that it is not able to generalize well when applied to live data sets.

Figure 14:
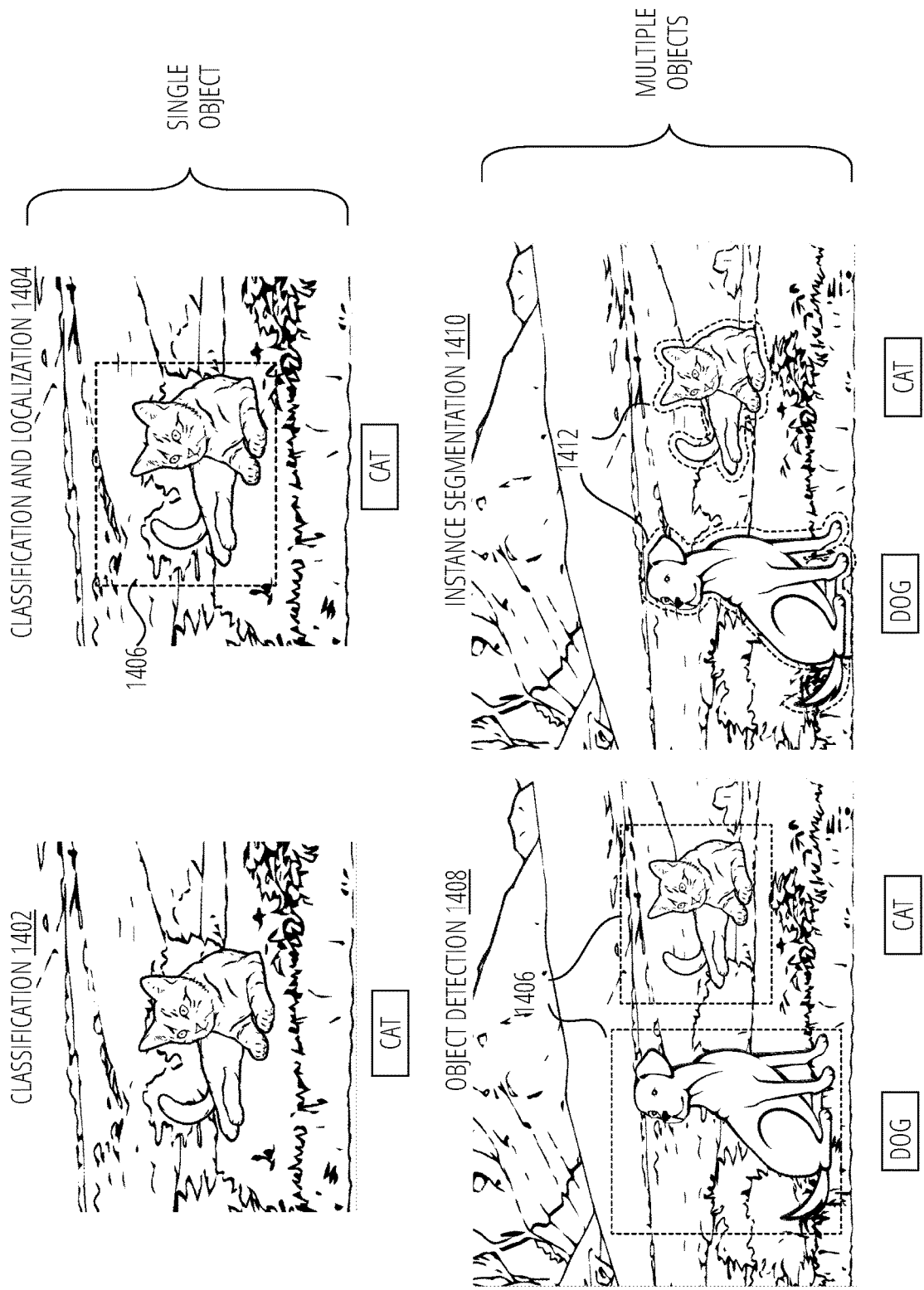
FIG. 14 illustrates a comparison between image classification, object detection, and instance segmentation.

FIG. 14 illustrates a comparison between image classification, object detection, and instance segmentation. When a single object is in an image, the classification model 1402 may be utilized to identify what is in the image. For instance, the classification model 1402 identifies that a cat is in the image. In addition to the classification model 1402, a classification and localization model 1404 may be utilized to classify and identify the location of the cat within the image with a bounding box 1406. When multiple objects are present within an image, an object detection model 1408 may be utilized. The object detection model 1408 utilizes bounding boxes to classify and locate the position of the different objects within the image. An instance segmentation model 1410 detects each object of an image, its localization and its precise segmentation by pixel with a segmentation region 1412.

The Image classification models classify images into a single category, usually corresponding to the most salient object. Photos and videos are usually complex and contain multiple objects. This being said, assigning a label with image classification models may become tricky and uncertain. Object detection models are therefore more appropriate to identify multiple relevant objects in a single image. The second significant advantage of object detection models versus image classification ones is that localization of the objects may be provided.

Some of the models and algorithms that may be utilized to perform image classification, object detection, and instance segmentation include but are not limited to, deterministic methods, Region-based Convolutional Network (R-CNN), Fast Region-based Convolutional Network (Fast R-CNN), Faster Region-based Convolutional Network (Faster R-CNN), Region-based Fully Convolutional Network (R-FCN), You Only Look Once (YOLO), Single-Shot Detector (SSD), Neural Architecture Search Net (NASNet), and Mask Region-based Convolutional Network (Mask R-CNN).

These models may utilize a variety of training datasets that include but are not limited to PASCAL Visual Object Classification (PASCAL VOC) and Common Objects in COntext (COCO) datasets.

The PASCAL Visual Object Classification (PASCAL VOC) dataset is a well-known dataset for object detection, classification, segmentation of objects and so on. There are around 10 000 images for training and validation containing bounding boxes with objects. Although, the PASCAL VOC dataset contains only 20 categories, it is still considered as a reference dataset in the object detection problem.

ImageNet has released an object detection dataset since 2013 with bounding boxes. The training dataset is composed of around 500 000 images only for training and 200 categories.

The Common Objects in COntext (COCO) datasets were developed by Microsoft. This dataset is used for caption generation, object detection, key point detection and object segmentation. The COCO object detection consists in localizing the objects in an image with bounding boxes and categorizing each one of them between 80 categories.

Figure 15:
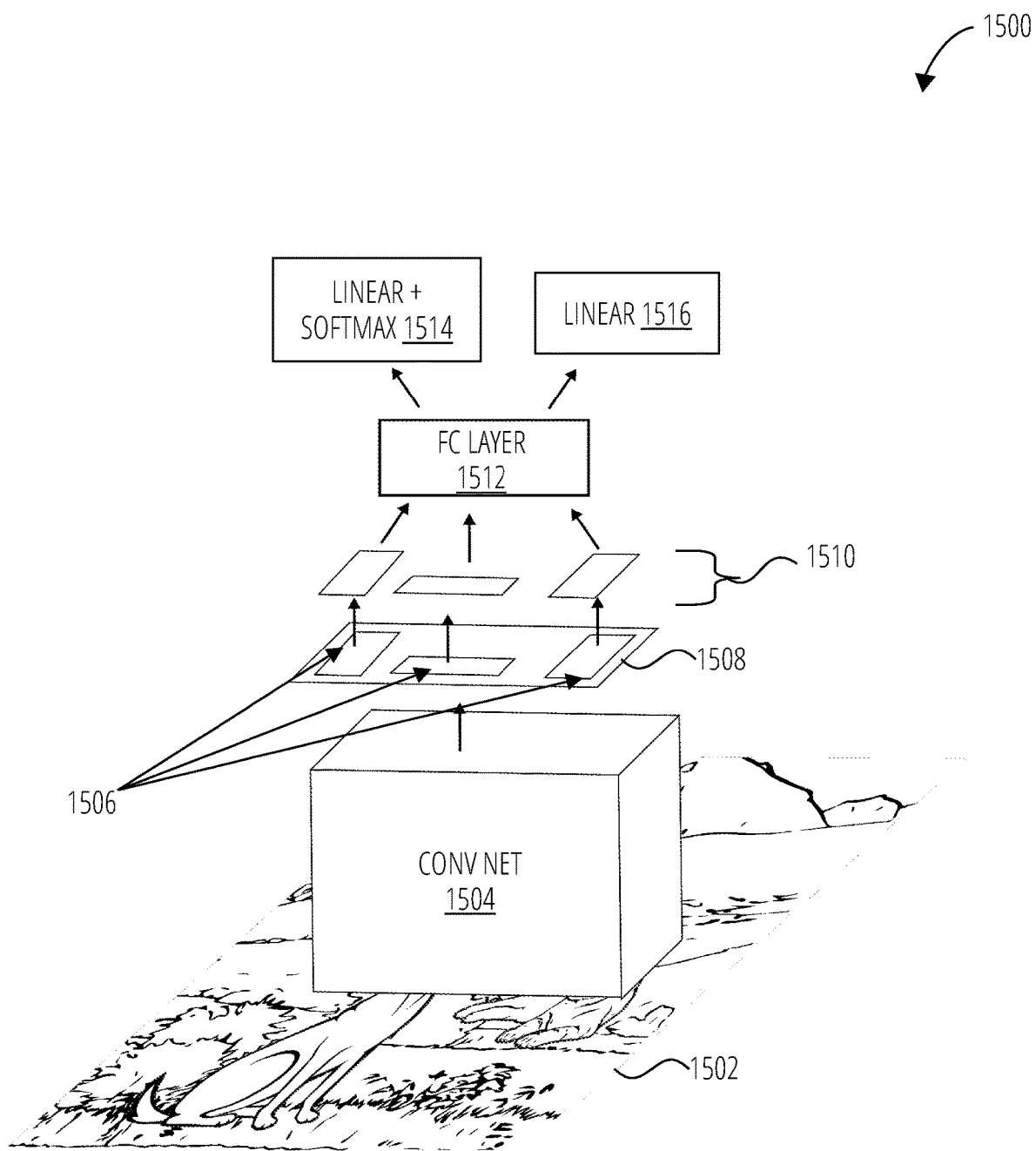
FIG. 15 illustrates a Fast Region-based Convolutional Network 1500.

FIG. 15 illustrates an example of a Fast Region-based Convolutional Network 1500 (Fast R-CNN). The entire image (input image 1502) feeds a CNN model (convolutional neural network 1504) to detect RoI (ROI 1506) on the feature maps 1508. Each region is separated using a RoI pooling layer (ROI pooling layer 1510) and it feeds fully connected layers 1512. This vector is used by a softmax classifier 1514 to detect the object and by a bounding box linear regressors 1516 to modify the coordinates of the bounding box. The purpose of the Fast R-CNN is to reduce the time consumption related to the high number of models necessary to analyze all region proposals.

A main CNN with multiple convolutional layers is taking the entire image as input instead of using a CNN for each region proposals (R-CNN). Region of Interests (RoIs) are detected with the selective search method applied on the produced feature maps. Formally, the feature maps size is reduced using a RoI pooling layer to get valid Region of Interests with fixed height and width as hyperparameters. Each RoI layer feeds fully-connected layers creating a features vector. The vector is used to predict the observed object with a softmax classifier and to adapt bounding box localizations with a linear regressor.

Figure 16:
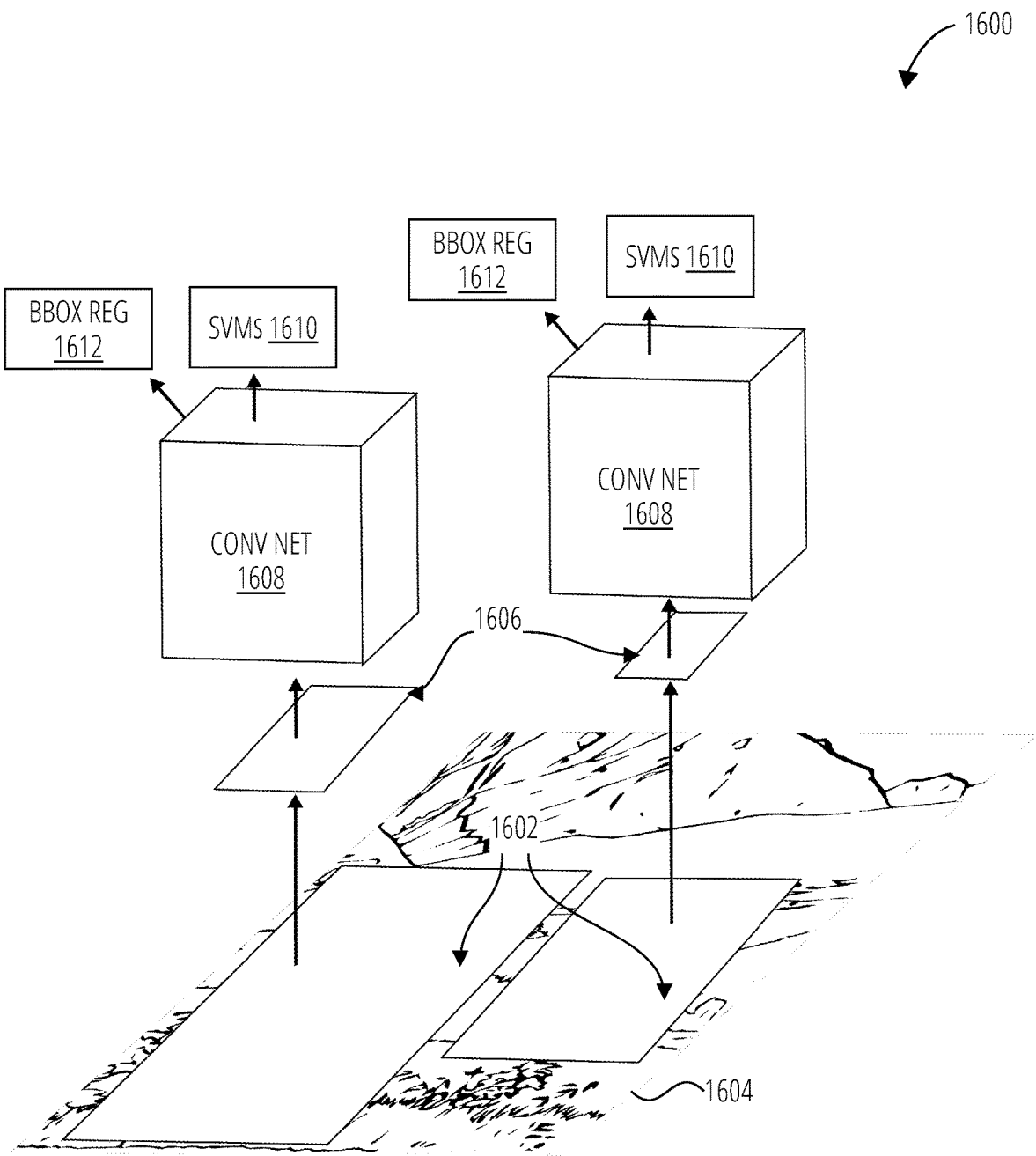
FIG. 16 illustrates a Region-based Convolution Network 1600.

FIG. 16 illustrates an example of a Region-based Convolution Network 1600 (R-CNN). Each region proposal feeds a convolutional neural network (CNN) to extract a features vector, possible objects are detected using multiple SVM classifiers and a linear regressor modifies the coordinates of the bounding box. The regions of interest (ROI 1602) of the input image 1604. Each ROI 1602 of resized/warped creating the warped image region 1606 which are forwarded to the convolutional neural network 1608 where they are feed to the support vector machines 1610 and bounding box linear regressors 1612.

In R-CNN, the selective search method is an alternative to exhaustive search in an image to capture object location. It initializes small regions in an image and merges them with a hierarchical grouping. Thus the final group is a box containing the entire image. The detected regions are merged according to a variety of color spaces and similarity metrics. The output is a number of region proposals which could contain an object by merging small regions.

The R-CNN model combines the selective search method to detect region proposals and deep learning to find out the object in these regions. Each region proposal is resized to match the input of a CNN from which the method extracts a 4096-dimension vector of features. The features vector is fed into multiple classifiers to produce probabilities to belong to each class. Each one of these classes has a support vector machines 1610 (SVM) classifier trained to infer a probability to detect this object for a given vector of features. This vector also feeds a linear regressor to adapt the shapes of the bounding box for a region proposal and thus reduce localization errors.

The CNN model described is trained on the ImageNet dataset. It is fine-tuned using the region proposals corresponding to an IoU greater than 0.5 with the ground-truth boxes. Two versions are produced, one version is using the PASCAL VOC dataset and the other the ImageNet dataset with bounding boxes. The SVM classifiers are also trained for each class of each dataset.

Figure 17:
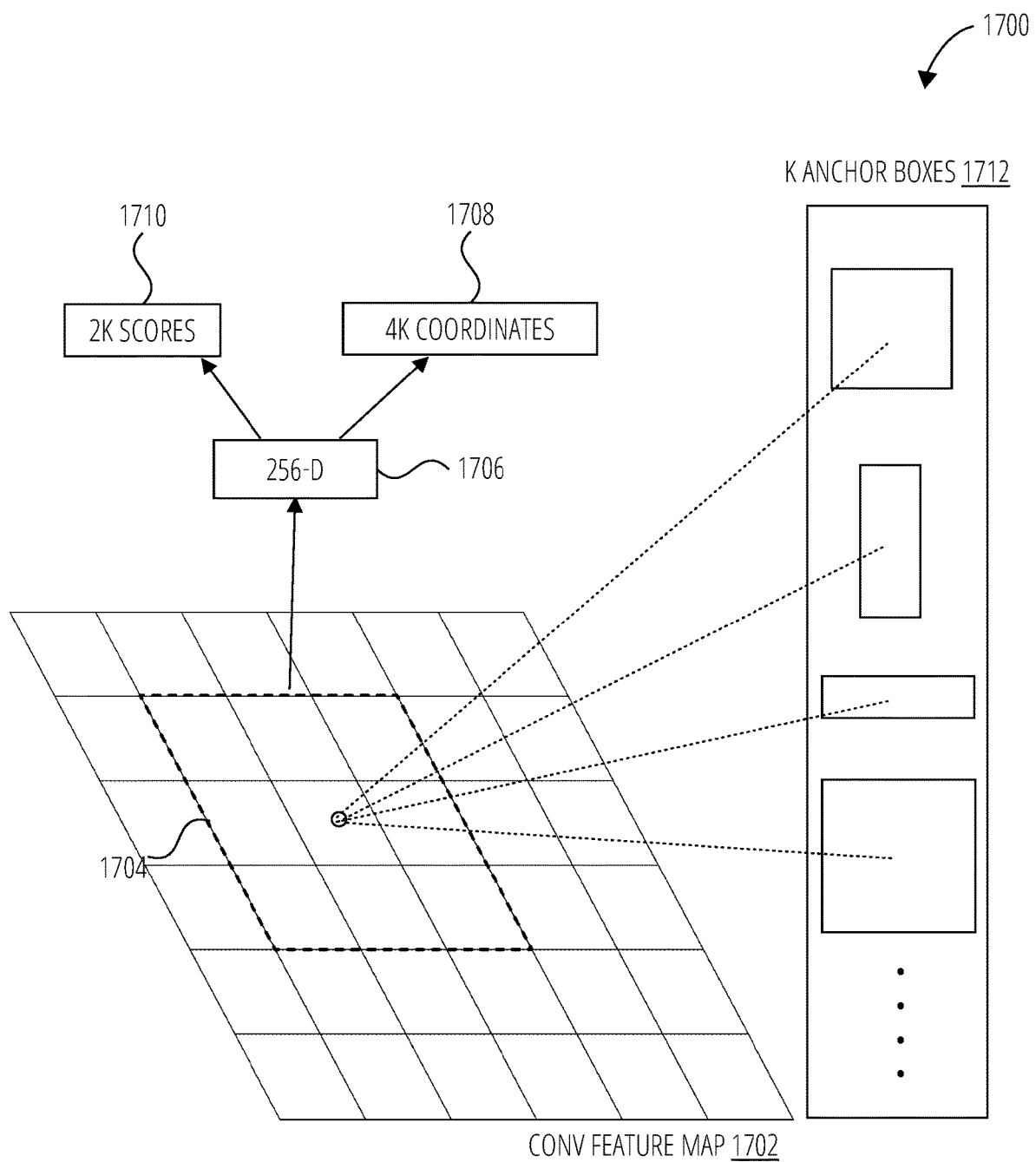
FIG. 17 illustrates a Faster Region-based Convolutional Network 1700.

FIG. 17 illustrates an example of a Faster Region-based Convolutional Network 1700 (Faster R-CNN).

Region proposals detected with the selective search method were still necessary in the previous model, which is computationally expensive. Region Proposal Network (RPN) was introduced to directly generate region proposals, predict bounding boxes and detect objects. The Faster R-CNN is a combination between the RPN and the Fast R-CNN model.

A CNN model takes as input the entire image and produces feature map 1702. A window of size 3×3 (sliding window 1704) slides all the feature maps and outputs a features vector (intermediate layer 1706) linked to two fully-connected layers, one for box-regression and one for box-classification. Multiple region proposals are predicted by the fully-connected layers. A maximum of k regions is fixed thus the output of the box regression layer 1708 has a size of 4 k (coordinates of the boxes, their height and width) and the output of the box classification layer 1710 a size of 2 k ("objectness" scores to detect an object or not in the box). The k region proposals detected by the sliding window are called anchors.

When the anchor boxes 1712 are detected, they are selected by applying a threshold over the "objectness" score to keep only the relevant boxes. These anchor boxes and the feature maps computed by the initial CNN model feeds a Fast R-CNN model.

The entire image feeds a CNN model to produce anchor boxes as region proposals with a confidence to contain an object. A Fast R-CNN is used taking as inputs the feature maps and the region proposals. For each box, it produces probabilities to detect each object and correction over the location of the box.

Faster R-CNN uses RPN to avoid the selective search method, it accelerates the training and testing processes, and improve the performances. The RPN uses a pre-trained model over the ImageNet dataset for classification and it is fine-tuned on the PASCAL VOC dataset. Then the generated region proposals with anchor boxes are used to train the Fast R-CNN. This process is iterative.

Region-Based Fully Convolutional Network (R-FCN)

Fast and Faster R-CNN methodologies consist in detecting region proposals and recognize an object in each region. The Region-based Fully Convolutional Network (R-FCN) is a model with only convolutional layers allowing complete backpropagation for training and inference. The method merged the two basic steps in a single model to take into account simultaneously the object detection (location invariant) and its position (location variant).

A ResNet-101 model takes the initial image as input. The last layer outputs feature maps, each one is specialized in the detection of a category at some location. For example, one feature map is specialized in the detection of a cat, another one in a banana and so on. Such feature maps are called position-sensitive score maps because they take into account the spatial localization of a particular object. It consists of $k*k*(C+1)$ score maps where k is the size of the score map, and C the number of classes. All these maps form the score bank. Basically, we create patches that can recognize part of an object. For example, for k=3, we can recognize 3×3 parts of an object.

In parallel, the method runs a RPN to generate Region of Interest (RoI). Finally, the method cuts each RoI in bins and checks them against the score bank. If enough of these parts are activated, then the patch vote 'yes', I recognized the object.

You Only Look Once (YOLO)

The YOLO model directly predicts bounding boxes and class probabilities with a single network in a single evaluation. The simplicity of the YOLO model allows real-time predictions.

Initially, the model takes an image as input. It divides it into an S×S grid. Each cell of this grid predicts B bounding boxes with a confidence score. This confidence is simply the probability to detect the object multiply by the IoU between the predicted and the ground truth boxes.

The CNN used is inspired by the GoogLeNet model introducing the inception modules. The network has 24 convolutional layers followed by 2 fully-connected layers. Reduction layers with 1×1 filters[4] followed by 3×3 convolutional layers replace the initial inception modules. The Fast YOLO model is a lighter version with only 9 convolutional layers and fewer number of filters. Most of the convolutional layers are pretrained using the ImageNet dataset with classification. Four convolutional layers followed by two fully-connected layers are added to the previous network and it is entirely retrained with the PASCAL VOC datasets.

The final layer outputs a $S*S*(C+B*5)$ tensor corresponding to the predictions for each cell of the grid. C is the number of estimated probabilities for each class. B is the fixed number of anchor boxes per cell, each of these boxes being related to 4 coordinates (coordinates of the center of the box, width and height) and a confidence value.

With the previous models, the predicted bounding boxes often contained an object. The YOLO model, however, predicts a high number of bounding boxes. Thus, there are a lot of bounding boxes without any object. The Non-Maximum Suppression (NMS) method is applied at the end of the network. It consists in merging highly-overlapping bounding boxes of a same object into a single one.

Single-Shot Detector (SSD)

A Single-Shot Detector (SSD) model predicts all at once the bounding boxes and the class probabilities with an end-to-end CNN architecture.

The model takes an image as the input which passes through multiple convolutional layers with different sizes of filter (10×10, 5×5 and 3×3). Feature maps from convolutional layers at different position of the network are used to predict the bounding boxes. They are processed by specific convolutional layers with 3×3 filters called extra feature layers to produce a set of bounding boxes similar to the anchor boxes of the Fast R-CNN.

Each box has 4 parameters: the coordinates of the center, the width and the height. At the same time, it produces a vector of probabilities corresponding to the confidence over each class of object.

The Non-Maximum Suppression method is also used at the end of the SSD model to keep the most relevant bounding boxes. The Hard Negative Mining (HNM) is then used because a lot of negative boxes are still predicted. It consists in selecting only a subpart of these boxes during the training. The boxes are ordered by confidence and the top is selected depending on the ratio between the negative and the positive which is at most ⅓.

Neural Architecture Search Net (NASNet)

The Neural Architecture Search consists in learning the architecture of a model to optimize the number of layers while improving the accuracy over a given dataset.

The NASNet network has an architecture learned from the CIFAR-10 dataset and is trained with the ImageNet dataset. This model is used for feature maps generation and is stacked into the Faster R-CNN pipeline. Then the entire pipeline is retrained with the COCO dataset.

Mask Region-Based Convolutional Network (Mask R-CNN)

Another extension of the Faster R-CNN model adds a parallel branch to the bounding box detection in order to predict object mask. The mask of an object is its segmentation by pixel in an image. This model outperforms the state-of-the-art in the four COCO challenges: the instance segmentation, the bounding box detection, the object detection and the key point detection.

The Mask Region-based Convolutional Network (Mask R-CNN) uses the Faster R-CNN pipeline with three output branches for each candidate object: a class label, a bounding box offset and the object mask. It uses Region Proposal Network (RPN) to generate bounding box proposals and produces the three outputs at the same time for each Region of Interest (RoI).

The initial RoIPool layer used in the Faster R-CNN is replaced by a RoIAlign layer. It removes the quantization of the coordinates of the original RoI and computes the exact values of the locations. The RoIAlign layer provides scale-equivariance and translation-equivariance with the region proposals.

The model takes an image as input and feeds a ResNeXt network with 101 layers. This model looks like a ResNet but each residual block is cut into lighter transformations which are aggregated to add sparsity in the block. The model detects RoIs which are processed using a RoIAlign layer. One branch of the network is linked to a fully-connected layer to compute the coordinates of the bounding boxes and the probabilities associated to the objects. The other branch is linked to two convolutional layers, the last one computes the mask of the detected object. The model takes an image as input and feeds a ResNeXt network with 101 layers. This model looks like a ResNet but each residual block is cut into lighter transformations which are aggregated to add sparsity in the block. The model detects RoIs which are processed using a RoIAlign layer. One branch of the network is linked to a fully-connected layer to compute the coordinates of the bounding boxes and the probabilities associated to the objects. The other branch is linked to two convolutional layers, the last one computes the mask of the detected object. In one embodiment, instance segmentation is performed using the Yolact++ algorithm, and/or the Decetron algorithm (provided by Facebook®).

Three loss functions associated to each task to solve are summed. This sum is minimized and performs well because solving the segmentation task improve the localization and thus the classification.

Figure 18:
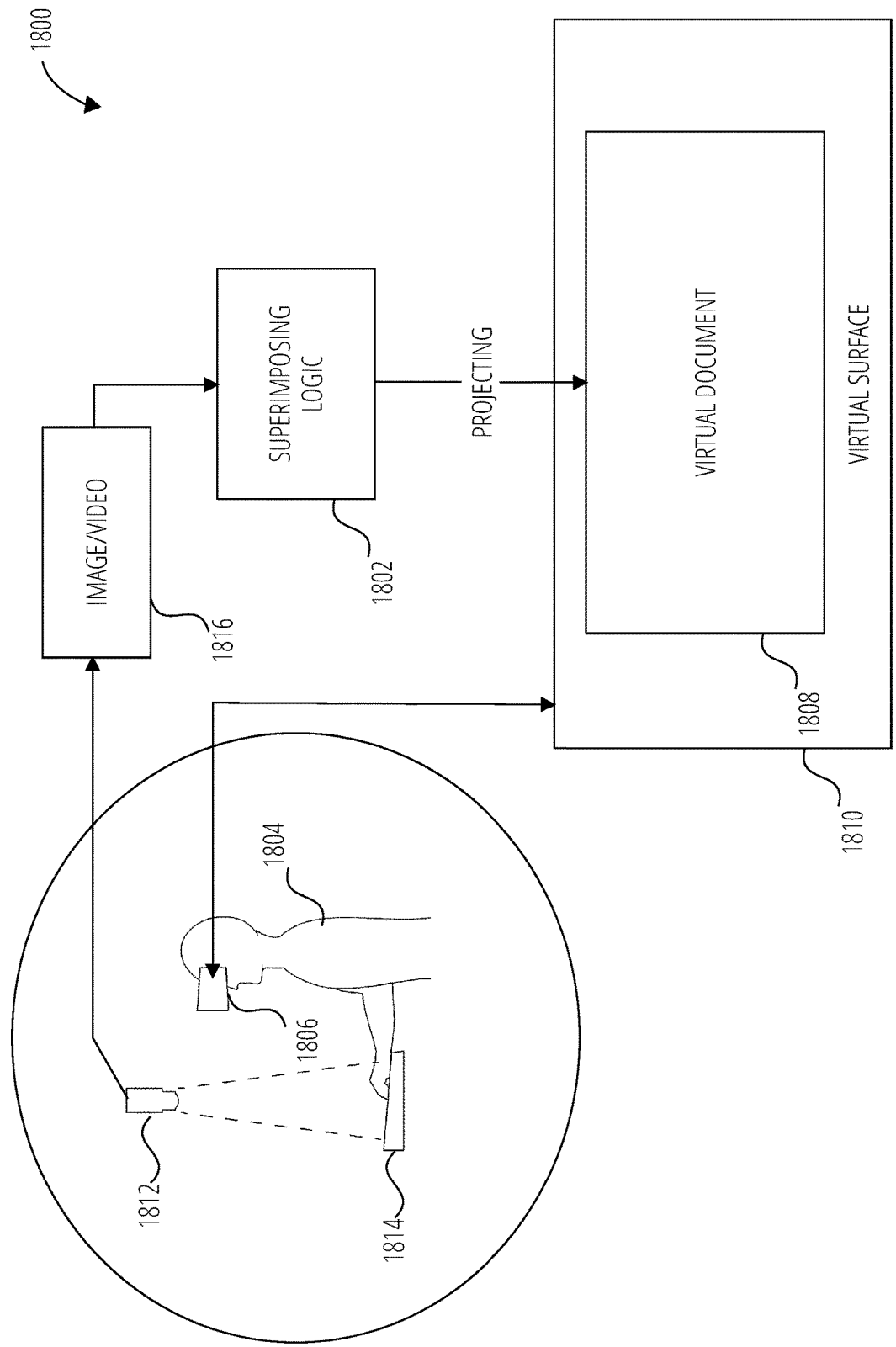
FIG. 18 illustrates an embodiment of a superimposing logic 1802.

FIG. 18 illustrates an embodiment of an augmented reality environment 1800. A user 1804 wearing headset 1806 interacts with physical objects virtualized in the augmented reality environment 1800. In this example the user 1804 interacts with either a purely virtual document, or a physical document that is virtualized as a virtual document 1808 on a virtual surface 1810 in the augmented reality environment 1800. In this embodiment, an imaging sensor 1812 is directed toward a physical surface 1814, and superimposing logic 1802 receives a sensor output 1816 (e.g., image or video) from the imaging sensor 1812. Superimposing logic 1802 transforms the sensor output 1808 into a virtual document 1808 superimposed on a virtual surface 1810 representing the physical surface 1814 in the augmented reality environment 1800.

In other embodiments there may be no physical surface 1814 and no physical document on the physical surface 1814, in which case the environment would be a purely virtual reality (VR) environment, not an augmented reality environment 1800. Thus there are many possibilities for the environment—it could be purely virtual, or a physical surface 1814 that is virtualized and augmented with a virtual document, or both the physical surface 1814 and a physical document could be virtualized.

Figure 19:
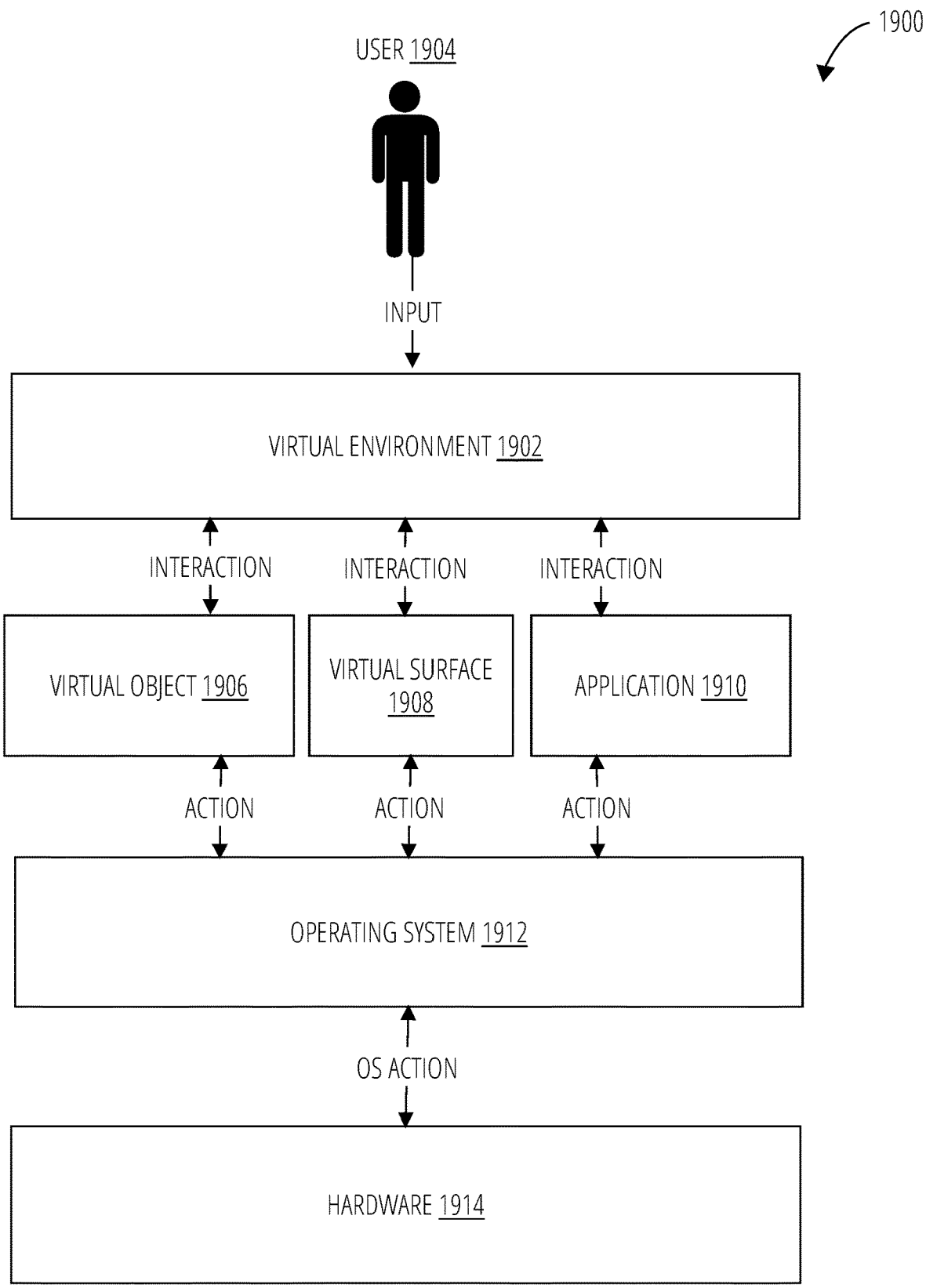
FIG. 19 illustrates an AR or VR system 1900 in accordance with one embodiment.

FIG. 19 illustrates an AR or VR system 1900 in accordance with one embodiment. A virtual environment 1902 receives input from the user 1904 and in response sends an interaction signal to a virtual object 1906, a virtual surface 1908 or an application 1910. The virtual object 1906 or virtual surface 1908 or application 1910 sends an action to an operating system 1912 and in response the operating system 1912 operates the hardware 1914 to implement the action in the augmented or virtual environment.

Figure 20:
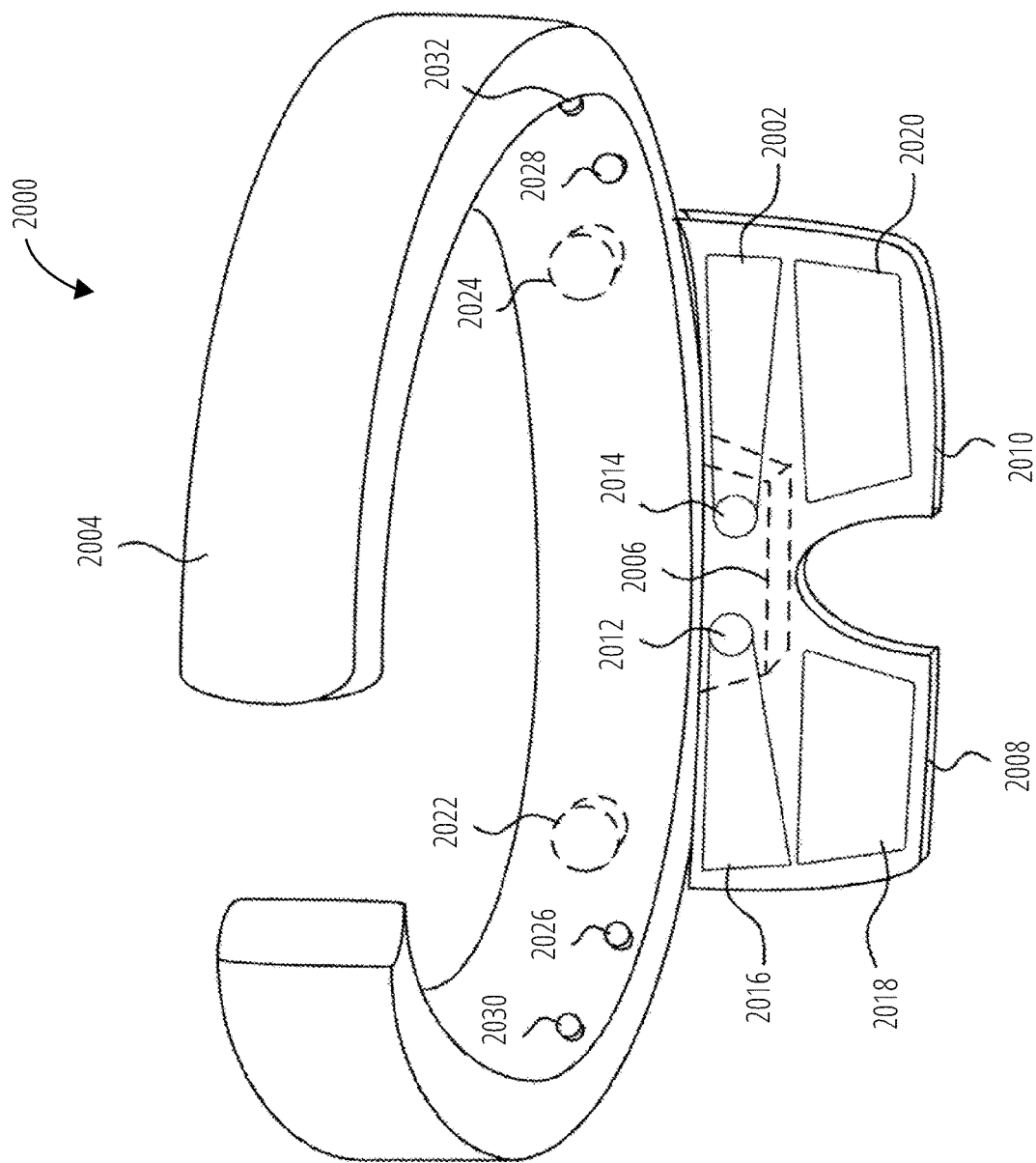
FIG. 20 illustrates a device 2000 in accordance with one embodiment.

FIG. 20 illustrates a perspective view of a wearable augmented reality ("AR") device (device 2000), from the perspective of a wearer of the device 2000 ("AR user"). The device 2000 is a computer device in the form of a wearable headset.

The device 2000 comprises a headpiece 2004, which is a headband, arranged to be worn on the wearer's head. The headpiece 2004 has a central portion 2006 intended to fit over the nose bridge of a wearer, and has an inner curvature intended to wrap around the wearer's head above their ears.

Figure 21:
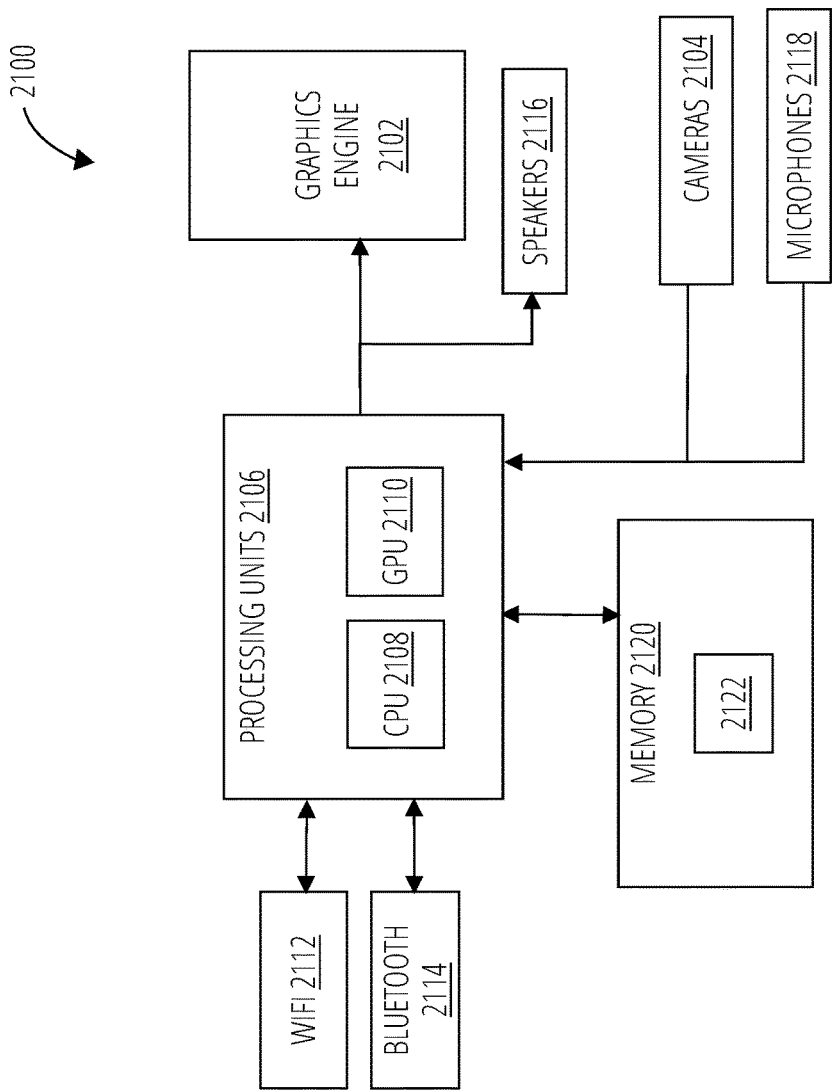
FIG. 21 illustrates an augmented reality device logic 2100 in accordance with one embodiment.

The headpiece 2004 supports a left optical component 2008 and a right optical component 2010, which are waveguides. For ease of reference herein an optical component will be considered to be either a left or right component, because in the described embodiment the components are essentially identical apart from being mirror images of each other. Therefore, all description pertaining to the left-hand component also pertains to the right-hand component. The device 2000 comprises augmented reality device logic 2100 that is depicted in FIG. 21.

The augmented reality device logic 2100 comprises a graphics engine 2102, which may comprise a micro display and imaging optics in the form of a collimating lens (not shown). The micro display can be any type of image source, such as liquid crystal on silicon (LCOS) displays, transmissive liquid crystal displays (LCD), matrix arrays of LED's (whether organic or inorganic) and any other suitable display. The display is driven by circuitry known in the art to activate individual pixels of the display to generate an image. Substantially collimated light, from each pixel, falls on an exit pupil of the graphics engine 2102. At the exit pupil, the collimated light beams are coupled into each of the left optical component 2008 and the right optical component 2010 into a respective left in-coupling zone 2012 and right in-coupling zone 2014. In-coupled light is then guided, through a mechanism that involves diffraction and TIR, laterally of the optical component in a respective left intermediate zone 2016 and 416, and also downward into a respective left exit zone 2018 and right exit zone 2020 where it exits towards the users' eye.

The collimating lens collimates the image into a plurality of beams, which form a virtual version of the displayed image, the virtual version being a virtual image at infinity in the optics sense. The light exits as a plurality of beams, corresponding to the input beams and forming substantially the same virtual image, which the lens of the eye projects onto the retina to form a real image visible to the user. In this manner, the left optical component 2008 and the right optical component 2010 project the displayed image onto the wearer's eyes.

The various optical zones can, for example, be suitably arranged diffractions gratings or holograms. Each optical component has a refractive index n which is such that total internal reflection takes place to guide the beam from the light engine along the respective intermediate expansion zone, and down towards respective the exit zone.

Each optical component is substantially transparent, whereby the wearer can see through it to view a real-world environment in which they are located simultaneously with the projected image, thereby providing an augmented reality experience.

To provide a stereoscopic image, i.e., that is perceived as having 3D structure by the user, slightly different versions of a 2D image can be projected onto each eye for example from multiple graphics engine 2102 (i.e., two micro displays), or from the same light engine (i.e., one micro display) using suitable optics to split the light output from the single display.

The device 2000 is just one exemplary configuration. For instance, where two light-engines are used, these may instead be at separate locations to the right and left of the device (near the wearer's ears). Moreover, whilst in this example, the input beams that form the virtual image are generated by collimating light from the display, an alternative light engine based on so-called scanning can replicate this effect with a single beam, the orientation of which is fast modulated whilst simultaneously modulating its intensity and/or color. A virtual image can be simulated in this manner that is equivalent to a virtual image that would be created by collimating light of a (real) image on a display with collimating optics. Alternatively, a similar AR experience can be provided by embedding substantially transparent pixels in a glass or polymer plate in front of the wearer's eyes, having a similar configuration to the left optical component 2008 and right optical component 2010 though without the need for the zone structures.

Other headpiece 2004 embodiments are also within the scope of the subject matter. For instance, the display optics can equally be attached to the user's head using a frame (in the manner of conventional spectacles), helmet or other fit system. The purpose of the fit system is to support the display and provide stability to the display and other head borne systems such as tracking systems and cameras. The fit system can be designed to meet user population in anthropometric range and head morphology and provide comfortable support of the display system.

The device 2000 also comprises one or more camera 2104—for example left stereo camera 2022 and right stereo camera 2024 mounted on the headpiece 2004 and configured to capture an approximate view ("field of view") from the user's left and right eyes respectfully in this example. The cameras are located towards either side of the user's head on the headpiece 2004, and thus capture images of the scene forward of the device form slightly different perspectives. In combination, the stereo camera's capture a stereoscopic moving image of the real-world environment as the device moves through it. A stereoscopic moving image means two moving images showing slightly different perspectives of the same scene, each formed of a temporal sequence of frames to be played out in quick succession to replicate movement. When combined, the two images give the impression of moving 3D structure.

A left microphone 2026 and a right microphone 2028 are located at the front of the headpiece (from the perspective of the wearer), and left and right channel speakers, earpiece or other audio output transducers are to the left and right of the headpiece 2004. These are in the form of a pair of bone conduction audio transducers functioning as a left speaker 2030 and right speaker 2032 audio channel output.

FIG. 21 illustrates components of an exemplary augmented reality device logic 2100. The augmented reality device logic 2100 comprises a graphics engine 2102, a camera 2104, processing units 2106, including one or more CPU 2108 and/or GPU 2110, a WiFi 2112 wireless interface, a Bluetooth 2114 wireless interface, speakers 2116, microphones 2118, and one or more memory 2120.

The processing units 2106 may in some cases comprise programmable devices such as bespoke processing units optimized for a particular function, such as AR related functions. The augmented reality device logic 2100 may comprise other components that are not shown, such as dedicated depth sensors, additional interfaces etc.

Some or all of the components in FIG. 21 may be housed in an AR headset. In some embodiments, some of these components may be housed in a separate housing connected or in wireless communication with the components of the AR headset. For example, a separate housing for some components may be designed to be worn or a belt or to fit in the wearer's pocket, or one or more of the components may be housed in a separate computer device (smartphone, tablet, laptop or desktop computer etc.) which communicates wirelessly with the display and camera apparatus in the AR headset, whereby the headset and separate device constitute the full augmented reality device logic 2100.

The memory 2120 comprises logic 2122 to be applied to the processing units 2106 to execute. In some cases, different parts of the logic 2122 may be executed by different components of the processing units 2106. The logic 2122 typically comprises code of an operating system, as well as code of one or more applications configured to run on the operating system to carry out aspects of the processes disclosed herein.

Figure 22:
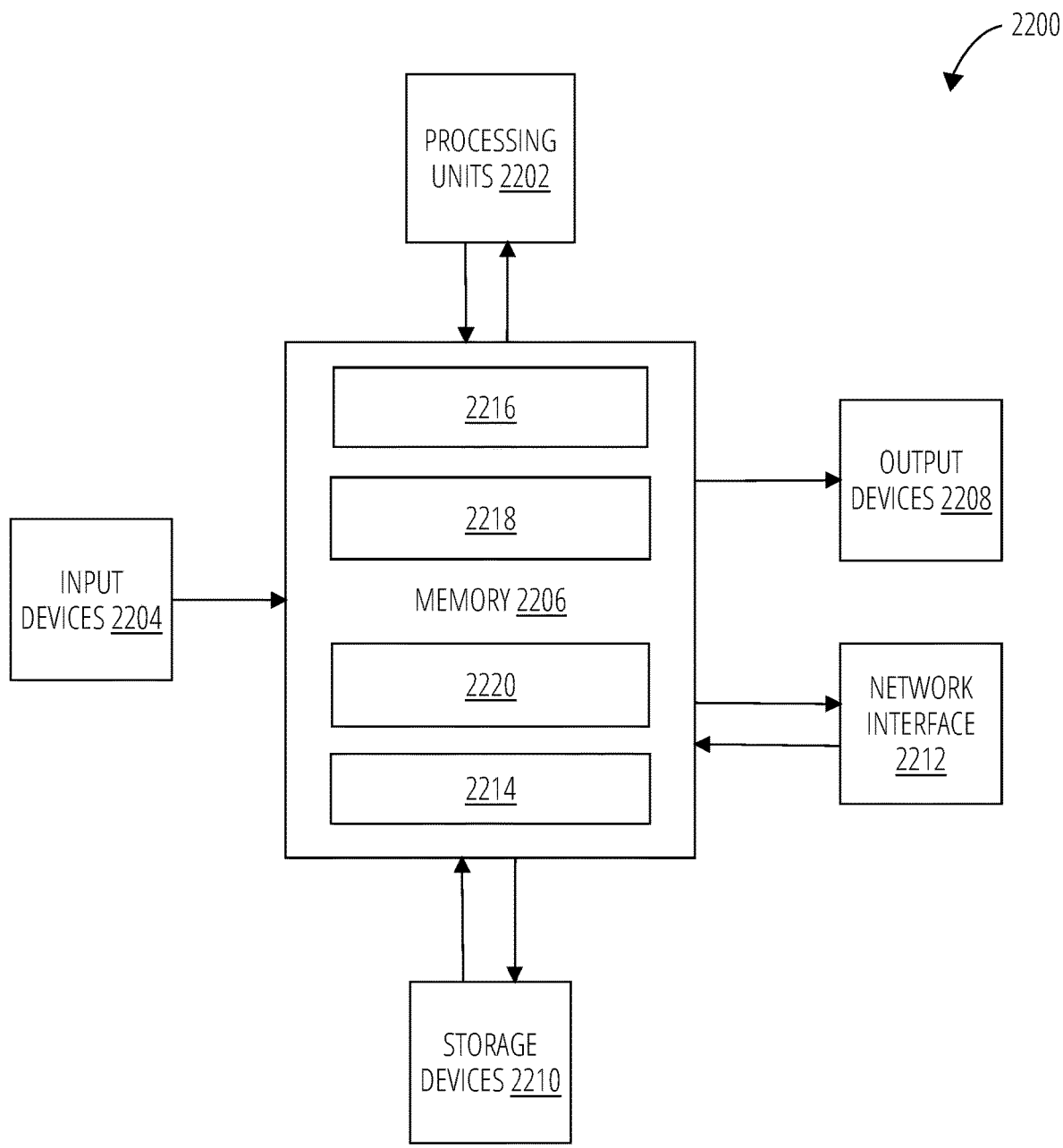
FIG. 22 illustrates an AR device 2200 that may implement aspects of the machine processes described herein.

FIG. 22 illustrates more aspects of an AR device 2200 according to one embodiment. The AR device 2200 comprises processing units 2202, input devices 2204, memory 2206, output devices 2208, storage devices 2210, a network interface 2212, and various logic (logic 2214, 2216, 2218, and logic 2220) to carry out the processes disclosed herein.

The input devices 2204 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 2204 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 2204 are provided via various machine signal conductors (e.g., busses or network interfaces) and circuits to memory 2206.

The memory 2206 provides for storage (via configuration of matter or states of matter) of signals received from the input devices 2204, instructions and information for controlling operation of the processing units 2202, and signals from storage devices 2210. The memory 2206 may in fact comprise multiple memory devices of different types, for example random access memory devices and non-volatile (e.g., FLASH memory) devices.

Information stored in the memory 2206 is typically directly accessible to the processing units 2202 of the device. Signals input to the AR device 2200 cause the reconfiguration of the internal material/energy state of the memory 2206, creating logic that in essence forms a new machine configuration, influencing the behavior of the AR device 2200 by affecting the behavior of the processing units 2202 with control signals (instructions) and data provided in conjunction with the control signals.

The storage devices 2210 may provide a slower but higher capacity machine memory capability. Examples of storage devices 2210 are hard disks, optical disks, large capacity flash memories or other non-volatile memory technologies, and magnetic memories.

The processing units 2202 may cause the configuration of the memory 2206 to be altered by signals in the storage devices 2210. In other words, the processing units 2202 may cause data and instructions to be read from storage devices 2210 in the memory 2206 from which may then influence the operations of processing units 2202 as instructions and data signals, and from which it may also be provided to the output devices 2208. The processing units 2202 may alter the content of the memory 2206 by signaling to a machine interface of memory 2206 to alter the internal configuration, and then converted signals to the storage devices 2210 to alter its material internal configuration. In other words, data and instructions may be backed up from memory 2206, which is often volatile, to storage devices 2210, which are often non-volatile.

Output devices 2208 are transducers which convert signals received from the memory 2206 into physical phenomenon such as vibrations in the air, or patterns of light on a machine display, or vibrations (i.e., haptic devices) or patterns of ink or other materials (i.e., printers and 3-D printers).

The network interface 2212 receives signals from the memory 2206 or processing units 2202 and converts them into electrical, optical, or wireless signals to other machines, typically via a machine network. The network interface 2212 also receives signals from the machine network and converts them into electrical, optical, or wireless signals to the memory 2206 or processing units 2202.

Figure 23:
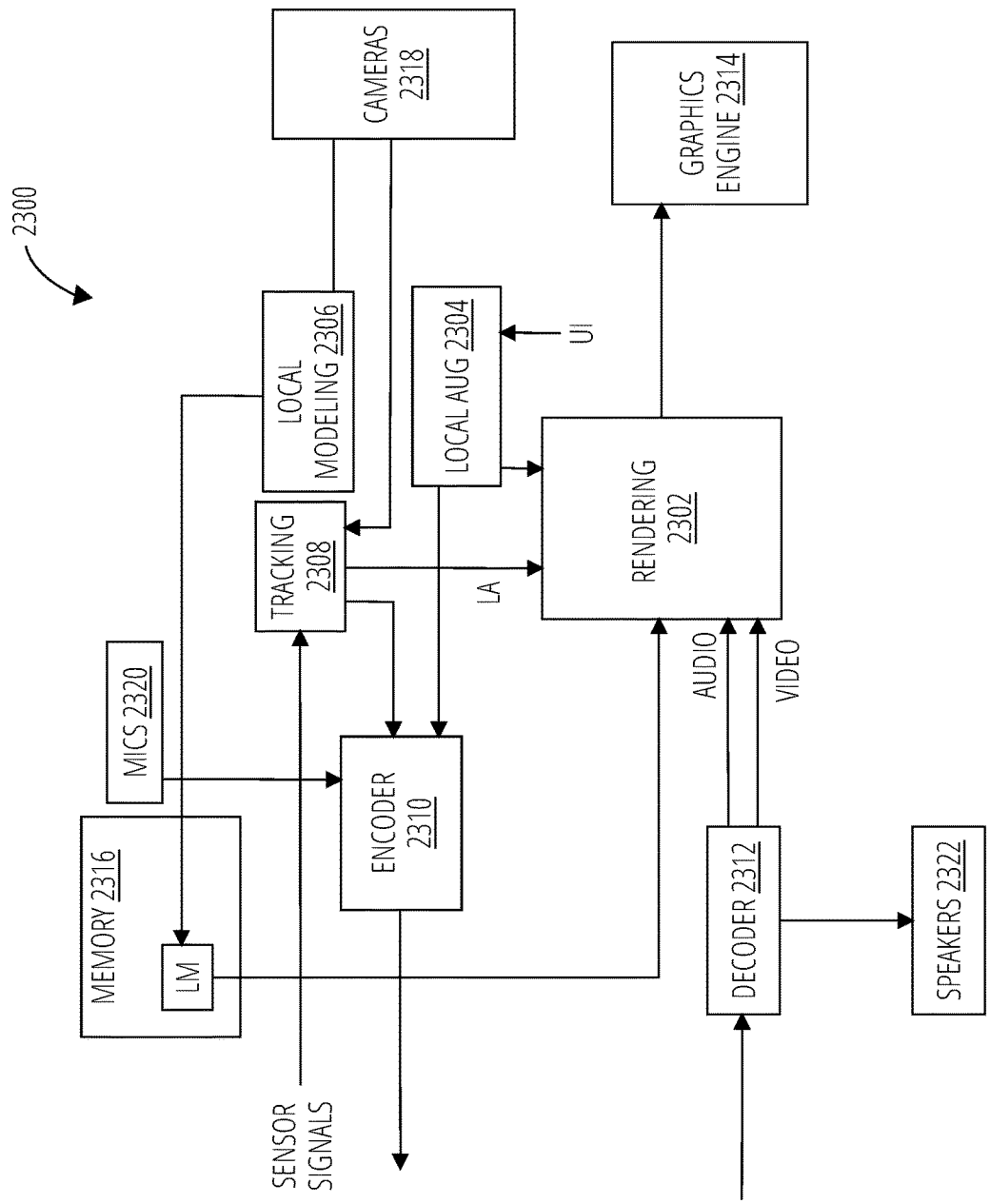
FIG. 23 illustrates an AR device logic 2300 in accordance with one embodiment.

FIG. 23 illustrates a functional block diagram of an embodiment of AR device logic 2300. The AR device logic 2300 comprises the following functional modules: a rendering engine 2302, local augmentation logic 2304, local modeling logic 2306, device tracking logic 2308, an encoder 2310, and a decoder 2312. Each of these functional modules may be implemented in software, dedicated hardware, firmware, or a combination of these logic types.

The rendering engine 2302 controls the graphics engine 2314 to generate a stereoscopic image visible to the wearer, i.e., to generate slightly different images that are projected onto different eyes by the optical components of a headset substantially simultaneously, so as to create the impression of 3D structure.

The stereoscopic image is formed by rendering engine 2302 rendering at least one virtual display element ("augmentation"), which is perceived as a 3D element, i.e., having perceived 3D structure, at a real-world location in 3D space by the user.

An augmentation is defined by an augmentation object stored in the memory 2316. The augmentation object comprises: location data defining a desired location in 3D space for the virtual element (e.g., as (x,y,z) Cartesian coordinates); structural data defining 3D surface structure of the virtual element, i.e., a 3D model of the virtual element; and image data defining 2D surface texture of the virtual element to be applied to the surfaces defined by the 3D model. The augmentation object may comprise additional information, such as a desired orientation of the augmentation.

The perceived 3D effects are achieved though suitable rendering of the augmentation object. To give the impression of the augmentation having 3D structure, a stereoscopic image is generated based on the 2D surface and 3D augmentation model data in the data object, with the augmentation being rendered to appear at the desired location in the stereoscopic image.

A 3D model of a physical object is used to give the impression of the real-world having expected tangible effects on the augmentation, in the way that it would a real-world object. The 3D model represents structure present in the real world, and the information it provides about this structure allows an augmentation to be displayed as though it were a real-world 3D object, thereby providing an immersive augmented reality experience. The 3D model is in the form of 3D mesh.

For example, based on the model of the real-world, an impression can be given of the augmentation being obscured by a real-world object that is in front of its perceived location from the perspective of the user; dynamically interacting with a real-world object, e.g., by moving around the object; statically interacting with a real-world object, say by sitting on top of it etc.

Whether or not real-world structure should affect an augmentation can be determined based on suitable rendering criteria. For example, by creating a 3D model of the perceived AR world, which includes the real-world surface structure and any augmentations, and projecting it onto a plane along the AR user's line of sight as determined using pose tracking (see below), a suitable criteria for determining whether a real-world object should be perceived as partially obscuring an augmentation is whether the projection of the real-world object in the plane overlaps with the projection of the augmentation, which could be further refined to account for transparent or opaque real world structures. Generally, the criteria can depend on the location and/or orientation of the augmented reality device and/or the real-world structure in question.

An augmentation can also be mapped to the mesh, in the sense that its desired location and/or orientation is defined relative to a certain structure(s) in the mesh. Should that structure move and/or rotate causing a corresponding change in the mesh, when rendered properly this will cause corresponding change in the location and/or orientation of the augmentation. For example, the desired location of an augmentation may be on, and defined relative to, a tabletop structure; should the table be moved, the augmentation moves with it. Object recognition can be used to this end, for example to recognize a known shape of table and thereby detect when the table has moved using its recognizable structure. Such object recognition techniques are known in the art. A mesh may not be needed in situations where objects in the field of view are identified by other techniques and a coordinate frame is determined for the scene.

An augmentation that is mapped to the mash in this manner or is otherwise associated with a particular piece of surface structure embodied in a 3D model, is referred to an "annotation" to that piece of surface structure. In order to annotate a piece of real-world surface structure, it is necessary to have that surface structure represented by the 3D model in question—without this, the real-world structure cannot be annotated.

The local modeling logic 2306 generates a local 3D model "LM" of the environment in the memory 2316, using the AR device's own sensor(s) e.g., cameras 2318 and/or any dedicated depth sensors etc. The local modeling logic 2306 and sensor(s) constitute sensing apparatus.

The device tracking logic 2308 tracks the location and orientation of the AR device, e.g., a headset, using local sensor readings captured from the AR device. The sensor readings can be captured in a number of ways, for example using the cameras 2318 and/or other sensor(s) such as accelerometers. The device tracking logic 2308 determines the current location and orientation of the AR device and provides this information to the rendering engine 2302, for example by outputting a current "pose vector" of the AR device. The pose vector is a six dimensional vector, for example (x, y, z, P, R, Y) where (x,y,z) are the device's Cartesian coordinates with respect to a suitable origin, and (P, R, Y) are the device's pitch, roll and yaw with respect to suitable reference axes.

The rendering engine 2302 adapts the local model based on the tracking, to account for the movement of the device i.e. to maintain the perception of the as 3D elements occupying the real-world, for example to ensure that static augmentations appear to remain static (which will in fact be achieved by scaling or rotating them as, from the AR user's perspective, the environment is moving relative to them).

The encoder 2310 receives image data from the cameras 2318 and audio data from the microphones 2320 and possibly other types of data (e.g., annotation or text generated by the user of the AR device using the local augmentation logic 2304) and transmits that information to other devices, for example the devices of collaborators in the AR environment. The decoder 2312 receives an incoming data stream from other devices, and extracts audio (e.g., to render on speakers 2322), video, and possibly other types of data (e.g., annotations, text) therefrom.

Figure 24:
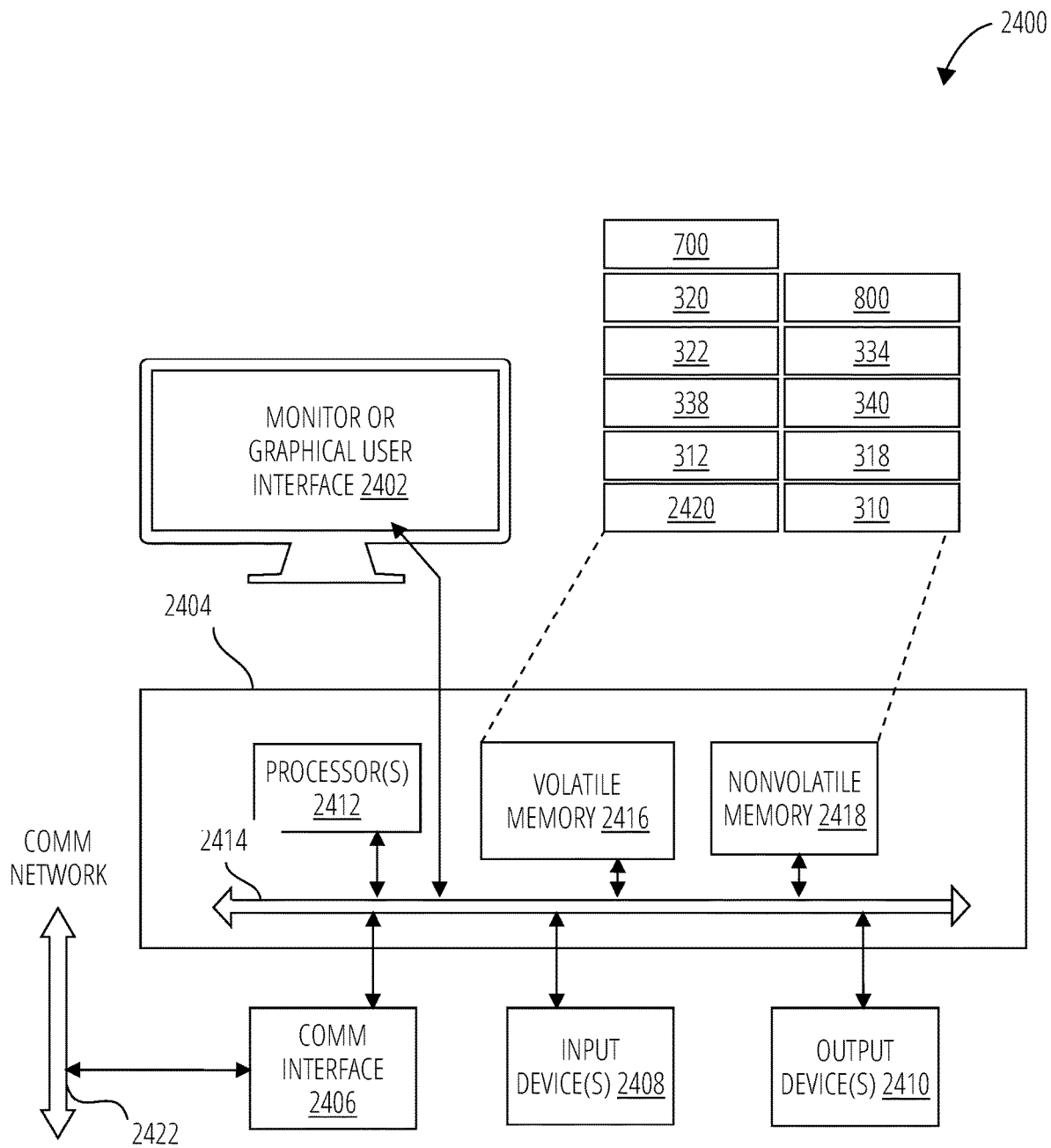
FIG. 24 is an example block diagram of a computing device 2400 that may incorporate embodiments of the present invention.

FIG. 24 is an example block diagram of a computing device 2400 that may incorporate embodiments of the present invention. FIG. 24 is merely illustrative of a machine system to carry out aspects of the technical processes described herein and does not limit the scope of the claims. One of ordinary skill in the art would recognize other variations, modifications, and alternatives. In one embodiment, the computing device 2400 typically includes a monitor or graphical user interface 2402, a data processing system 2404, a communication network interface 2406, input device(s) 2408, output device(s) 2410, and the like.

As depicted in FIG. 24, the data processing system 2404 may include one or more processor(s) 2412 that communicate with a number of peripheral devices via a bus subsystem 2414. These peripheral devices may include input device(s) 2408, output device(s) 2410, communication network interface 2406, and a storage subsystem, such as a volatile memory 2416 and a nonvolatile memory 2418.

The volatile memory 2416 and/or the nonvolatile memory 2418 may store computer-executable instructions and thus forming logic 2420 that when applied to and executed by the processor(s) 2412 implement embodiments of the processes disclosed herein.

The input device(s) 2408 include devices and mechanisms for inputting information to the data processing system 2404. These may include a keyboard, a keypad, a touch screen incorporated into the monitor or graphical user interface 2402, audio input devices such as voice recognition systems, microphones, and other types of input devices. In various embodiments, the input device(s) 2408 may be embodied as a computer mouse, a trackball, a track pad, a joystick, wireless remote, drawing tablet, voice command system, eye tracking system, and the like. The input device(s) 2408 typically allow a user to select objects, icons, control areas, text and the like that appear on the monitor or graphical user interface 2402 via a command such as a click of a button or the like.

The input device(s) 2408 may incorporate gesture inputs for programming instructions (interactive procedural guidance) for the movement of objects between different locations. The gestures inputs may be (motion tracking AR tracking techniques environment sensors, stereo camera, user worn sensors) gestures input recognition may be initiated, confirmed, and ended by a user trigger input such as a voice input. provided by detecting the movement of the user in the environment by external facing sensors (e.g., image sensors, laser sensors Lidar, radar, etc.).

The output device(s) 2410 include devices and mechanisms for outputting information from the data processing system 2404. These may include the monitor or graphical user interface 2402, speakers, printers, infrared LEDs, and so on as well understood in the art.

The communication network interface 2406 provides an interface to communication networks (e.g., communication network 2422) and devices external to the data processing system 2404. The communication network interface 2406 may serve as an interface for receiving data from and transmitting data to other systems. Embodiments of the communication network interface 2406 may include an Ethernet interface, a modem (telephone, satellite, cable, ISDN), (asynchronous) digital subscriber line (DSL), Fire-Wire, USB, a wireless communication interface such as BlueTooth or WiFi, a near field communication wireless interface, a cellular interface, and the like.

The communication network interface 2406 may be coupled to the communication network 2422 via an antenna, a cable, or the like. In some embodiments, the communication network interface 2406 may be physically integrated on a circuit board of the data processing system 2404, or in some cases may be implemented in software or firmware, such as "soft modems", or the like.

The computing device 2400 may include logic that enables communications over a network using protocols such as HTTP, TCP/IP, RTP/RTSP, IPX, UDP and the like.

The volatile memory 2416 and the nonvolatile memory 2418 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 2416 and the nonvolatile memory 2418 may be configured to store the basic programming and data constructs that provide the functionality of the disclosed processes and other embodiments thereof that fall within the scope of the present invention.

Logic 2420 that implements embodiments of the present invention may be stored in the volatile memory 2416 and/or the nonvolatile memory 2418. The volatile memory 2416 and the nonvolatile memory 2418 includes logic for the object recognition engine 310, the spatiotemporal activity engine 312, the correlator 318, the constructor 338, the combiner 340, the interpreter 322, the compiler 334, and the protocol development user interface 320. Said logic 2420 may be read from the volatile memory 2416 and/or nonvolatile memory 2418 and executed by the processor(s) 2412. The volatile memory 2416 and the nonvolatile memory 2418 may also provide a repository for storing data used by the logic 2420.

The volatile memory 2416 and the nonvolatile memory 2418 may include a number of memories including a main random access memory (RAM) for storage of instructions and data during program execution and a read only memory (ROM) in which read-only non-transitory instructions are stored. The volatile memory 2416 and the nonvolatile memory 2418 may include a file storage subsystem providing persistent (non-volatile) storage for program and data files. The volatile memory 2416 and the nonvolatile memory 2418 may include removable storage systems, such as removable flash memory.

The bus subsystem 2414 provides a mechanism for enabling the various components and subsystems of data processing system 2404 communicate with each other as intended. Although the communication network interface 2406 is depicted schematically as a single bus, some embodiments of the bus subsystem 2414 may utilize multiple distinct busses.

It will be readily apparent to one of ordinary skill in the art that the computing device 2400 may be a device such as a smartphone, a desktop computer, a laptop computer, a rack-mounted computer system, a computer server, or a tablet computer device. As commonly known in the art, the computing device 2400 may be implemented as a collection of multiple networked computing devices. Further, the computing device 2400 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/ or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Figure 25:
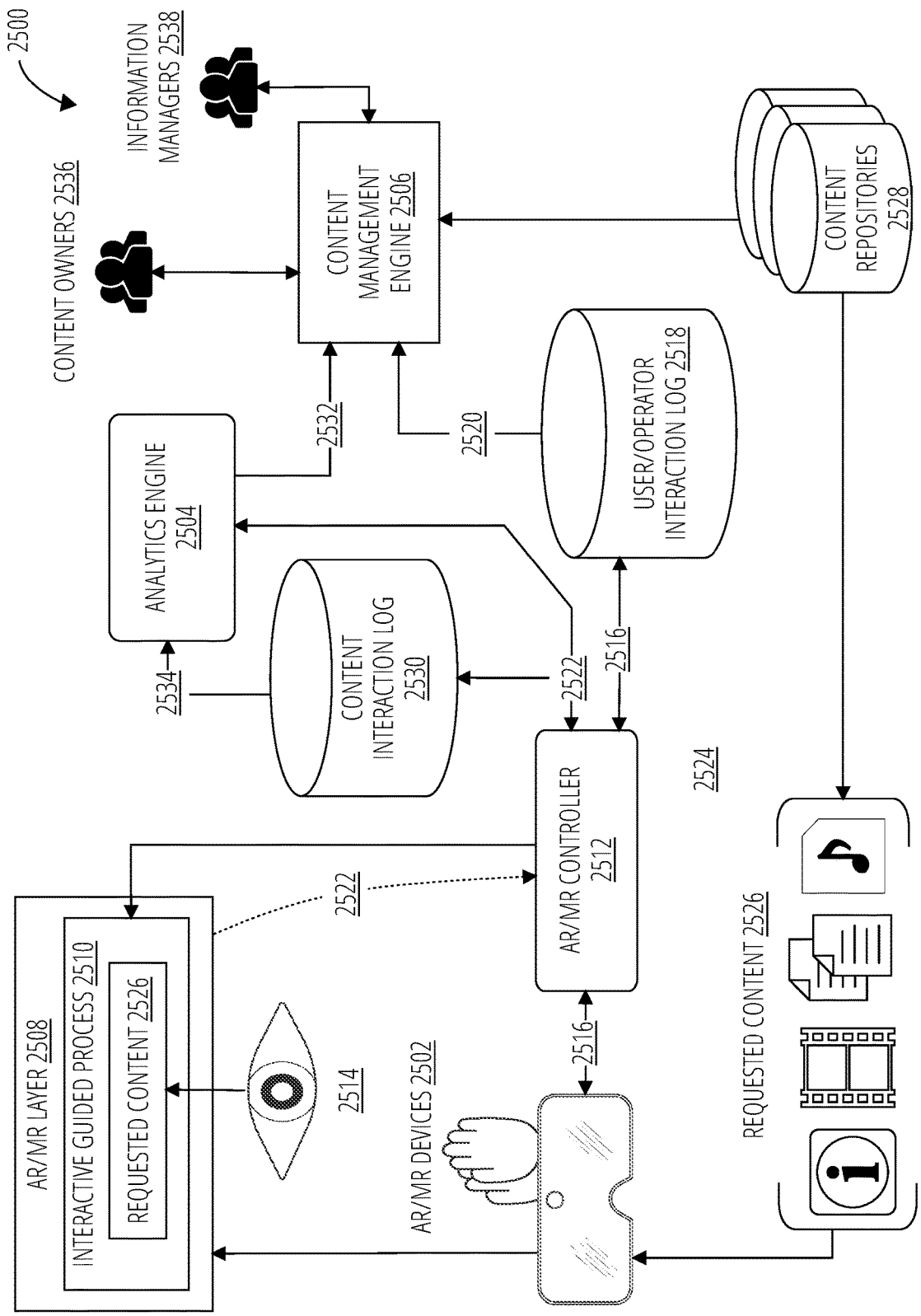
FIG. 25 illustrates a system 2500 in accordance with one embodiment.

Referencing FIG. 25, a system 2500 includes an AR/MR devices 2502, an analytics engine 2504, and a content management engine 2506. The AR/MR devices 2502 may include a camera to capture visual information of the surrounding environment, a display to generate an AR/MR layer 2508 that displays an interactive guided process 2510 overlaid on top of visualization of the surrounding environment, and an AR/MR controller 2512 to control correlation of visualized environmental objects to visual content presented in the interactive guided process 2510. The interactive guided process 2510 may additionally provide non-visual information to the user in the form of a vibration feedback system or audio cues.

In some embodiments, the AR/MR devices 2502 may be worn by a user/operator with a display positioned in front of their eyes showing the AR/MR layer 2508. The AR/MR devices 2502 may include sensors to track user/operator physical indicators 2514 (gaze, pupil size, vocalizations, etc.) and correlate the user/operator physical indicators 2514 to an interaction within the interactive guided process 2510. These sensors, as well as other input and output devices, may be integrated into the display and worn on the head, or may be distributed to wrist-wear, contact lenses, or other devices worn or held by the user/operator. In some embodiments, AR/MR devices 2502 may include gloves or other devices sensing hand position and movement. Such gloves or glove-like devices may incorporate haptics or other indicators providing feedback to the wearer regarding modulation of movement and position, pressure of touch or grip, etc.

The interactive guided process 2510 is an interactive layer of content that may present information, instructions, visual cues, and notifications correlated to interactions in the physical environment and/or the field of view of an AR/MR device's camera. The user may also interact with the interactive guided process 2510 through various input controls (e.g. hardware buttons, voice commands, eye movement tracking, user head position, etc.) that are detected using an AR/MR controller 2512.

The AR/MR controller 2512 may detect user/operator interactions 2516 with the AR/MR devices 2502, such as voice commands, hardware button inputs, eye movement, etc., to control what is displayed in the interactive guided process 2510 of the AR/MR layer 2508. The AR/MR controller 2512 may detect a sequence of events presented in the interactive guided process 2510 as a type of user/operator interaction. For example, as part of a closed-loop process of procedural guidance, user/operator completion of or progression through one stage of the interactive guided process 2510 may trigger the next portion of the interactive guided process 2510 to be presented. The AR/MR controller 2512 may communicate the user/operator interactions 2516 to a user/operator interaction log 2518 for tracking previous user/operator interactions 2520.

Data from the user/operator interaction log 2518 may be used to adjust the AR/MR interactions in real time. This data may also be sent to content creators, content owners, content publishers, content distributors, and information managers. Data in the user/operator interaction log 2518 may be used to tailor content customization for use in new protocols going forward. This may allow content creators, content publishers, etc. to provide content spanning multiple protocols, and to optimize content for presentation through specific protocols.

Records of user/operator movements, vocalizations, annotations, and other detailed interactions may be stored in the user/operator interaction log 2518. These may then be used in quality control, user grading, and content or help function improvement, and/or for generation of new content. User/operator mistakes may indicate an area of content where help material may be offered, or more detailed explanations may be incorporated. Such support content may be incorporated as annotations that are then presented to a user/operator who has demonstrated a need for additional help through mistakes or by a longer than average engagement time. Over time, such annotations may be reduced for a user/operator that demonstrates a growing familiarity with the content (e.g., as fewer mistakes are made, content is moved through more rapidly).

The AR/MR controller 2512 is a logic unit or combination of logic units that control operations of the AR/MR devices 2502 in response to detecting user/operator interactions 2516 and user/operator content interactions 2522. The AR/MR controller 2512 may detect the user/operator physical indicators 2514 at a particular location in the interactive guided process 2510 as user/operator interactions 2516 to generate a content request 2524. Certain types of content presented through the interactive guided process 2510 may contain dynamic information and/or require a content license to be displayed to a user.

Requested content may also include a class of content that may be categorized as "procedural guidance." Procedural guidance may be "passive", providing "open-loop" guidance. Open-loop guidance may include text boxes or arrow cues. Procedural guidance may also be "active," including "closed-loop control." In closed-loop control, the user/operator may be as much part of a controlled system as the AR/MR device, and the actions of the user/operator may affect the procedural guidance the AR/MR device delivers. Closed-loop control may range from a) the content requires affirmative input (e.g., confirmation) from the operator in order to proceed to a next step (as in, a checklist), to b) the content actively provides feedback that affects the movements of the operator, for example, by warning of overshoots or imminent errors, and thus providing full "closed-loop operator control."

During the presentation of the requested content 2526 in the interactive guided process 2510, the AR/MR controller 2512 may detect the user/operator physical indicators 2514 relative to the requested content 2526 as user/operator content interactions 2522. The user/operator content interactions 2522 may be specific types of interactions with displayed or executable content and may be utilized to gauge a user's/operator's engagement with the requested content 2526.

In some instances, the requested content 2526 retrieved from the content repositories 2528 may include instructions that the user/operator needs to follow, such as viewing a specific item in the physical environment within the field of view of the device. The AR/MR controller 2512 may communicate the user/operator content interactions 2522 to a content interaction log 2530 to store the user/operator content interactions 2522. The AR/MR controller 2512 may also communicate the user/operator content interactions 2522 to an analytics engine 2504.

The analytics engine 2504 is a collection of logic processes utilized to determine user/operator engagement metrics 2532 for user/operator content interactions with a piece of requested content. The analytics engine 2504 may receive the user/operator content interactions 2522 from the AR/MR controller 2512 and analyze the user/operator content interactions 2522 against previous user/operator content interactions 2534 stored in the content interaction log 2530. The analytics engine may also compute or receive input that indicates physical measurements of the parameters of a user's/operator's engagement. Analyzed user/operator content interactions 2522 may be distilled into a form of user/operator ability metadata or content effectiveness metadata. This metadata may include a user's/operator's past history, the most effective usage across various protocols, etc.

Analysis of the user/operator content interactions 2522 may be provided to determine certain trends associated with a specific user/operator or group of users/operators or for a specific instance or model of AR/MR device. For instance, the requested content 2526 may be textual information, and the user/operator content interactions 2522 may include the duration of time that the user/operator physical indicators 2514 indicate the user/operator spent viewing the requested content 2526. (user/operator physical indicators may include user/operator eye position, pupil size, saccades, etc.) Analysis of the user/operator content interactions 2522 with regard to previous user/operator content interactions 2534 may account for the user's average reading speed. After the user/operator content interactions 2522 have been analyzed, the analytics engine 2504 may generate user/operator engagement metrics 2532 and may communicate the user/operator engagement metrics 2532 to a content management engine 2506. The content management engine 2506 may leverage data such as past user/operator history, as well as physical metrics, in real time, to improve the publication/presentation/execution of content.

In some configurations, the content management engine 2506 may communicate the user/operator engagement metrics 2532 and the previous user/operator interactions 2520 to the content creators, owners, publishers, distributors, etc. 2536 in order to allow the content creators, owners, publishers, distributors, etc. 2536 to modify/improve the content. Content may also be sourced, curated, and/or maintained from/by professional information managers 2538. In some configurations, the content management engine 2506 may store the user/operator engagement metrics 2532 for a piece of content from various users/operators to be accessed by the content creators, owners, publishers, distributors, etc. 2536 at their discretion to evaluate the impact of their content.

Figure 26:
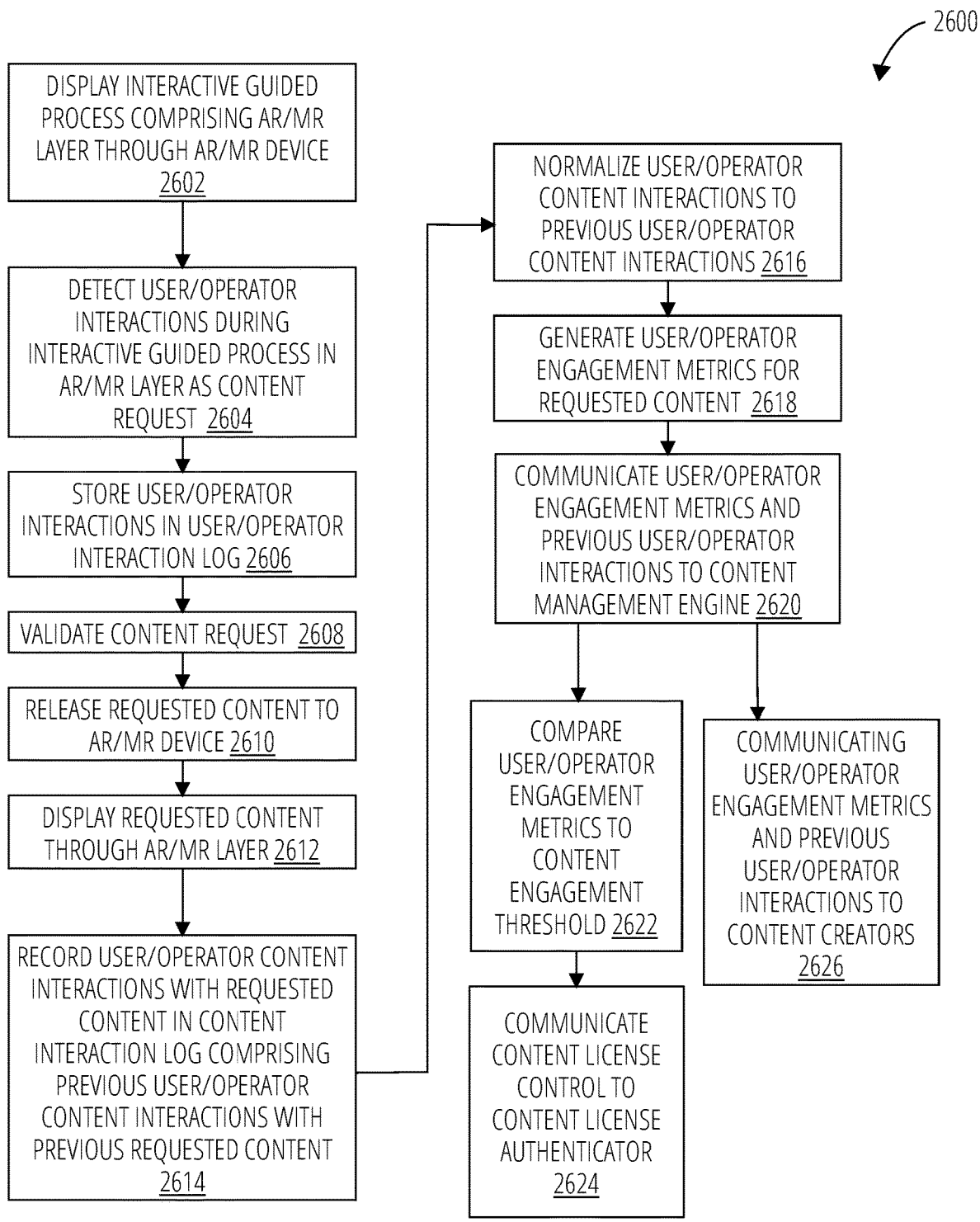
FIG. 26 illustrates a method 2600 in accordance with one embodiment.

FIG. 26 illustrates a method 2600 in accordance with one embodiment. The diagram of this embodiment shows the functions needed to carry out the method. The needed functions may be implemented in different arrangements of software, hardware, or a combination of these. This method 2600 for monitoring and delivering licensed content involves displaying an interactive guided process comprising an AR/MR layer through an AR/MR device (block 2602).

In block 2604 and block 2606, the method 2600 operates an AR/MR controller to detect user/operator interactions during the interactive guided process in the AR/MR layer as a content request and stores the user/operator interactions in a user/operator interaction log.

In block 2608 and block 2610, the method 2600 operates a content license authenticator to validate the content request and release requested content to the AR/MR device.

In block 2612, the method 2600 displays the requested content through the AR/MR layer of the AR/MR device.

In block 2614, the method 2600 records user/operator content interactions with the requested content in a content interaction log comprising previous user/operator content interactions with previous requested content.

In block 2616 and block 2618, the method 2600 operates an analytics engine to normalize the user/operator content interactions to the previous user/operator content interactions and generate a user/operator engagement metrics for the requested content.

In block 2620, the method 2600 communicates the user/operator engagement metrics and previous user/operator interactions to a content management engine.

In block 2622, the method 2600 compares the user/operator engagement metrics to a content engagement threshold.

In block 2624, the method 2600 communicates a content license control to the content license authenticator.

In block 2626, the method 2600 communicates the user/operator engagement metrics and the previous user/operator interactions to content creators, owners, publishers, distributors, etc.

Figure 27:
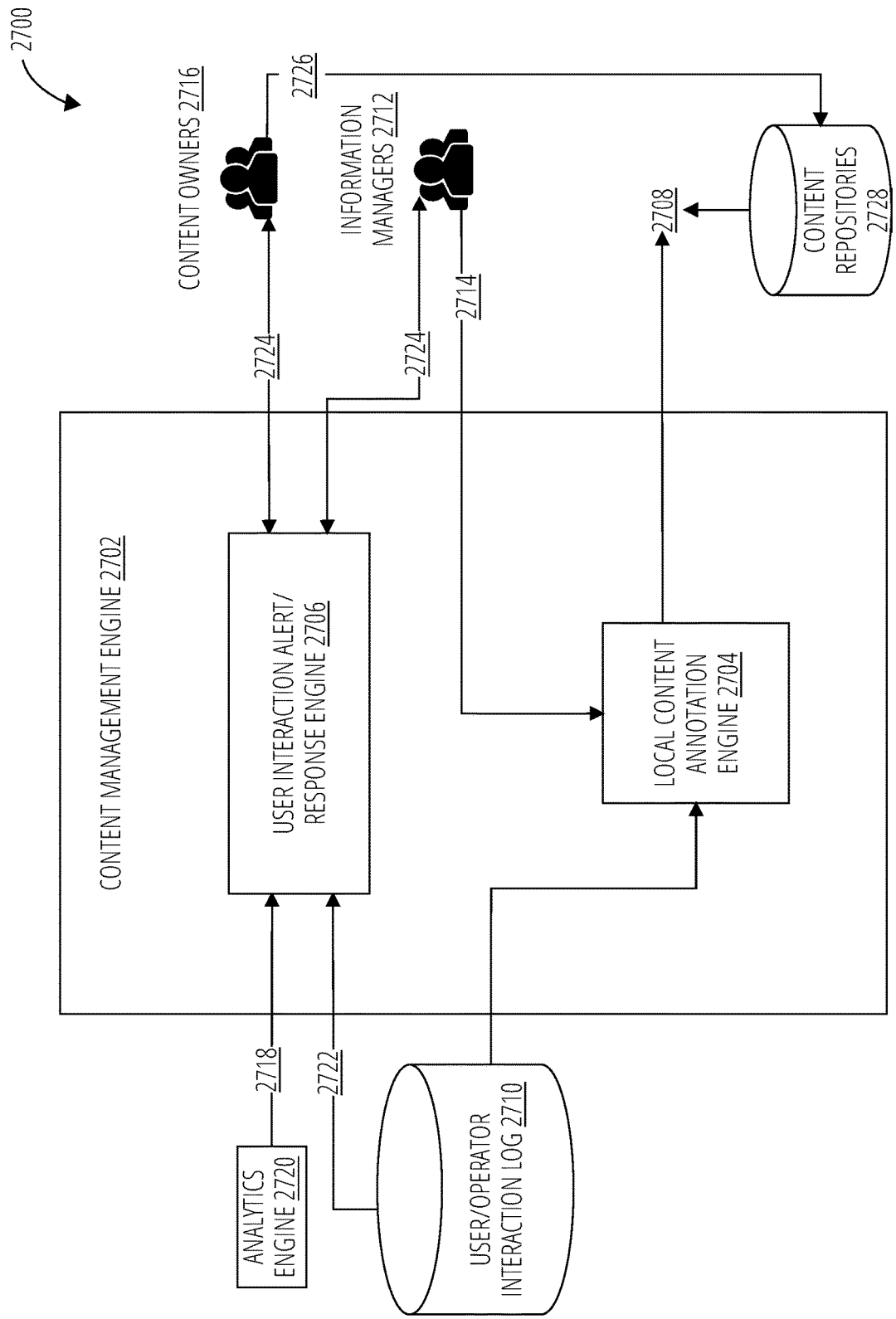
FIG. 27 illustrates a content management engine 2700 in accordance with one embodiment.

Referring to FIG. 27, a content management engine 2700/2702 is illustrated in accordance with one embodiment. The diagram of this embodiment shows mechanisms that may be used to carry out the content management tasks that support the method disclosed herein. These mechanisms may be implemented in different arrangements of software, hardware, or a combination of these. The content management engine 2700 may comprise a local content annotation engine 2704, and a user interaction alert/response engine 2706.

As a user/operator interacts with the requested content 2708, they may wish to add their own annotations to the content they interact with. This may be accomplished by recording user/operator annotations within the user/operator interaction log 2710. In such a case, the user/operator interaction log 2710 may transmit a signal associated with these interactions to the local content annotation engine 2704. The local content annotation engine 2704 may further allow information managers 2712 to monitor user/operator annotation interactions, as well as manage additional local annotations 2714 they may wish to add to content they manage. As users/operators continue to interact with requested content 2708, their own past annotations, local annotations 2714 from the information managers 2712, and in some embodiments, annotations from the content creators, owners, publishers, distributors, etc. 2716, may be incorporated into the content they interact with on an institutionally or individually customized basis.

As users/operators interact with AR/MR content, their interactions may be recorded and analyzed as described earlier. User/operator engagement metrics 2718 generated by the analytics engine 2720 and previous user/operator interactions 2722 stored in the user/operator interaction log 2710 may be made available to the user interaction alert/response engine 2706 within the content management engine 2700. For example, should previous user/operator interactions 2722 and present user/operator engagement metrics 2718 indicate a negative interaction occurring consistently in response to a particular piece of content, content creators, owners, publishers, distributors, etc. 2716 may be alerted with alerts/queries 2724. For example, if multiple users who have in the past interacted with a publisher's content along average metrics begin to exhibit a longer reading time, or exhibit pupil response, saccades, or vocalizations indicative of frustration, the content publisher may be alerted that their content is no longer eliciting a positive user engagement. In such a case, content creators, owners, publishers, distributors, etc. 2716 may initiate additional queries to the user interaction alert/response engine 2706 to learn more, and may create new/updated content 2726 to correct the problem, which may then be stored in the content repositories 2728.

Figure 28:
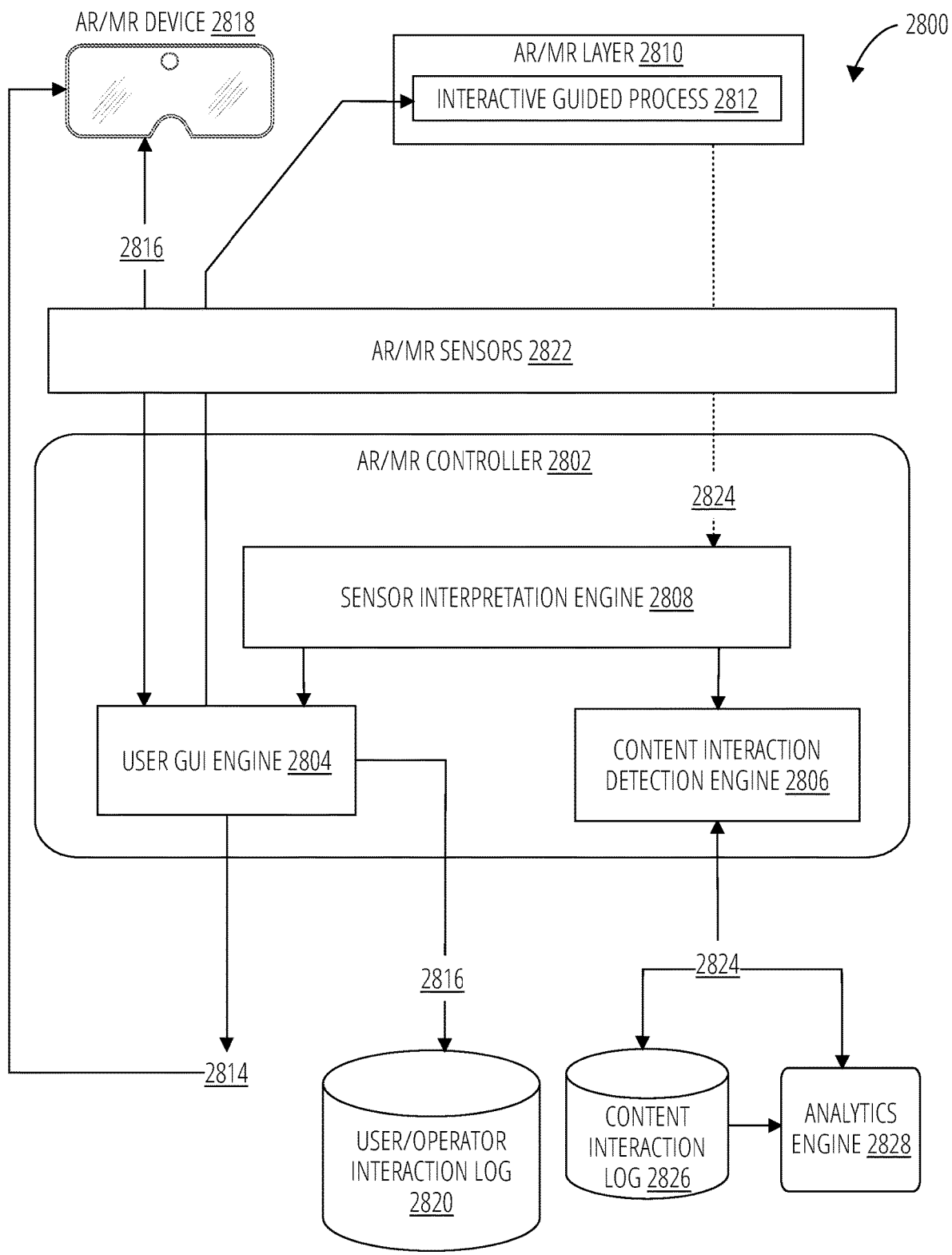
FIG. 28 illustrates an AR/MR controller 2800 in accordance with one embodiment.

Referring to FIG. 28, an AR/MR controller 2800 is illustrated in accordance with one embodiment. The diagram of this embodiment shows mechanisms that may be used to carry out the AM/MR tasks that support the method disclosed herein. These mechanisms may be implemented in different arrangements of software, hardware, or a combination of these. The AR/MR controller 2800/2802 comprises a user GUI Engine 2804, a content interaction detection Engine 2806, and a sensor interpretation Engine 2808.

When a user/operator initiates interaction with an AR/MR device, the user GUI Engine 2804 within the AR/MR controller 2800 may signal the AR/MR layer 2810 to begin an interactive guided process 2812. Throughout the interactive guided process 2812, the user GUI Engine 2804 may continuously construct an interface though which the user/operator may receive information, as well as configure that interface to accept feedback from the user/operator as necessary. The user GUI Engine 2804 may specifically be responsible for presenting procedural guidance to the user/operator and accepting user/operator response to procedural guidance implemented using a closed-loop process.

In some embodiments, all requested content 2814 may be processed through the user GUI Engine 2804, in order to provide a managed framework in which requested content 2814 may be viewed or executed. The user GUI Engine 2804 may provide data on user/operator interactions 2816 with the user/operator GUI it generates on the AR/MR device 2818. These user/operator interactions 2816 may be sent for storage to the user/operator interaction log 2820. The user GUI Engine 2804 may receive this data from the sensor interpretation Engine 2808.

The sensor interpretation Engine 2808 may be the portion of the AR/MR controller 2800 responsible for processing input from the AR/MR sensors 2822. AR/MR sensors 2822 may include eye cameras, microphones, push buttons, or other sensors by which a user/operator response to content may be detected. The sensor interpretation Engine 2808 may be configured to register and interpret user/operator content interactions 2824 based on a user's/operator's eye position, gaze location, time duration spent at that location, pupil dilation, vocalizations, etc.

For example, a user/operator may be instructed to locate and gaze at a component of the GUI for a certain amount of time, or to blink some number of times while focused on that component, to select an option. A help function button may be displayed in a portion of the GUI, and the user/operator may be able to enter a help menu by focusing on the button and blinking twice. The sensor interpretation Engine 2808 may send the coordinates of the user's/operator's gaze, corresponding to the button, as well as the information capturing two blinks, to the user GUI Engine 2804. As a result, the user GUI Engine 2804 may generate a display of the help menu to show the user.

The user/operator content interactions 2824 processed by the sensor interpretation Engine 2808 may also be interpreted and transmitted to a content interaction detection Engine 2806. In this manner, user/operator content interactions 2824 may be monitored and transmitted to a content interaction log 2826 for storage. The user/operator content interactions 2824 may also be transmitted to the analytics engine 2828 for analysis.

Figure 29:
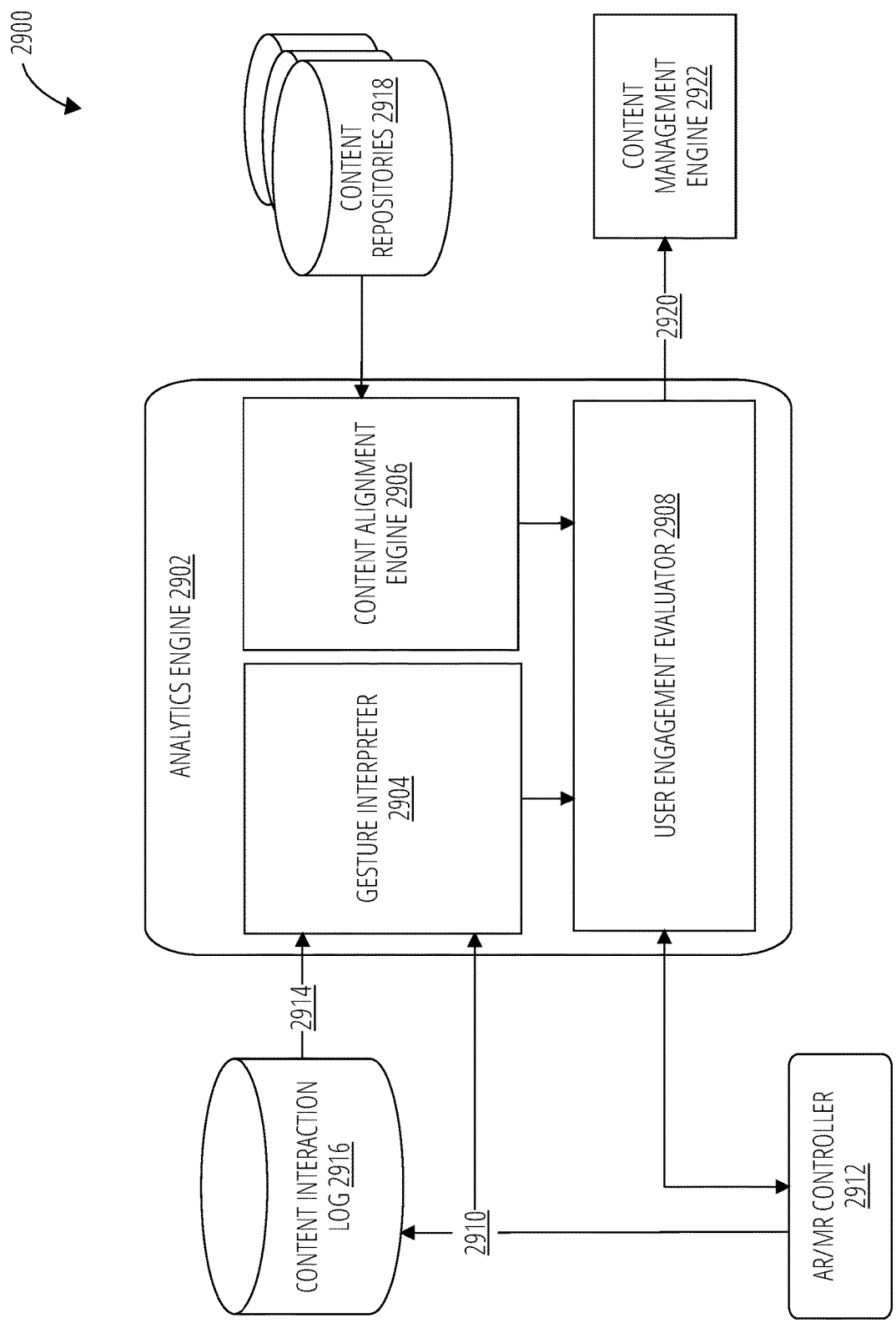
FIG. 29 illustrates an analytics engine 2900 in accordance with one embodiment.

Referring to FIG. 29, an analytics engine 2900/2902 is illustrated in accordance with one embodiment. The diagram of this embodiment shows mechanisms that may be used to carry out the user engagement analytics tasks that support the method disclosed herein. These mechanisms may be implemented in different arrangements of software, hardware, or a combination of these. The analytics engine 2900 may comprise a gesture interpreter 2904, a content alignment engine 2906, and a user engagement evaluator 2908.

The gesture interpreter 2904 may incorporate machine learning in order to inform an interpretation of the user/operator content interactions 2910 it receives from the AR/MR controller 2912 and the previous user/operator content interactions 2914 from the content interaction log 2916. This may include recognizing and assigning a positive or negative weight to optical gestures detected by the eye cameras, such as a rolling of eyes as a sign of frustration, or a dilation of the pupils as a sign of interest. Vocalizations such as sighs that are detected by microphones may also be so analyzed. The content alignment engine 2906 may provide a means of referencing content stored in the content repositories 2918, so that the interpreted gestures may be aligned with the content that elicited them.

The user engagement evaluator 2908 may receive input regarding interpreted gestures from the gesture interpreter 2904 and an indication of the content that elicited them from the content alignment engine 2906. The user engagement evaluator 2908 may also receive additional data from the AR/MR controller 2912, which in some cases may require interpretation by the gesture interpreter 2904 before evaluation. The user engagement evaluator 2908 may evaluate the inputs it receives and generate user/operator engagement metrics 2920, which it may transmit to the content management engine 2922.

Figure 30:
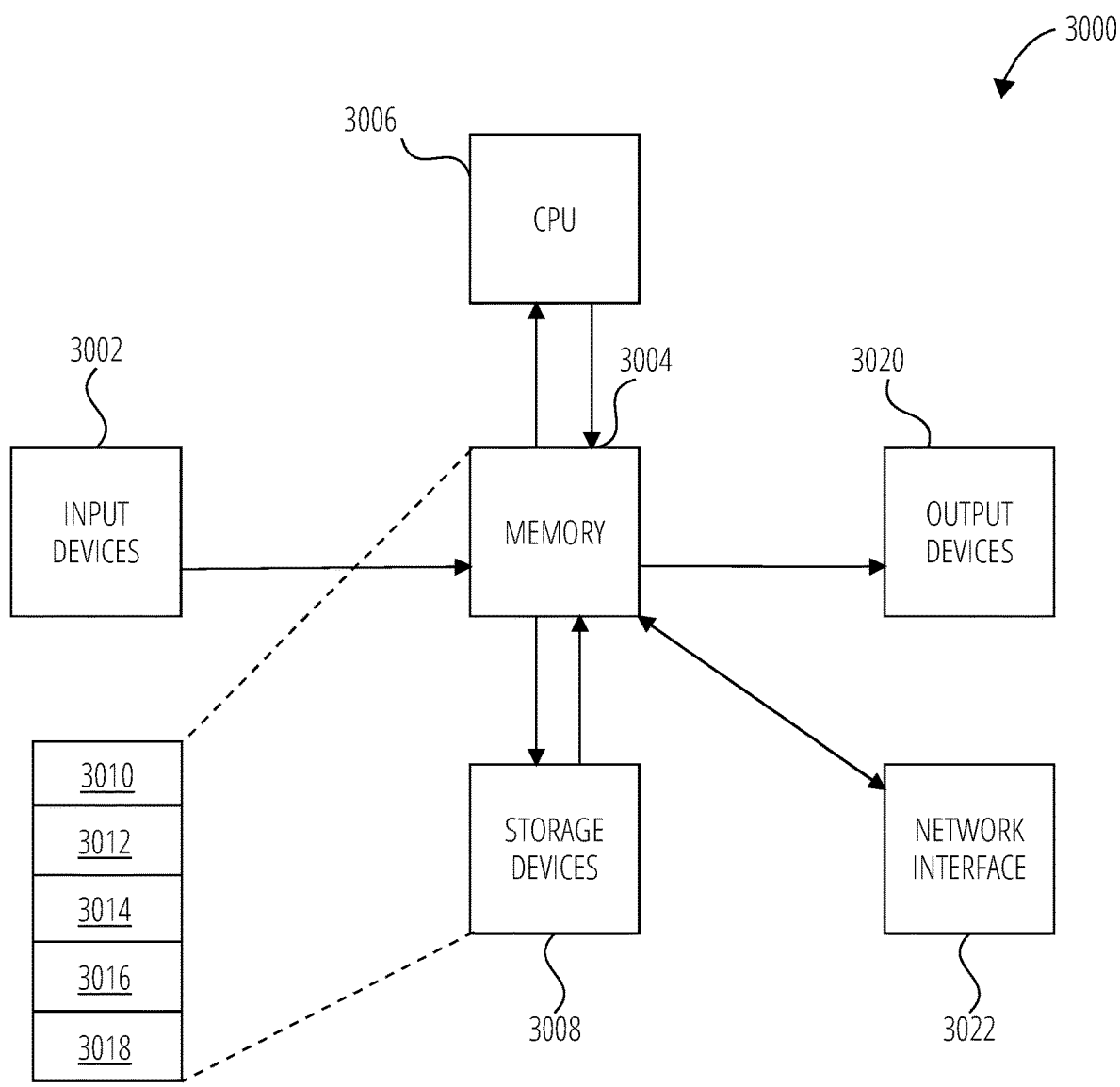
FIG. 30 illustrates an embodiment of a digital apparatus 3000 to implement components and process steps of the system described herein.

FIG. 30 illustrates an embodiment of a digital apparatus 3000 to implement components and process steps of the system described herein.

Input devices 3002 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 3002 include keyboards which respond to touch or physical pressure from an object or proximity of an object to a surface, mice which respond to motion through space or across a plane, microphones which convert vibrations in the medium (typically air) into device signals, and scanners which convert optical patterns on two or three dimensional objects into device signals. The signals from the input devices 3002 are provided via various machine signal conductors (e.g., busses or network interfaces) and circuits to memory 3004.

The memory 3004 is typically what is known as a first or second level memory device, providing for storage (via configuration of matter or states of matter) of signals received from the input devices 3002, instructions and information for controlling operation of the CPU 3006, and signals from storage devices 3008.

The memory 3004 and/or the storage devices 3008 may store computer-executable instructions and thus forming logic 3010 that when applied to and executed by the CPU 3006 implement embodiments of the processes disclosed herein. The logic 3010 may include log to operate the content management engine 3012, the AR/MR controller 3014, the content license authenticator 3016, and the analytics engine 3018.

Information stored in the memory 3004 is typically directly accessible to the CPU 3006 of the device. Signals input to the device cause the reconfiguration of the internal material/energy state of the memory 3004, creating in essence a new machine configuration, influencing the behavior of the digital apparatus 3000 by affecting the behavior of the CPU 3006 with control signals (instructions) and data provided in conjunction with the control signals.

Second or third level storage devices 3008 may provide a slower but higher capacity machine memory capability. Examples of storage devices 3008 are hard disks, optical disks, large capacity flash memories or other non-volatile memory technologies, and magnetic memories.

The CPU 3006 may cause the configuration of the memory 3004 to be altered by signals in storage devices 3008. In other words, the CPU 3006 may cause data and instructions to be read from storage devices 3008 in the memory 3004 from which may then influence the operations of CPU 3006 as instructions and data signals, and from which it may also be provided to the output devices 3020. The CPU 3006 may alter the content of the memory 3004 by signaling to a machine interface of memory 3004 to alter the internal configuration, and then converted signals to the storage devices 3008 to alter its material internal configuration. In other words, data and instructions may be backed up from memory 3004, which is often volatile, to storage devices 3008, which are often non-volatile.

Output devices 3020 are transducers which convert signals received from the memory 3004 into physical phenomenon such as vibrations in the air, or patterns of light on a machine display, or vibrations (i.e., haptic devices) or patterns of ink or other materials (i.e., printers and 3-D printers).

The network interface 3022 receives signals from the memory 3004 and converts them into electrical, optical, or wireless signals to other machines, typically via a machine network. The network interface 3022 also receives signals from the machine network and converts them into electrical, optical, or wireless signals to the memory 3004.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. In an exemplary embodiment, the logic implementations include various ways the system can handle delivery and monitoring use of licensed content in AR. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

LISTING OF DRAWING ELEMENTS 100 routine
102 block
104 block
106 block
108 block 110 block
112 block
200 implementation of procedural training user interface system
202 first user hand position
204 second user view without AR
206 second user view showing AR first user hands
208 second user hands aligned with first user hands
210 first user hands
212 instructor's screwdriver
214 instructor's screw
216 instructor's block
218 student's screwdriver
220 student's screw
222 student's block
224 second user hands
226 AR first user hands
228 correction needed indicator
230 first user hands and second user hands overlapping
232 ready to continue indicator
300 procedural language and content generation system
302 image sensor
304 environment image
306 environment objects
308 image processor
310 object recognition engine
312 spatiotemporal activity engine
314 audio sensor
316 input device
318 correlator
320 protocol development user interface
322 interpreter
324 protocol library
326 known objects library
328 declared objects
330 protocol repository
332 instruction set
334 compiler
336 control logic
338 constructor
340 combiner
342 audio device
344 display device
346 environment image layer
348 augmented reality layer
350 programmatic instruction
352 executable commands
400 procedural language and content generation system
402 edit control
404 stored programmatic instructions
406 revised instruction set
408 revised augmented reality layer
410 revised programmatic instruction
500 protocol development user interface
502 drawing canvas
504 process step
506 process element menu
508 process outline
510 process outline steps
600 protocol development user interface
602 environment objects
604 three dimensional environment
606 environment objects menu
608 process outline
610 process outline steps
612 process step
614 environment objects
700 method
702 block
704 block
706 subroutine block
708 subroutine block
710 subroutine block
712 block
714 block
716 block
718 block
720 block
722 block
724 block
726 block
800 method
802 block
804 block
806 subroutine block
808 subroutine block
810 block
812 block
814 block
816 block
818 block
820 block
822 block
900 convolutional neural network
902 convolutional layer
904 input layer
906 output layer
1000 convolutional neural network layers
1002 subregion of the input layer region
1004 input layer region
1006 convolutional layer subregion
1008 convolutional layer
1100 VGG net
1102 convolution layer
1104 pooling layer
1106 convolution layer
1108 convolution layer
1110 convolution layer
1112 RELU layer
1114 RELUlayer
1116 RELUlayer
1118 RELUlayer
1120 pooling layer
1200 convolution layer filtering
1202 convolution layer
1204 next layer
1206 filter
1300 pooling layer function
1302 input layer
1304 pooling layer
1402 classification model
1404 classification and localization model
1406 bounding box
1408 object detection model
1410 instance segmentation model
1412 segmentation region
1500 Fast Region-based Convolutional Network
1502 input image
1504 convolutional neural network
1506 ROI
1508 feature maps
1510 ROI pooling layer
1512 fully connected layers
1514 softmax classifier 1516 bounding box linear regressors
1600 Region-based Convolution Network
1602 ROI
1604 input image
1606 warped image region
1608 convolutional neural network
1610 support vector machines
1612 bounding box linear regressors
1700 Faster Region-based Convolutional Network
1702 feature map
1704 sliding window
1706 intermediate layer
1708 box regression layer
1710 box classification layer
1712 anchor boxes
1800 augmented reality environment
1802 superimposing logic
1804 user
1806 headset
1808 virtual document
1810 virtual surface
1812 imaging sensor
1814 physical surface
1816 sensor output
1900 AR or VR system
1902 virtual environment
1904 user
1906 virtual object
1908 virtual surface
1910 application
1912 operating system
1914 hardware
2000 device
2002 right intermediate zone
2004 headpiece
2006 central portion
2008 left optical component
2010 right optical component
2012 left in-coupling zone
2014 right in-coupling zone
2016 left intermediate zone
2018 left exit zone
2020 right exit zone
2022 left stereo camera
2024 right stereo camera
2026 left microphone
2028 right microphone
2030 left speaker
2032 right speaker
2100 augmented reality device logic
2102 graphics engine
2104 camera
2106 processing units
2108 CPU
2110 GPU
2112 WiFi
2114 Bluetooth
2116 speakers
2118 microphones
2120 memory
2122 logic
2200 AR device
2202 processing units
2204 input devices
2206 memory
2208 output devices
2210 storage devices
2212 network interface
2214 logic
2216 logic
2218 logic
2220 logic
2300 AR device logic
2302 rendering engine
2304 local augmentation logic
2306 local modeling logic
2308 device tracking logic
2310 encoder
2312 decoder
2314 graphics engine
2316 memory
2318 cameras
2320 microphones
2322 speakers
2400 computing device
2402 monitor or graphical user interface
2404 data processing system
2406 communication network interface
2408 input device(s)
2410 output device(s)
2412 processor(s)
2414 bus subsystem
2416 volatile memory
2418 nonvolatile memory
2420 logic
2422 communication network
2500 system
2502 AR/MR devices
2504 analytics engine
2506 content management engine
2508 AR/MR layer
2510 interactive guided process
2512 AR/MR controller
2514 user/operator physical indicators
2516 user/operator interactions
2518 user/operator interaction log
2520 previous user/operator interactions
2522 user/operator content interactions
2524 content request
2526 requested content
2528 content repositories
2530 content interaction log
2532 user/operator engagement metrics
2534 previous user/operator content interactions
2536 content creators, owners, publishers, distributors, etc.
2538 information managers
2600 method
2602 block
2604 block
2606 block
2608 block
2610 block
2612 block
2614 block
2616 block
2618 block
2620 block
2622 block
2624 block
2626 block
2700 content management engine
2702 content management engine
2704 local content annotation engine 2706 user interaction alert/response engine
2708 requested content
2710 user/operator interaction log
2712 information managers
2714 local annotations
2716 content creators, owners, publishers, distributors, etc.
2718 user/operator engagement metrics
2720 analytics engine
2722 previous user/operator interactions
2724 alerts/queries
2726 new/updated content
2728 content repositories
2800 AR/MR controller
2802 AR/MR controller
2804 user GUI Engine
2806 content interaction detection Engine
2808 sensor interpretation Engine
2810 AR/MR layer
2812 interactive guided process
2814 requested content
2816 user/operator interactions
2818 AR/MR device
2820 user/operator interaction log
2822 AR/MR sensors
2824 user/operator content interactions
2826 content interaction log
2828 analytics engine
2900 analytics engine
2902 analytics engine
2904 gesture interpreter
2906 content alignment engine
2908 user engagement evaluator
2910 user/operator content interactions
2912 AR/MR controller
2914 previous user/operator content interactions
2916 content interaction log
2918 content repositories
2920 user/operator engagement metrics
2922 content management engine
3000 digital apparatus
3002 input devices
3004 memory
3006 CPU
3008 storage devices
3010 logic
3012 content management engine
3014 AR/MR controller
3016 content license authenticator
3018 analytics engine
3020 output devices
3022 network interface Terms used herein should be accorded their ordinary meaning in the relevant arts, or the meaning indicated by their use in context, but if an express definition is provided, that meaning controls.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method of operating a procedural guidance system, the method comprising:
   detecting first user interactions of a first user during an interactive guided process;
   displaying to a second user, using at least one augmented reality (AR) layer, one or more representations of one or more first user hands of the first user carrying out the interactive guided process;
   detecting second user interactions of the second user during the interactive guided process, wherein the second user attempts to superimpose one or more representations of one or more second user hands with the one or more representations of the one or more first user hands in the at least one AR layer;
   determining if the one or more representations of the one or more first user hands and the one or more representations of the one or more second user hands are superimposed in the at least one AR layer;
   in response to determining none of the representations of the one or more first user hands and the one or more second user hands being superimposed in the at least one AR layer, generating corrective action signals for the first user, the second user, or both; and
   In response to determining at least one or more fingertips in a representation of a second user hand that are in contact with an object being superimposed on one or more corresponding fingertips in an additional representation of a corresponding first user hand in the at least one AR layer without other portions of the first user hand and the second user in each representation being superimposed, generating a continue signal for at least the second user or permitting a procedure in the interactive guided process to advance to a next step.

2. The method of claim 1, wherein the second user hand of the second user is larger or smaller than the first user hand of the first user.

3. The method of claim 1, further comprising:
   detecting the first user interactions from a recording of the interactive guided process.

4. The method of claim 1, further comprising:
   detecting the first user interactions from a live transmission of the interactive guided process.

5. The method of claim 1, further comprising:
   scaling the representations of the first user hands to fit the representations of the second user hands, or vice versa.

6. The method of claim 1, further comprising:
   determining a size relationship between the first user hands and the second user hands; and
   scaling a projection volume for the first user hands in the AR layer according to the size relationship.

7. The method of claim 6, further comprising:
   superimposing fingertips of the second user hands on fingertips of the first user hands while other portions of the first user hands and the second user hands are not superimposed.

8. The method of claim 1, wherein at least one of the representations of the first user hands or the second user hands comprises an internal anatomical map of a hand.

9. The method of claim 8, wherein anatomical features of the hand in a corresponding representation are color coded.

10. The method of claim 9, wherein one or more colors in the corresponding representation depict one or both of muscle tension and imminent movement of the anatomical features.

11. A procedural guidance system comprising:
    an augmented reality device; and
    logic configured to:
    detect first user interactions of a first user during an interactive guided process;
    display to a second user utilizing the augmented reality device one or more representations of one or more first user hands of the first user carrying out the interactive guided process;
    detect second user interactions of the second user during the interactive guided process, wherein the second user attempts to superimpose one or more representations of one or more second user hands with the one or more representations of the one or more first user hands in a display generated by the augmented reality device;
    determine if the one or more representations of the one or more first user hands and the one or more representations of the one or more second user hands are superimposed in the display; and
    in response to determining none of the representations of the one or more first user hands and the one or more second user hands being superimposed in the display, generate corrective action signals for the first user, the second user, or both; and In response to determining at least one or more fingertips in a representation of a second user hand that are in contact with an object being superimposed on one or more corresponding fingertips in an additional representation of a corresponding first user hand in the display without other portions of the first user hand and the second user in each representation being superimposed, generate a continue signal for at least the second user or permitting a procedure in the interactive guided process to advance to a next step.

12. The system of claim 11, the logic further configured to:
   detect the first user interactions from a recording of the interactive guided process.

13. The system of claim 11, the logic further configured to:
   detect the first user interactions from a live transmission of the interactive guided process.

14. The system of claim 11, the logic further configured to:
   scale the representations of the first user hands to fit the representations of the second user hands, or vice versa.

15. The system of claim 11, the logic further configured to:
   determine a size relationship between the first user hands and the second user hands; and
   scale a projection volume for the first user hands in the display according to the size relationship.

16. The system of claim 15, the logic further configured to:
   superimpose fingertips of the second user hands on fingertips of the first user hands while other portions of the first user hands and the second user hands are not superimposed.

17. The system of claim 11, wherein at least one of the representations of the first user hands or the second user hands comprise an internal anatomical map of a hand.

18. The system of claim 17, wherein anatomical features of the hand in a corresponding the representation are color coded.

19. The system of claim 18, wherein one or more colors in the corresponding representation depict one or both of muscle tension and imminent movement of the anatomical features.

20. A procedural guidance system comprising:
   an augmented reality device; and
   logic configured to:
   detect first user interactions of a first user during an interactive guided process;
   display to a second user utilizing the augmented reality device one or more representations of one or more first user hands of the first user carrying out the interactive guided process;
   detect second user interactions of the second user during the interactive guided process, wherein the second user attempts to superimpose one or more representations of one or more second user hands with the one or more representations of the one or more first user hands in a display generated by the augmented reality device;
   determine if the one or more representations of the one or more first user hands and the one or more representations of the one or more second user hands are superimposed in the display; and
   in response to determining none of the representations of the one or more first user hands and the one or more second user hands being superimposed in the display, generate corrective action signals for the first user, the second user, or both,
   wherein at least one of the representations of the first user hands or the second user hands comprise an internal anatomical map of a hand.

* * * * *